(12) United States Patent
Xiao et al.

(10) Patent No.: US 9,740,163 B2
(45) Date of Patent: Aug. 22, 2017

(54) ROTATIONAL FORCE DRIVING ASSEMBLY PROCESS CARTRIDGE

(71) Applicant: APEX TECHNOLOGY CO., LTD., Zhuhai (CN)

(72) Inventors: Hongbiao Xiao, Zhuhai (CN); Jinlian Liu, Zhuhai (CN); Chao Wang, Zhuhai (CN); Hui Cao, Zhuhai (CN); De Chien, Zhuhai (CN); Jianxin Cao, Zhuhai (CN); Miaoling Yang, Zhuhai (CN); Likun Zeng, Zhuhai (CN); Geming Ding, Zhuhai (CN); Qin Luo, Zhuhai (CN); Wenyi Ding, Zhuhai (CN); Shuchun Dai, Zhuhai (CN); Hailong Ma, Zhuhai (CN)

(73) Assignee: NINESTAR CORPORATION, Zhuhai (CN)

( * ) Notice: Subject to any disclaimer, the term of this patent is extended or adjusted under 35 U.S.C. 154(b) by 0 days.

(21) Appl. No.: 15/015,241

(22) Filed: Feb. 4, 2016

(65) Prior Publication Data

US 2016/0154376 A1 Jun. 2, 2016

Related U.S. Application Data

(63) Continuation-in-part of application No. PCT/CN2015/096280, filed on Dec. 3, 2015, and a
(Continued)

(30) Foreign Application Priority Data

Sep. 29, 2013 (CN) .......................... 2013 1 0460347
Jun. 12, 2014 (CN) ...................... 2014 2 0313988 U
(Continued)

(51) Int. Cl.
*G03G 21/18* (2006.01)
*F16D 3/04* (2006.01)
(Continued)

(52) U.S. Cl.
CPC .......... *G03G 21/1857* (2013.01); *F16D 3/04* (2013.01); *F16D 3/10* (2013.01); *F16D 3/16* (2013.01);
(Continued)

(58) Field of Classification Search
CPC ............ G03G 15/757; G03G 21/1857; G03G 21/186; G03G 2221/1657; G03G 21/1853;
(Continued)

(56) References Cited

U.S. PATENT DOCUMENTS

2009/0175652 A1* 7/2009 Kamimura ......... G03G 21/1853
399/113
2011/0217073 A1* 9/2011 He ....................... G03G 15/757
399/111
(Continued)

FOREIGN PATENT DOCUMENTS

CN 203573085 U * 4/2014 ............. G03G 21/18
CN WO 2016011925 A1 * 1/2016 ............. G03G 21/18

*Primary Examiner* — David M Gray
*Assistant Examiner* — Laura Roth
(74) *Attorney, Agent, or Firm* — Troutman Sanders LLP

(57) ABSTRACT

The present invention relates to a rotational force driving assembly and a process cartridge used for being engaged with a rotational force driving head inside an electrophotographic image forming device. The rotational force driving assembly can comprise a hub, a rotational force receiving component, a side plate, and an axis offset adjusting mechanism. When the axis offset adjusting mechanism is not subjected to external force, the axis offset adjusting mechanism enables the axis of the rotational force receiving
(Continued)

component to be parallel and offset to the axis of the hub. When the axis offset adjusting mechanism is subjected to external force, the rotational force receiving component extends out to be engaged with the rotational force driving head.

21 Claims, 51 Drawing Sheets

Related U.S. Application Data continuation-in-part of application No. PCT/CN2015/092715, filed on Oct. 23, 2015, and a continuation-in-part of application No. PCT/CN2015/084489, filed on Jul. 20, 2015, and a continuation-in-part of application No. 14/496,379, filed on Sep. 25, 2014, now Pat. No. 9,280,121.

(30) Foreign Application Priority Data

| | | |
|---|---|---|
| Jul. 2, 2014 | (CN) | 2014 2 0363432 U |
| Jul. 25, 2014 | (CN) | 2014 1 0359975 |
| Nov. 13, 2014 | (CN) | 2014 1 0642209 |
| Jan. 10, 2015 | (CN) | 2015 1 0012016 |
| May 13, 2015 | (CN) | 2015 1 0243037 |
| Nov. 4, 2015 | (CN) | 2015 1 0746337 |

(51) Int. Cl.
| | |
|---|---|
| *F16D 3/10* | (2006.01) |
| *F16D 3/16* | (2006.01) |
| *F16D 3/205* | (2006.01) |
| *G03G 15/00* | (2006.01) |
| *F16D 3/26* | (2006.01) |

(52) U.S. Cl.
CPC .......... *F16D 3/2052* (2013.01); *F16D 3/265* (2013.01); *G03G 15/757* (2013.01); *G03G 21/186* (2013.01); *G03G 21/1853* (2013.01); *G03G 2221/1657* (2013.01)

(58) Field of Classification Search
CPC ..... F16D 3/10; F16D 3/16; F16D 3/18; F16D 3/2052
USPC ................................................ 399/117, 167
See application file for complete search history.

(56) References Cited

U.S. PATENT DOCUMENTS

| | | | | |
|---|---|---|---|---|
| 2011/0255900 A1* | 10/2011 | Zhou | ................... | G03G 15/757 399/111 |
| 2012/0275824 A1* | 11/2012 | Gu | ....................... | G03G 21/186 399/111 |
| 2013/0136492 A1* | 5/2013 | Xu | ....................... | G03G 21/185 399/111 |
| 2015/0093150 A1* | 4/2015 | Xiao | ....................... | F16D 3/18 399/167 |

* cited by examiner

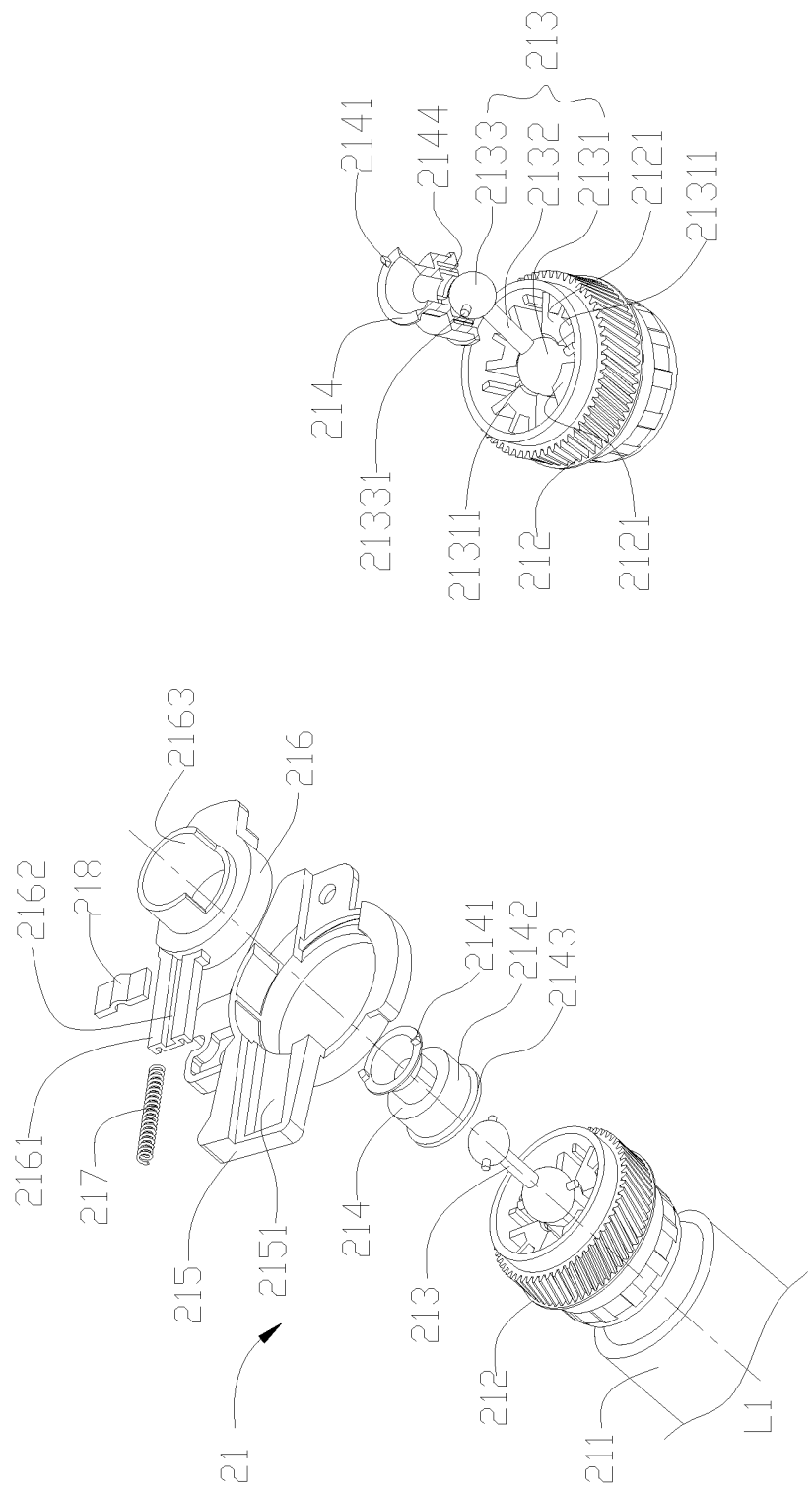

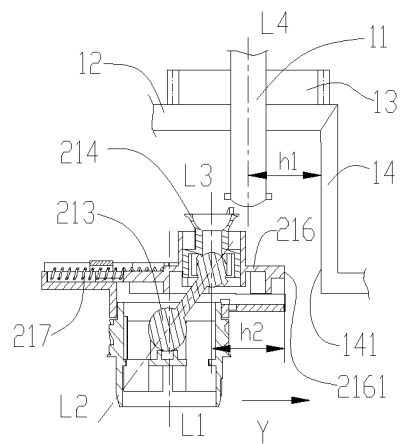
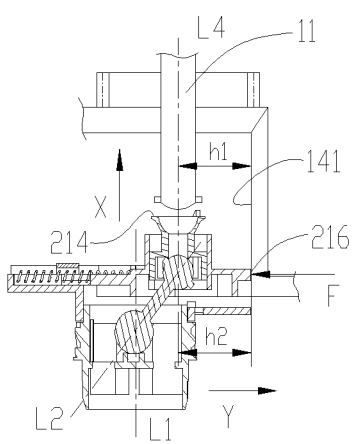
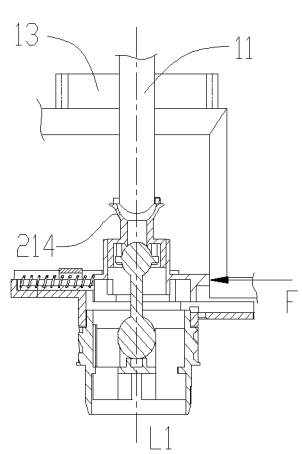
Fig. 11a        Fig. 11b        Fig. 11c
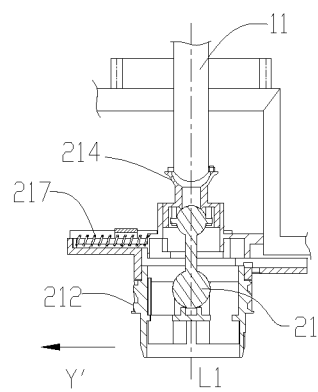
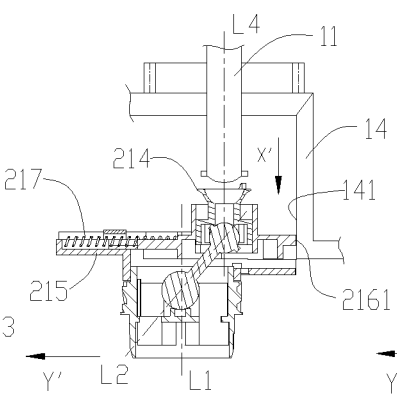
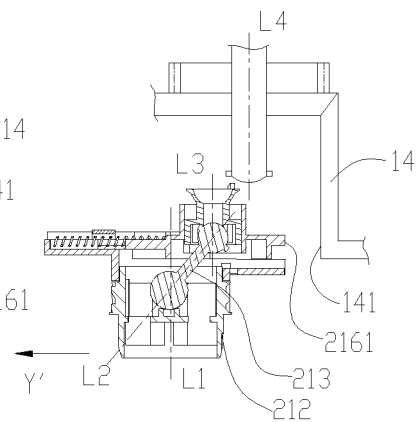
Fig. 12a        Fig. 12b        Fig. 12c

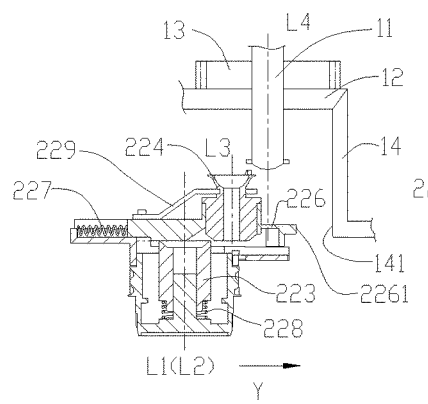 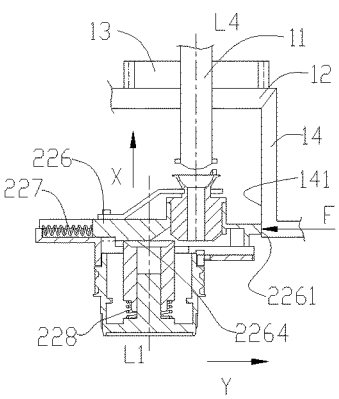 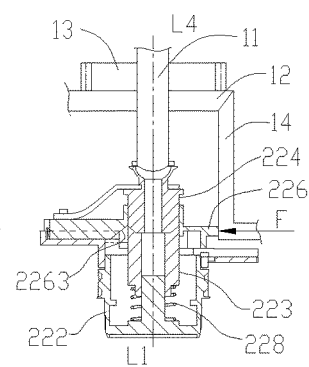
Fig. 16a  Fig. 16b  Fig. 16c
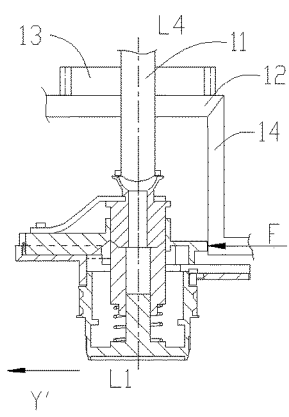 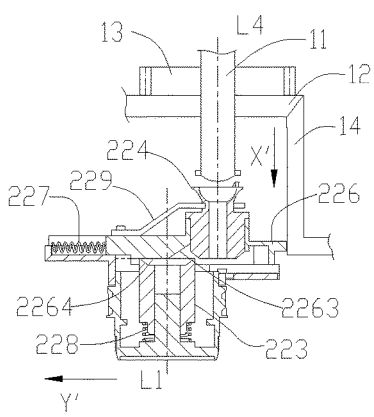 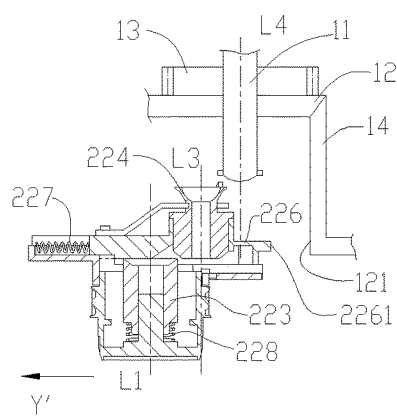
Fig. 17a  Fig. 17b  Fig. 17c

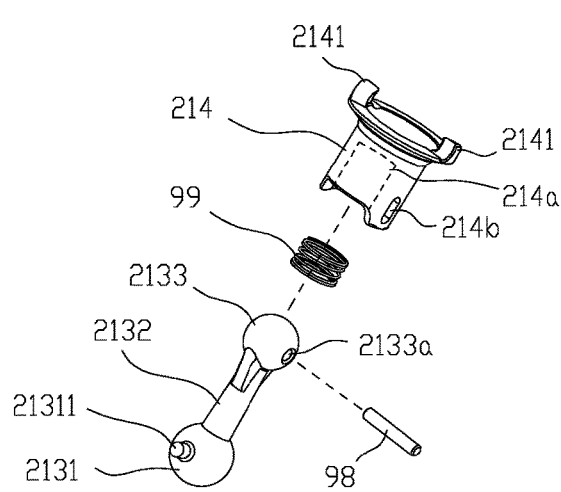
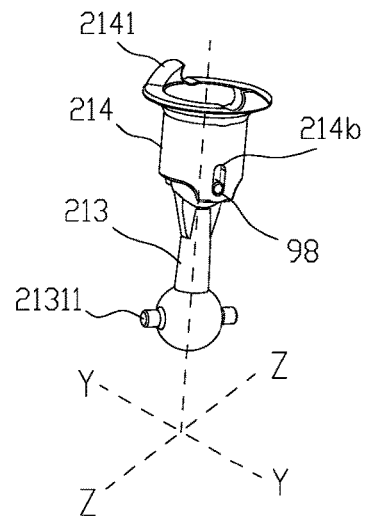
Fig. 22
Fig. 23
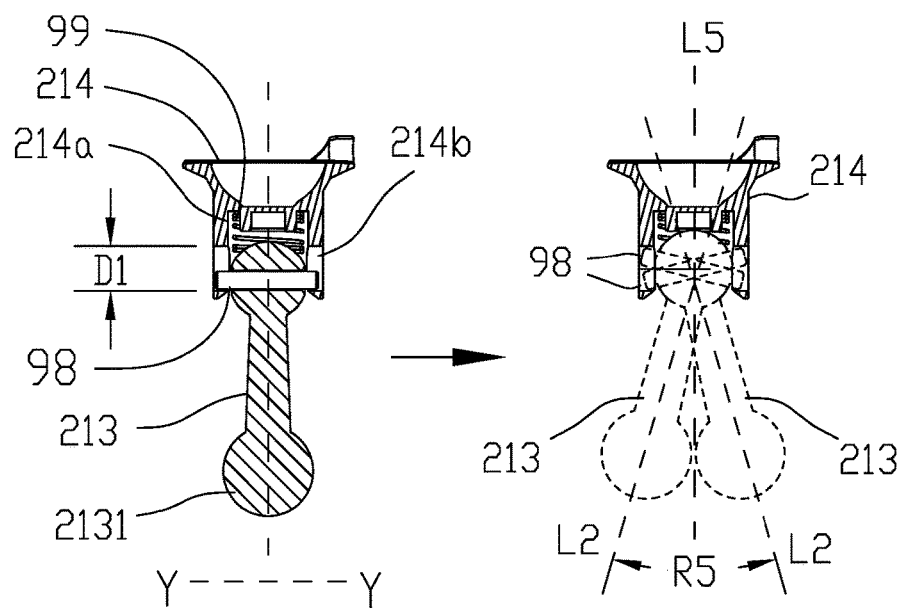
Fig. 24

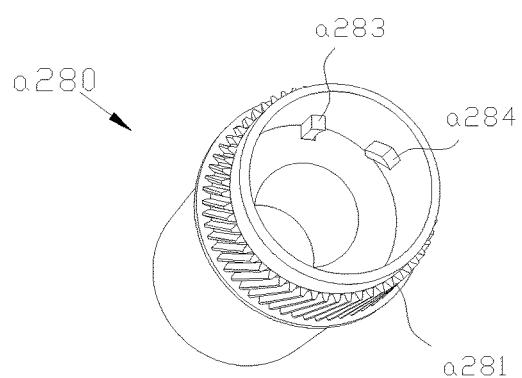
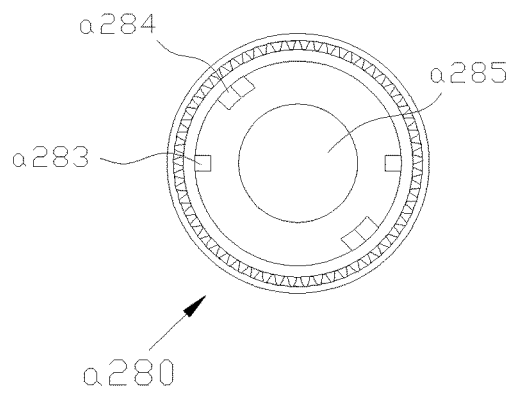
Fig. 47a     Fig. 47b
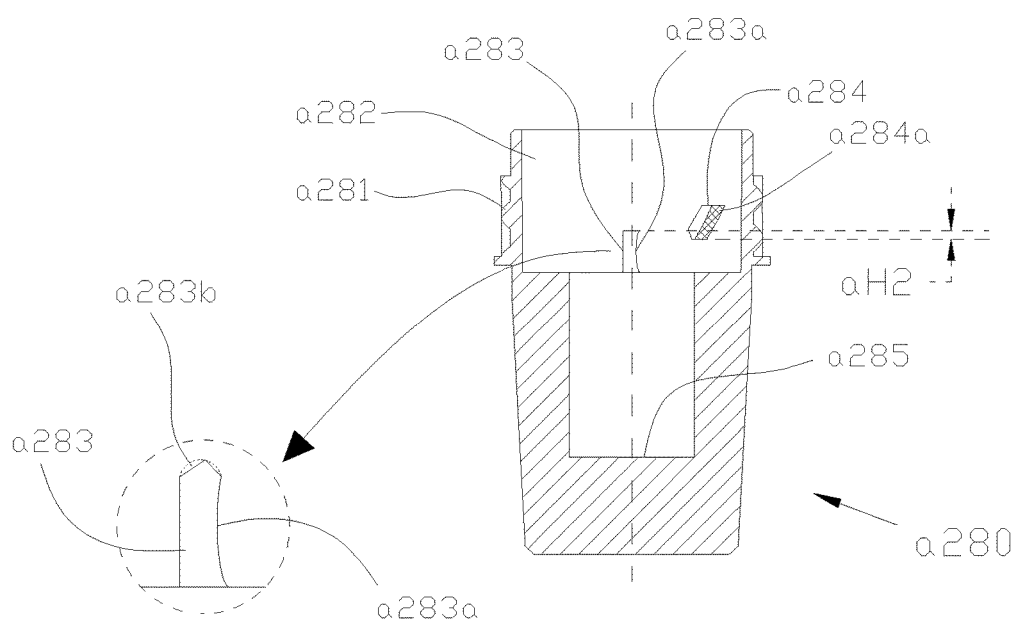
Fig. 47c

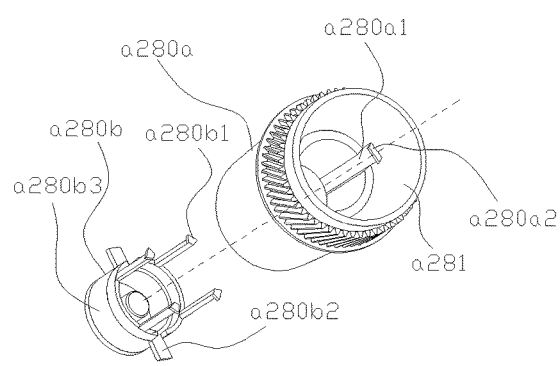
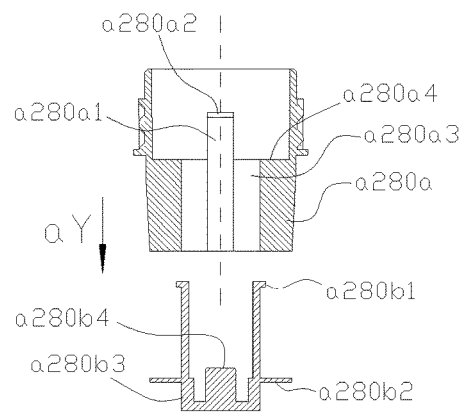
Fig. 68a    Fig. 68b
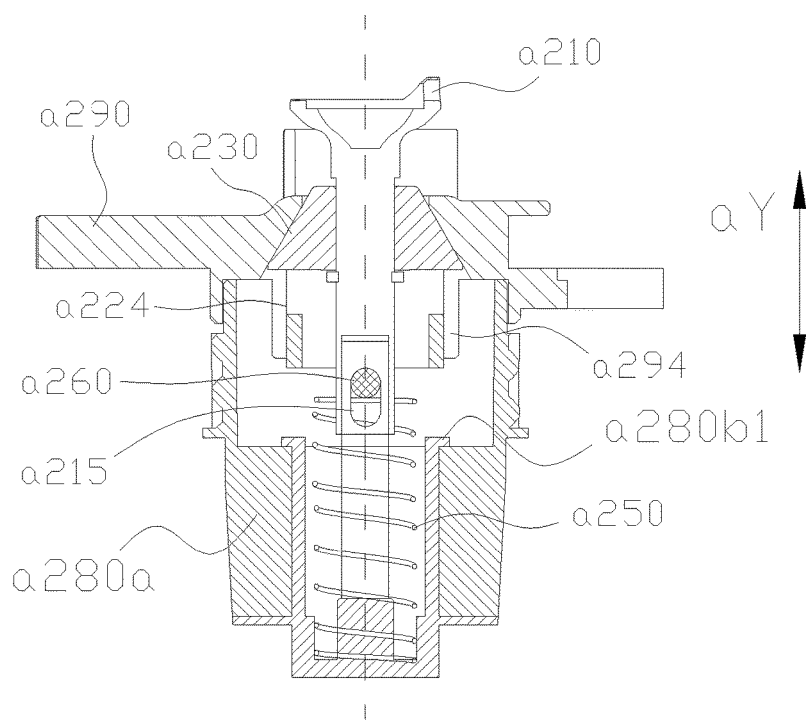
Fig. 69

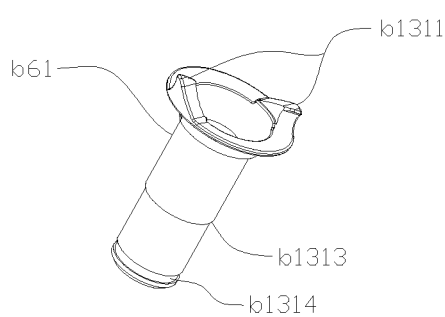
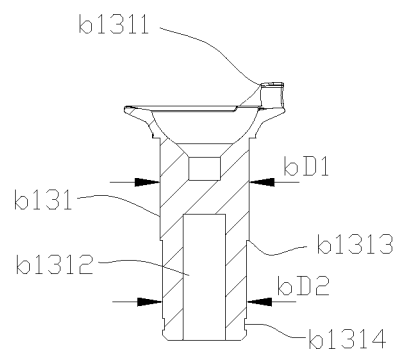
Fig. 86  Fig. 87
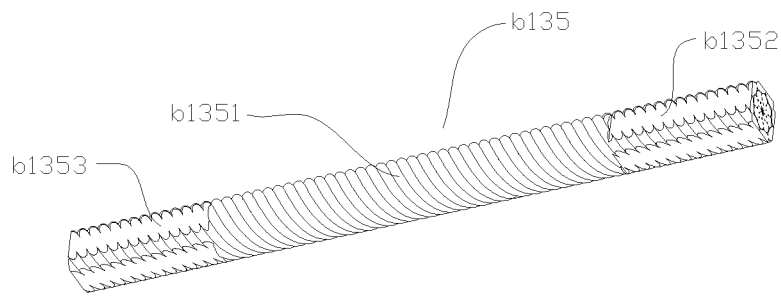
Fig. 88
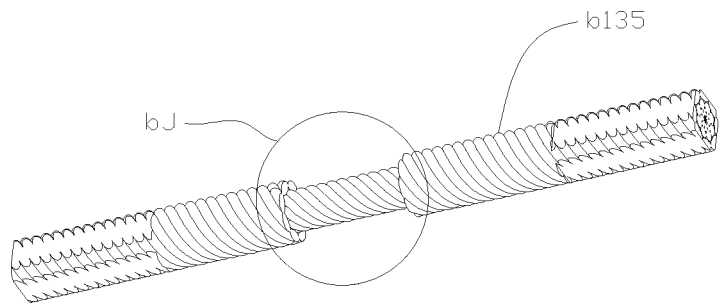
Fig. 89
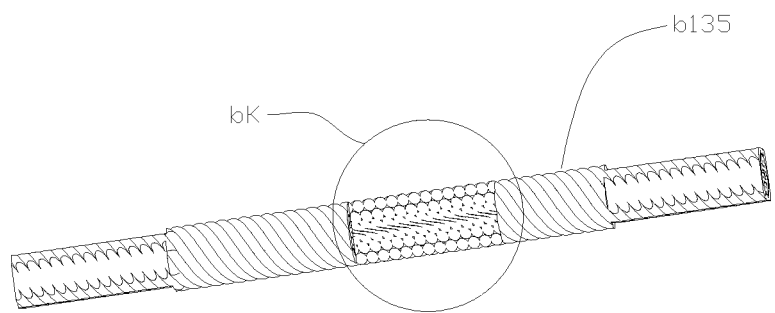
Fig. 90

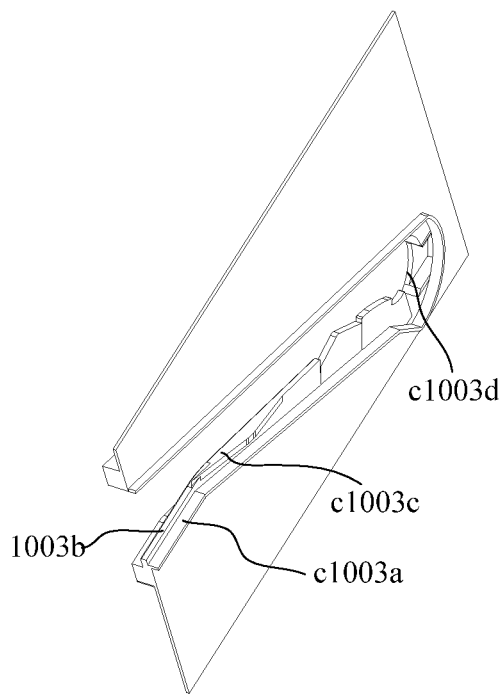
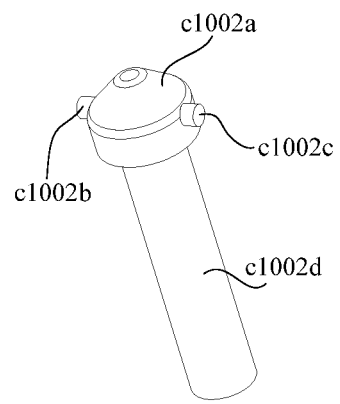
Fig. 120      Fig. 121
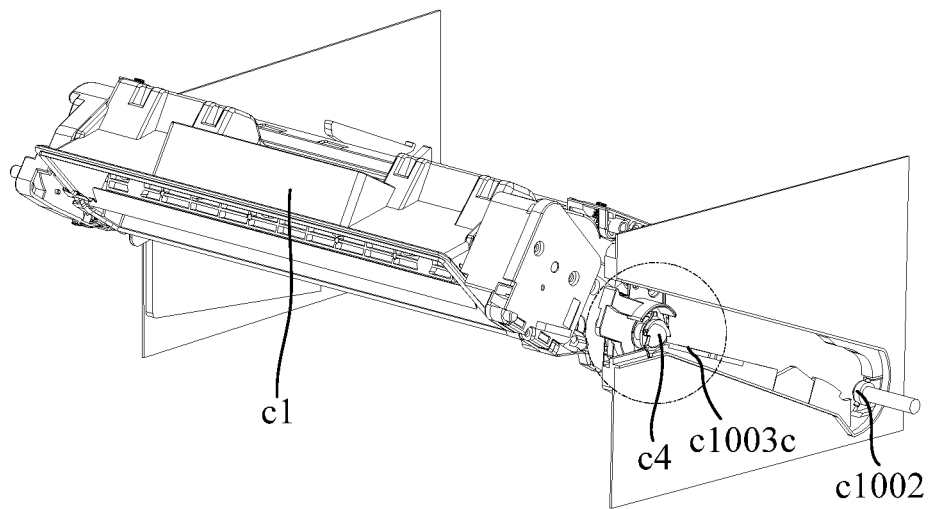
Fig. 122

US 9,740,163 B2

ROTATIONAL FORCE DRIVING ASSEMBLY PROCESS CARTRIDGE

RELATED U.S. APPLICATION DATE

This application is a continuation in part of application Ser. No. 14/496,379, filed on Sep. 25, 2014.

FIELD OF TECHNOLOGY

The present invention relates to a process cartridge for an electrophotographic image forming device, and particularly relates to a rotational force driving assembly in the process cartridge.

BACKGROUND

A process cartridge in the prior art is detachably installed in an electrophotographic image forming device. Said electrophotographic image forming device is internally provided with a rotational force driving head. Said process cartridge comprises a photosensitive member for bearing an image carrier and a photosensitive member hub provided at one end of said photosensitive member, inclined teeth are arranged on the outer circumference of said photosensitive member hub, the interior of the photosensitive member hub is provided with a cavity, and meanwhile a rotational driving force receiver which is capable of being engaged with a rotational force driving head inside said electrophotographic image forming device and is used for transmitting rotational force to said photosensitive member is arranged on the photosensitive member hub.

FIG. 1 to FIG. 2 illustrates the engaging process of the rotational force driving head and the rotational driving force receiving head in the prior art. As shown in FIG. 1a, 11 is the rotational force driving head in the electrophotographic image forming device, and transmission pins 111 for transmitting force are arranged on the rotational force driving head; 201 is a photosensitive member arranged in the process cartridge, 202 is a photosensitive member hub provided at one end of said photosensitive member, and 203 is the rotational driving force receiving head arranged on said photosensitive member hub; a force transmission part 2032 capable of being engaged with said photosensitive member hub to transmit force and a force receiving part 2031 capable of being engaged with the transmission pins 111 on said rotational force driving head 11 to transmit the force are arranged on said rotational driving force receiving head. During the process that the process cartridge is installed in the electrophotographic image forming device, the rotational driving force receiving head needs to be inclined (as shown in FIG. 1a) relative to the axis L1 of said photosensitive member in advance. As shown in FIG. 1a, during the installation process of the process cartridge, the looseness of internal parts of the electrophotographic image forming device is caused by assembly error; during the installation process of the process cartridge, the part, close to the rotational force driving head, of the rotational driving force receiving head 203 may interfere with said rotational force driving head, while along with continuous installation of the process cartridge, the rotational force driving head 11 promotes the rotational driving force receiving head to be straightened, but if the rotational force receiving head 11 is incapable of being engaged with the rotational driving force receiving head 203 normally, the process cartridge cannot be installed in place, the condition as shown in FIG. 1b may appear, and thus normal engagement between the rotational driving head 11 and the rotational driving force receiving head 203 as shown in FIG. 2 cannot be realized.

SUMMARY

The primary object of the present invention is to provide a rotational force driving assembly capable of solving the above described problem of the conventional rotational driving force receiver.

Another object of the present invention is to provide a photosensitive member, a rotational force driving assembly used in photosensitive member, capable of solving the above described problem of the conventional photosensitive member.

A further object of the present invention is to provide a process cartridge, a rotational force driving assembly used in the process cartridge, capable of solving the above described problem of the conventional process cartridge.

In order to achieve the all above objects, a rotational force driving assembly provided in the present invention comprising a hub, a rotational force receiving component for driving the hub to rotate and a side plate provided at one end of the hub. The rotational force driving assembly further comprising an axis offset adjusting mechanism. Two ends of the axis offset adjusting mechanism can be respectively connected with the hub and the rotational force receiving component which is provided on the side plate and can slide relative to the side plate. When the rotational force driving assembly is not subjected to external force, the axis offset adjusting mechanism enables the axis of the rotational force receiving component to make parallel offset relative to the axis of the hub. After the rotational force driving assembly is installed in place in the electrophotographic image forming device, the axis offset adjusting mechanism is subjected to the external force to move relative to the side plate, so that the axis of the rotational force receiving component is coincident with the axis of the hub, and the rotational force receiving component extends out along the axial direction of the hub to be engaged with a rotational force driving head.

A further plan is to provide the driving assembly further comprising an intermediate force transmission component, and the intermediate force transmission component is mutually engaged with the rotational force receiving component and the hub to transmit force.

A further plan is to provide the axis offset adjusting mechanism comprises a sliding piece and a first elastic element. The sliding piece is connected with the rotational force receiving component. The first elastic element respectively abuts against the plate and the sliding piece. When the rotational force driving assembly is not subjected to external force, the first elastic element enables the sliding piece to make parallel offset relative to the axis of the hub. After the rotational force driving assembly is installed in place in the electrophotographic image forming device, the sliding piece is subjected to the external force to move relative to the side plate, so that the rotational force receiving component extends out along the axial direction of the hub to be engaged with the rotational force driving head.

A further plan is to provide A sliding rail is arranged on the side plate. A sliding piece is connected with the side plate through the sliding rail. A handle end matched with the sliding rail is arranged on the sliding piece, and an accommodating groove for accommodating the first elastic element is formed in the handle end.

A further plan is to provide the intermediate force transmission component comprises a first end spherical part, a second end spherical part and an intermediate connecting part. The first end spherical part is provided with a first force transmission part capable of being engaged with the hub. The second end spherical part is provided with a second force transmission part capable of being engaged with the rotational force receiving component.

A further plan is to provide the rotational force driving assembly further comprising a second elastic element arranged between the intermediate force transmission component and the hub. The intermediate force transmission component is arranged in the hub. The sliding piece comprises an inner hole. A cylinder part is arranged at one end of the rotational force receiving component. The cylinder part is matched with the inner hole of the sliding piece.

A further plan is to provide the rotational force driving assembly further comprising a second elastic element arranged between the intermediate force transmission component and the hub. The intermediate force transmission component is arranged in the hub. The sliding piece is provided with the bottom surface and the inner hole. The rotational force receiving component is arranged to be matched with the inner hole and can axially slide relative to the inner hole. The bottom surface abuts against the intermediate force transmission component. The intermediate force transmission component is at the retracting state when the bottom surface abuts against the intermediate force transmission component.

A further plan is to provide a recess is formed in one end of the rotational force receiving component. The intermediate force transmission component comprises an end spherical part. The buffer piece is provided in the recess. The end spherical part abuts against the buffer piece. The rotational force receiving component and the intermediate force transmission component are connected through a pin or a latch.

A further plan is to provide the rotational force driving assembly further comprises a connecting column and a connecting pin. The connecting pin penetrates through a hole for connecting the intermediate force transmission component and the connecting column. The connecting column is connected to the hub.

A further plan is to provide the rotational force driving assembly further comprise guiding mechanisms. The guiding mechanisms are arranged on the connecting column and the hub so that the connecting column is installed inside the hub along the guiding mechanisms.

A process cartridge provided in the present invention comprises a cartridge, a rotational force driving assembly used for being engaged with a rotational force driving head inside an electrophotographic image forming device so as to transmit rotational driving force. The rotational force driving assembly comprising a hub, a rotational force receiving component for driving the hub to rotate and a side plate provided at one end of the hub. The rotational force driving assembly further comprising an axis offset adjusting mechanism. Two ends of the axis offset adjusting mechanism can be respectively connected with the hub and the rotational force receiving component which is provided on the side plate and can slide relative to the side plate. When the rotational force driving assembly is not subjected to external force, the axis offset adjusting mechanism enables the axis of the rotational force receiving component to make parallel offset relative to the axis of the hub. After the rotational force driving assembly is installed in place in the electrophotographic image forming device, the axis offset adjusting mechanism is subjected to the external force to move relative to the side plate, so that the axis of the rotational force receiving component is coincident with the axis of the hub, and the rotational force receiving component extends out along the axial direction of the hub to be engaged with a rotational force driving head.

After the technical scheme is adopted, the intermediate force transmission component capable of being engaged with the hub and the rotational force receiving component at the two ends respectively, the sliding piece arranged on the side plate and capable of sliding relative to the side plate, and the first elastic element abutting against the side plate and the sliding piece respectively are additionally arranged, the rotational force receiving component is matched with the sliding piece, when the rotational force driving assembly is not subjected to external force, the axis of the rotational force receiving component and the axis of the hub are enabled to make parallel offset under the elastic effect of the first elastic element, and after the rotational force driving assembly is installed in place in the electrophotographic image forming device, the elastic effect of the first elastic element is overcome, so that the sliding piece slides to the axis of the rotational force receiving component to be coincident with the axis of the hub, two ends of the intermediate force transmission component are respectively engaged with the hub and the rotational force receiving component, and the rotational force receiving component extends out along the axial direction of the hub to be engaged with the rotational force driving head so as to drive the hub to rotate. Namely, when the rotational force receiving component is driven to move on the surface of the side plate to the axis of the rotational force receiving component through the sliding of the sliding piece to be coincident with the axis of the hub, the rotational force receiving component completely extends out to be engaged with the rotational force driving head inside the electrophotographic image forming device so as to transmit the rotational driving force, and thus interference cannot occur during the installation process and the technical problem that installation interference between the rotational force driving assembly and the rotational force driving head is solved.

BRIEF DESCRIPTION OF THE DRAWING(S)

FIG. 5 illustrates an assembly schematic diagram of a first embodiment in the present invention.

FIG. 6 illustrates a stereo view of a force transmission part in the first embodiment of the present invention.

FIG. 11a illustrates a schematic diagram of the installation process of a process cartridge in the first embodiment.

FIG. 11b illustrates a schematic diagram of the installation process of the process cartridge in the first embodiment.

FIG. 11c illustrates a schematic diagram that the process cartridge is installed in place in the first embodiment.

FIG. 12a illustrates a schematic diagram of the disassembly process of the process cartridge in the first embodiment.

FIG. 12b illustrates a schematic diagram of the disassembly process of the process cartridge in the first embodiment.

FIG. 12c illustrates a schematic diagram of the disassembly process of the process cartridge in the first embodiment.

FIG. 16a illustrates a schematic diagram of the installation process of the process cartridge in the second embodiment.

FIG. 16b illustrates a schematic diagram of the installation process of the process cartridge in the second embodiment.

FIG. 16c illustrates a schematic diagram that the process cartridge is installed in place in the second embodiment.

FIG. 17a illustrates a schematic diagram of the disassembly process of the process cartridge in the second embodiment.

FIG. 17b illustrates a schematic diagram of the disassembly process of the process cartridge in the second embodiment.

FIG. 17c illustrates a schematic diagram of the disassembly process of the process cartridge in the second embodiment.

FIG. 22 and FIG. 23 illustrate structural views of a rotational force receiving component and an intermediate force transmission component in the fourth embodiment.

FIG. 24 and FIG. 25 illustrate an action schematic diagram of the rotational force receiving component and the intermediate force transmission component in the fourth embodiment.

FIG. 47a, FIG. 47b and FIG. 47c are schematic structural diagrams of a transmitting component in Embodiment Seven;

FIG. 68a and FIG. 68b are schematic structural diagrams of a transmitting component in Embodiment Eleven;

FIG. 69 is a schematic diagram showing the movement of a coupling component with respect to a transmitting component in Embodiment Eleven;

FIG. 86 is a stereo diagram of a rotational force receiving component in Embodiment Fourteen;

FIG. 87 is a sectional diagram of the rotational force receiving component in Embodiment Fourteen;

FIG. 88 is a stereo diagram of a flexible shaft in Embodiment Fourteen;

FIG. 89 is a stereo diagram of a flexible shaft in Embodiment Fourteen;

FIG. 90 is a sectional diagram of a portion of the flexible shaft in Embodiment Fourteen;

FIG. 120 is a schematic structural diagram of a guide rail in the electrophotographic image forming device in Embodiment Seventeen;

FIG. 121 is a schematic structural diagram of a protrusion in the electrophotographic image forming device in Embodiment Seventeen;

FIG. 122 is a schematic structural diagram showing that a process cartridge is in a first state in the electrophotographic image forming device in Embodiment Seventeen;

DETAILED DESCRIPTION

The following specifically illustrates the technical scheme of the present invention in combination with embodiments.

Embodiment 1

FIG. 3 to FIG. 12 illustrate the first embodiment of the present invention.

Figures 1A, 1B:
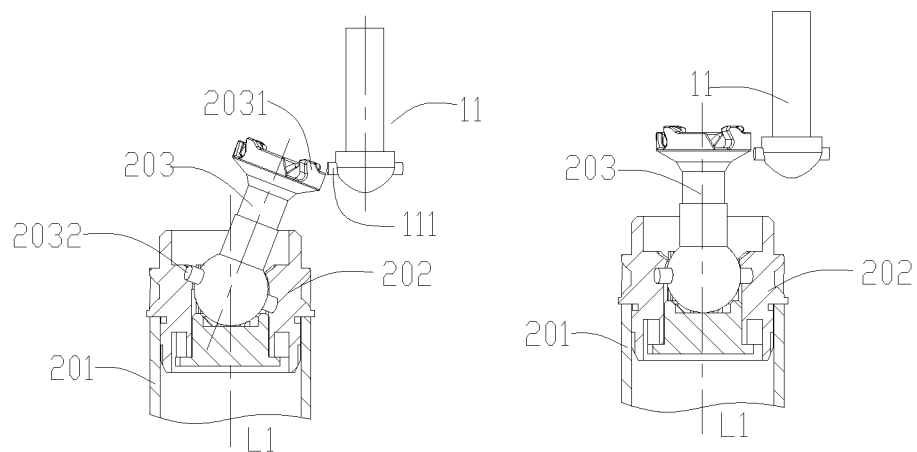
FIG. 1a illustrates a structural schematic diagram of the prior art.
FIG. 1b illustrates a schematic diagram of interference in the prior art.
Figure 2:
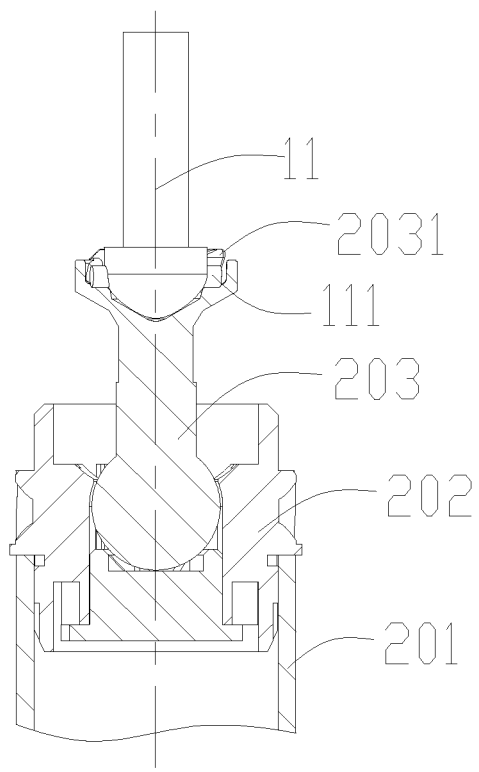
FIG. 2 illustrates a schematic diagram of engagement realized by a force transmission mechanism in the prior art.
Figure 3:
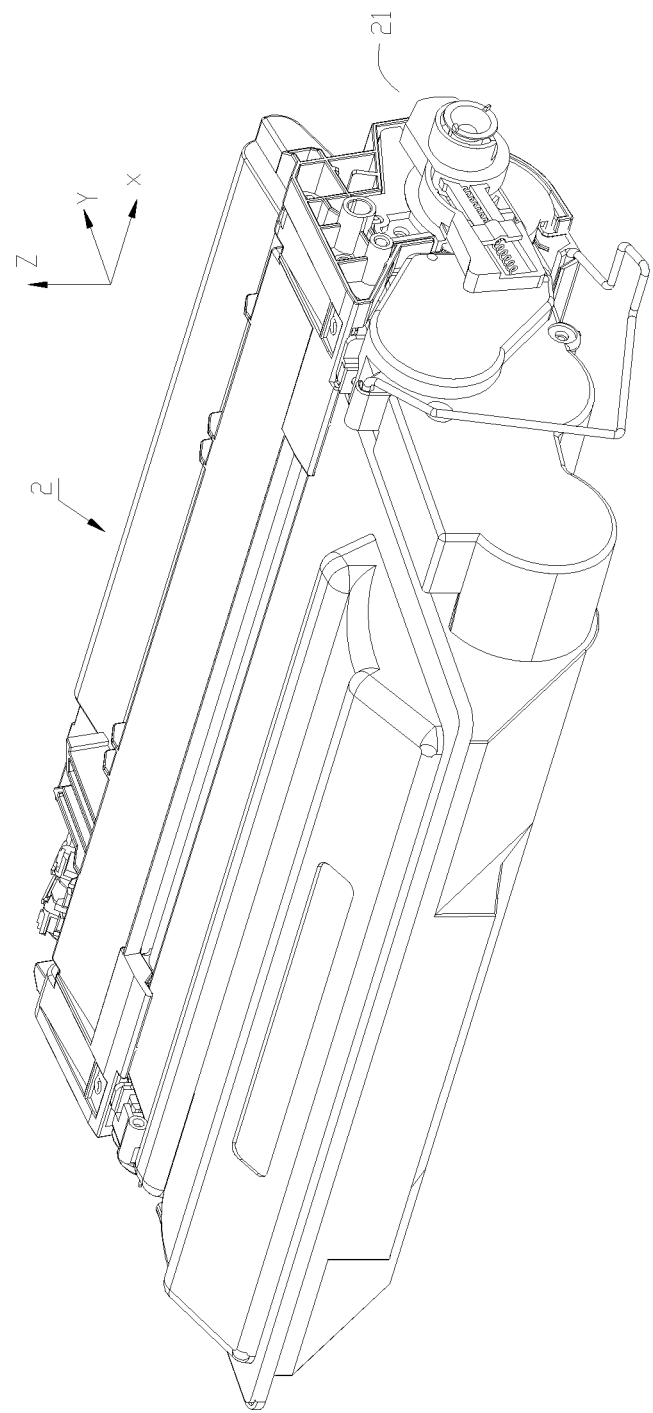
FIG. 3 illustrates a stereo view of a process cartridge in the present invention.

FIG. 3 illustrates a stereo view of a process cartridge 2, 21 is a rotational force driving assembly provided at one end of the process cartridge in the longitudinal direction, and the driving assembly 21 is provided at one end of a photosensitive member. The longitudinal direction of the illustrated process cartridge 2 is the X-coordinate direction in diagram form, the photosensitive member is arranged along the longitudinal direction of said process cartridge, and thus the axial direction of said photosensitive member is the same as the X-axis direction; Y direction is another direction vertical to the X direction, namely the installation direction of the process cartridge during the process that the process cartridge is installed in the electrophotographic image forming device in the scheme; Z direction is a direction vertical to the X direction and the Y direction respectively.

Figure 4:
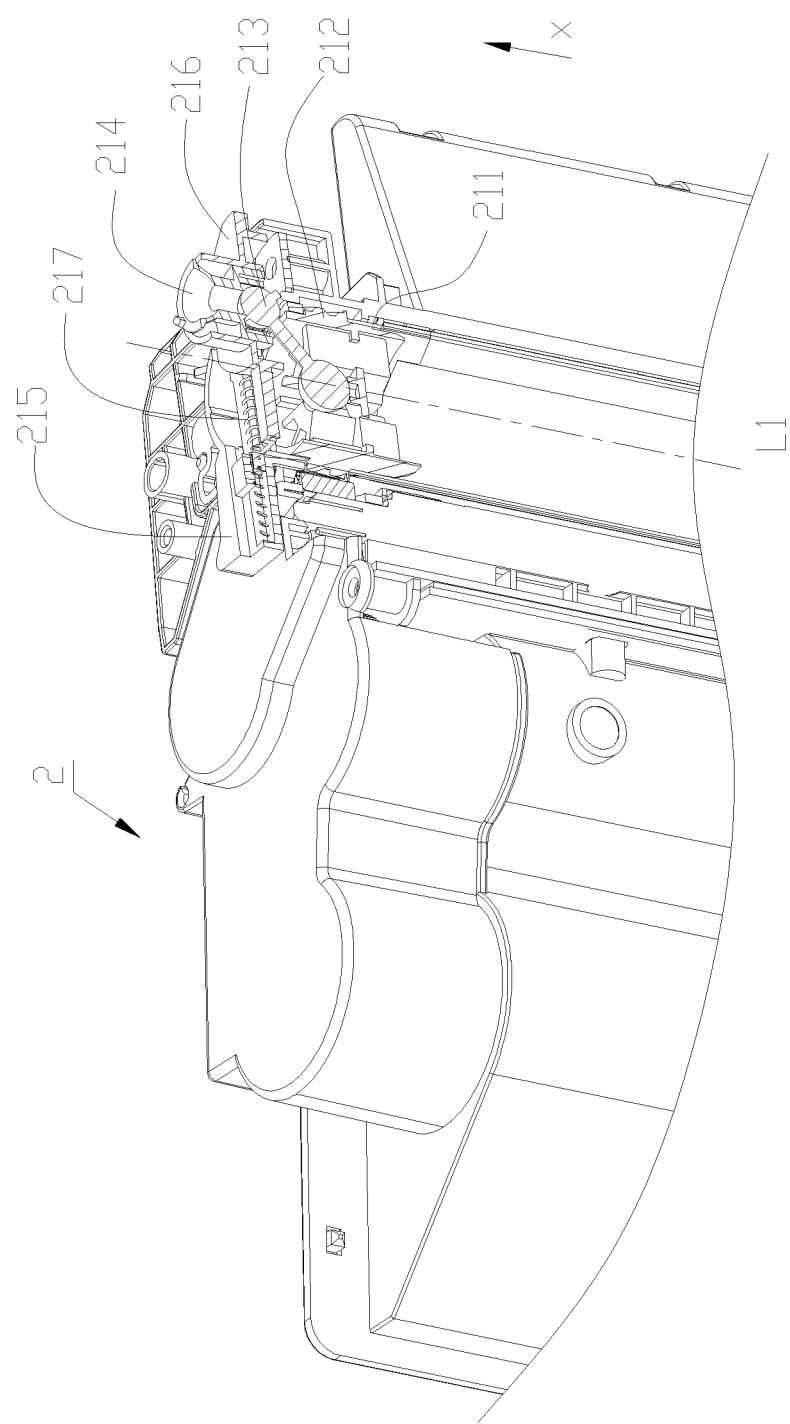
FIG. 4 illustrates a partial section view of the process cartridge in the present invention.

FIG. 4 is a partial section view of the process cartridge cut along the L1-axis direction of said photosensitive member, and can clearly show the setting condition of said driving assembly 21 in the process cartridge 2. As shown in the figure, 211 is the photosensitive member arranged inside the process cartridge along the longitudinal direction of said process cartridge; 212 is a photosensitive member hub provided at one end of said photosensitive member, an inclined gear for transmitting force is arranged on the outer circumference of said photosensitive member hub, a cavity is formed in the interior of the photosensitive member hub, and said photosensitive member and said photosensitive member hub are relatively and fixedly connected and are coaxially arranged; 213 is an intermediate force transmission component of the driving assembly in the embodiment, and 214 is a rotational force receiving component used for being engaged with a rotational force driving head arranged inside the electrophotographic image forming device to transmit force, wherein one end of the intermediate force transmission component 213 is arranged inside the cavity of said photosensitive member hub and is engaged with said photosensitive member hub 212 to transmit the force, and the other end of the intermediate force transmission component 213 is engaged with said rotational force receiving component 214 to transmit the force; 215 is a side plate provided at one end of said photosensitive member hub 212, and 216 is a sliding piece which is arranged on the side plate and can slide relative to said side plate 215; and 217 is a first elastic element capable of enabling said sliding piece 216 to recover to the initial state.

After said rotational force receiving component 214 is engaged with the rotational force driving head 11 inside the electrophotographic image forming device, the force is transmitted to said photosensitive member hub 212 through said intermediate force transmission component 213, and thus said photosensitive member 211 is driven to rotate.

Said driving assembly in the present invention comprises the photosensitive member hub, the intermediate force transmission component, the rotational force receiving component, the side plate and the axis offset adjusting mechanism; said axis offset adjusting mechanism is provided on said side plate and can slide relative to said side plate, and said axis offset adjusting mechanism comprises said sliding piece and said first elastic element.

FIG. 5 is an assembly decomposition view of the driving assembly 21 in the embodiment. The photosensitive member hub 212 is provided on the end of the photosensitive member 211, one end of the intermediate force transmission component 213 is connected with said photosensitive member hub 212, and the other end of the intermediate force transmission component 213 is connected with said rotational force receiving component 214; the rotational force receiving component 214 is provided with a claw 2141 for receiving the force, a cylinder part 2142 and a boss part 2143, said boss part is used for preventing the rotational force receiving component 214 from disengaging; the side plate 215 is provided at one end of said photosensitive member hub 212, a sliding rail 2151 is arranged on the side plate 215, the sliding piece 216 is arranged on said side plate 215, and the side plate 215 does not move relative to the photosensitive member hub 212; the sliding piece 216 is provided with a handle end 2161 matched with said sliding rail 2151, an accommodating groove 2162 of the first elastic element 217 is further formed in the handle end 2161, an inner hole 2163 which is matched with said rotational force receiving component 214 and can drive the rotational force receiving component 214 to move is further formed in the sliding piece 216, the inner hole 2163 is matched with the cylinder part 2142 on the rotational force receiving component, and said cylinder part 2142 can slide along the axial direction of the photosensitive member relative to the inner hole 2163; according to the embodiment, the handle end 2161 of the sliding piece and the first elastic element 217 are further limited in the sliding rail 2151 of the side plate 215 through a compressing piece 218, the compressing piece 218 and the side plate 215 are relatively and fixedly arranged or a compressing part is arranged on the side plate 215; said sliding rail can be arranged to be a sliding groove and can also be a key, and a matched sliding groove is arranged on the sliding piece 215 correspondingly, so that the sliding piece 216 can slide relative to the side plate 215.

FIG. 6 is used for specifically illustrating connection relation among the intermediate force transmission component 213, the photosensitive member hub 212 and the rotational force receiving component 214. As shown in FIG. 6, the photosensitive member hub 212 is provided with a plurality of stress columns 2121 in the inner circumference direction; the intermediate force transmission component 213 comprises a first end spherical part 2131, a second end spherical part 2133 and an intermediate connecting part 2132, wherein a first force transmission part 21311 and a second force transmission part 21331 are respectively arranged on the first end spherical part 2131 and the second end spherical part 2133, and said force transmission parts 21311 and 21331 extend out along the radial direction of said intermediate force transmission component 213; the interior of the rotational force receiving component 214 is hollow, the symmetrically arranged claw 2141 in the circumference direction for receiving the force is arranged at the end of the rotational force receiving component 214, and a plurality of stress parts 2144 are arranged at the interior of the rotational force receiving component 214 along the inner circumference direction; the force transmission part 21311 is arranged in a gap among the stress columns 2121, and the force transmission part 21331 is arranged in a gap among the stress parts 2144; the intermediate force transmission component 213 is limited between the photosensitive member hub 212 and the rotational force receiving component 214; since the two ends of the intermediate force transmission component 213 are spherical parts, the intermediate force transmission component 213 can make offset at any degree relative to the axis of the photosensitive member hub 212 and the axis of the rotational force receiving component 214; said first force transmission part 21311 is engaged with the stress columns 2121 to transmit the force, and said second force transmission part 21331 is engaged with the stress parts 2144 to transmit the force.

Figure 7:
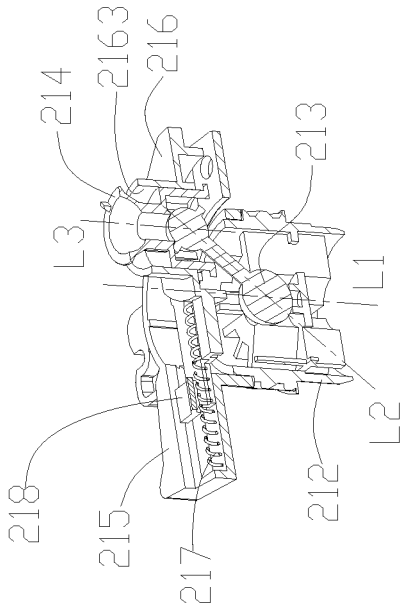
FIG. 7 illustrates a stereo view of a driving assembly at an initial state in the first embodiment.
Figure 9:
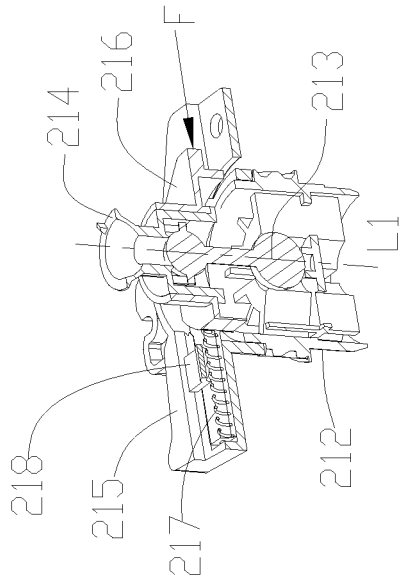
FIG. 9 illustrates a stereo view of the driving assembly at a working state in the first embodiment.
Figure 8:
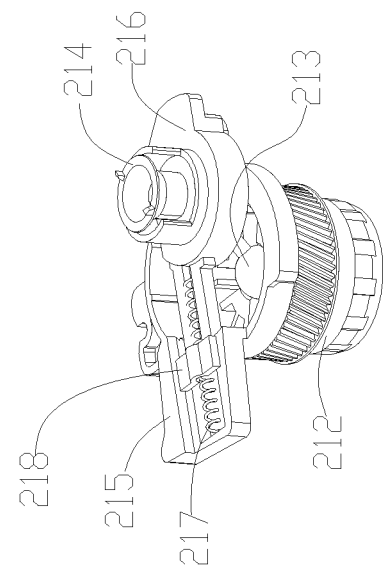
FIG. 8 illustrates a section view of FIG. 7.
Figure 10:
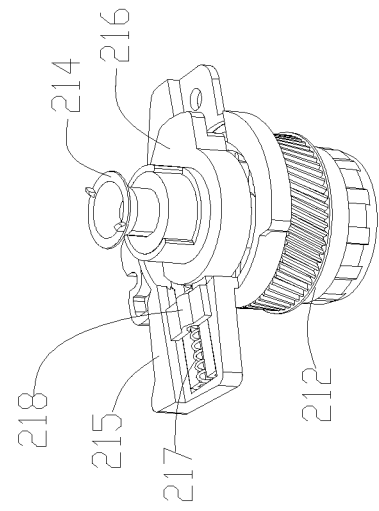
FIG. 10 illustrates a section view of FIG. 9.

FIG. 7 to FIG. 10 respectively describe two states of the driving assembly. FIG. 7 is a stereo view of the driving assembly at an initial state, and FIG. 8 is a section view of FIG. 7. Before the process cartridge is installed in the electrophotographic image forming device, the driving assembly is at the states shown in FIG. 7 and FIG. 8; after the process cartridge is installed in place, the driving assembly is at the state (working state) as shown in FIG. 9 and FIG. 10. Before the process cartridge is installed, under the effect of natural stretching of the first elastic element 217, the sliding piece is kept at the initial state through the first elastic element 217, namely the axis L3 of the sliding piece 216 is at an offset state with the axis L1 of the photosensitive member hub, and the rotational force receiving component 214 is retained in the inner hole 2163; meanwhile, the axis of the rotational force receiving component 214 and the axis L3 of the sliding piece 216 are coaxial, and at this moment, the rotational force receiving component 214 also shifts relative to the axis L1 of the photosensitive member hub along with the sliding piece 216, namely the axis L1 and the axis L3 do not coincide but are relatively parallel; since the intermediate force transmission component 213 is limited between the photosensitive member hub 212 and the force transmission component 214 and is mutually matched with the photosensitive member hub 212 and the force transmission component 214, when the rotational force receiving component 214 is at the initial position as shown in FIG. 8, the rotational force receiving component 214 drives the intermediate force transmission component 213 to be inclined relative to the axis L1 of the photosensitive member hub, and meanwhile the intermediate force transmission component 213 is also inclined relative to the axis L3 of the rotational force receiving component 214. Right now, the driving assembly is at the initial state, the axis L2 of the intermediate force transmission component 213 is inclined relative to the axis L1 of the photosensitive member hub and the axis L3 of the rotational force receiving component 214, namely included angles are formed between L2 and L1 and between L2 and L3. During the process that the process cartridge is installed in the electrophotographic image forming device, the sliding piece 216 is subjected to the effect of external force F along the negative direction of the installation direction of the process cartridge, and the force F overcomes the elastic force of the first elastic element 217 by driving the sliding piece 216 so that the sliding piece 216 slides inside the sliding rail 2151 along the negative direction of the installation direction of the process cartridge; right now, the rotational force receiving component 214 moves along with the sliding piece 216 and drives the intermediate force transmission component 213 to be gradually straightened (namely the included angles between L2 and L1 and between L2 and L3 gradually become smaller), and the end, engaged with said rotational force receiving component, of the intermediate force transmission component 213 gets close to said rotational force receiving component; finally, after the process cartridge is installed in place, the external force F overcomes the elastic force of the first elastic element 217 and enables the first elastic element 217 to be compressed, so that the intermediate force transmission component 213, the rotational force receiving component 214 and the sliding piece 216 are kept at the states as shown in FIG. 9 and FIG. 10, namely the working state of the driving assembly; right now, the axis L2 of the intermediate force transmission component and the axis L3 of the rotational force receiving component are coaxial to the axis L1 of the photosensitive member hub. Meanwhile, during the installation process of the process cartridge from the initial state to the working state, the intermediate force transmission component 213 is straightened from inclination, so that the rotational force receiving component 214 is provided with certain offset in the longitudinal direction of the process cartridge, namely the rotational force receiving component 214 can extend out in the longitudinal direction of the process cartridge.

FIG. 11a to FIG. 11c illustrate the schematic diagram of the process that the driving assembly is engaged with the rotational force driving head when the process cartridge is installed in the electrophotographic image forming device. As shown in FIG. 11a, 11 is the rotational force driving head arranged inside the electrophotographic image forming device, 13 is a driving gear for driving the rotational force driving head 11 to rotate, 12 is a right side wall of the electrophotographic image forming device, and 14 is a back side wall of the electrophotographic image forming device, wherein the rotational force driving head 11 and the driving gear 13 are both arranged on the right side wall 12 of the electrophotographic image forming device, and 141 is an inner side face, opposite to the installation direction of the process cartridge, of the back side wall 14. FIG. 11a illustrates the initial state of the driving assembly before the process cartridge is installed, the intermediate force transmission component 213 is inclined relative to the axis L1 of the photosensitive member hub and the axis L3 of the rotational force receiving component 214, the axis L3 of the rotational force receiving component 214 makes offset relative to the axis L1 of the photosensitive member hub, and the first elastic element 217 is at a natural stretching state so that the sliding piece 216 is kept at the initial state, and at this moment the rotational force receiving component 214 is at a retracting state. When the process cartridge is installed along the shown Y direction, the process cartridge gradually gets close to the inner side face 141 of the electrophotographic image forming device; since the rotational force receiving component 214 is at the retracting state all the time, during the installation process of the process cartridge, the rotational force receiving component 214 cannot interfere with the rotational force driving head 11; the process cartridge is installed continuously, the end face 2161 of the sliding piece 216 is firstly contacted with the inner side face 141 of the electrophotographic image forming device, the inner side face 141 generates the effect of the force F for the sliding piece 161, and the action effect of the force F is opposite to the Y direction of the installation direction of the process cartridge; as shown in FIG. 11b, at this moment, the rotational force receiving component 214 is coaxial to the rotational force driving head 11, but the rotational force receiving component 214 and the rotational force driving head 11 are not engaged with each other and do not interfere with each other, and the rotational force receiving component is at the retracting state; the process cartridge is installed continuously, the force F promotes the sliding piece 216 to slide relative to the photosensitive member 211 along the opposite direction of the Y direction, and the intermediate force transmission component 213 is driven to be gradually straightened through the rotational force receiving component 214, and the intermediate force transmission component 213 promotes the rotational force receiving component 214 to extend out along the longitudinal direction of the process cartridge, namely in the X direction as shown in FIG. 11c, during the straightening process. FIG. 11c illustrates the state that the process cartridge is installed in place, namely the process cartridge is at the working state, at this moment, the rotational force receiving component 214 is engaged with the rotational force driving head 11, and the rotational force driving head 11, the rotational force receiving component 214 and the intermediate force transmission component 213 are all coaxial to the axis L1 of the photosensitive member hub. When the electrophotographic image forming device is started, the driving gear 13 rotates to drive the rotational force driving head 11 to rotate, and thus the force is transmitted to the photosensitive member so as to enable the photosensitive member to rotate through the rotational force receiving component 214, the intermediate force transmission component 213 and the photosensitive member hub 212.

FIG. 12a to FIG. 12c illustrate the schematic diagram of the process that the engagement between the driving assembly and the rotational force driving head is disengaged during the process that the process cartridge is disassembled from the electrophotographic image forming device. As shown in FIG. 12a, the process cartridge is disassembled from the electrophotographic image forming device along the direction (namely along the shown Y' direction) opposite to the installation direction (Y direction). During the process that the process cartridge is disassembled gradually, since the force F gradually withdraws, the direction of elastic restoring force generated by the first elastic element 217 is opposite to the disassembly direction of the process cartridge, the elastic restoring force generated by the first elastic element 217 acts on the sliding piece 216, and thus deflection of the intermediate force transmission component 213 occurs; as shown in FIG. 12b, meanwhile, the restoring force of the elastic element enables the sliding piece 216 to slide inside the sliding rail 2151 along the opposite direction of the disassembly direction of the process cartridge, then the rotational force receiving component 214 is driven to retract along the opposite direction (namely shown X' direction) of the X direction when the deflection of the intermediate force transmission component occurs, and the engagement between the driving assembly and the rotational force driving head 11 is disengaged, so that the acting force F is gradually weakened until disappears; and as shown in FIG. 12c, the process cartridge is disassembled continuously, and the contact between the process cartridge and the electrophotographic image forming device is completely disengaged.

Through the embodiment, the process cartridge does not interfere with the rotational force driving head during the process that the process cartridge is installed in the electrophotographic image forming device; during the installation or disassembly process of the process cartridge and during the process that the contact of the end face of the sliding piece and the inner side face of the electrophotographic image forming device is still kept, the rotational force receiving component 214 does not relatively move in the installation direction of the process cartridge relative to the rotational force driving head 11; and only the rotational force receiving component 214 relatively moves in the axial direction relative to the rotational force driving head 11, and is engaged or disengaged with the rotational force driving head 11, thus the process cartridge is successfully installed.

Embodiment 2

FIG. 13 to FIG. 17 illustrate the second embodiment of the present invention.

Figure 13:
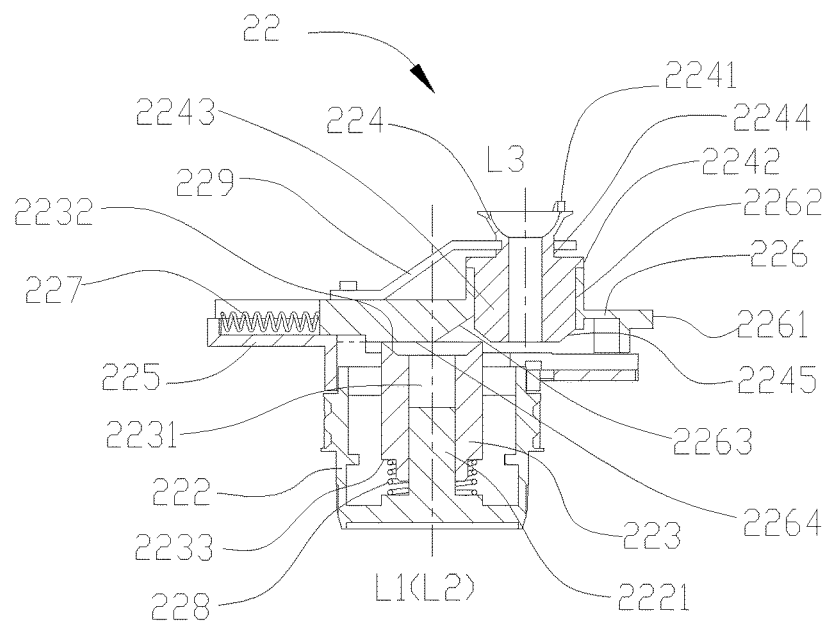
FIG. 13 illustrates a section view of a second embodiment in the present invention.
Figure 14:
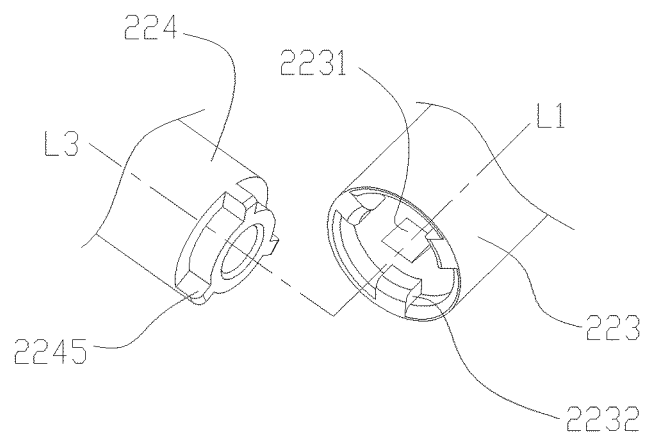
FIG. 14 illustrates a structure view of the force transmission part in the second embodiment.

FIG. 13 illustrates an assembly view of the driving assembly 22 in the second embodiment, 222 is a photosensitive member hub and has the axis L1, and a raised non-circular pin 2221 is arranged at the interior of the photosensitive member hub; 223 is an intermediate force transmission component and has the axis L2, the axis L2 is coaxial to the axis L1, a non-circular inner hole 2231 is further formed in the intermediate force transmission component, a plurality of protruding parts 2232 are arranged at the end of the intermediate force transmission component, and a boss surface 2233 is arranged on the outer circumference of the intermediate force transmission component; the intermediate force transmission component 223 is arranged inside the photosensitive member hub 222, and is matched with the pin 2221 inside the photosensitive member hub through the inner hole 2231 to transmit the force; a second elastic element 228 is arranged between the intermediate force transmission component 223 and the photosensitive member hub 222, one end of the second elastic element 228 abuts against the boss surface 2233 of the intermediate force transmission component 223, and the other end of the second elastic element 228 abuts against the interior of the photosensitive member hub 222; a side plate 225 is provided at one end of the photosensitive member hub 222, and is fixedly provided at the cartridge frame; a sliding piece 226 is arranged on the side plate 225, a sliding groove is formed in the side plate 225, and the assembly condition is the same as that in the first embodiment, an inner hole 2262 is formed in the sliding piece 226, a first elastic element 227 is arranged between the sliding piece 226 and the side plate 225, one end of the first elastic element 227 abuts against the sliding piece 226 and the other end of the first elastic element 227 abuts against the side plate 225, and the first elastic element 227 acts on the sliding piece 226 and enables it to be at the initial state of offset relative to the axis L1 of the photosensitive member hub; an inclined surface 2263 and a bottom surface 2264 are further arranged on the inner bottom surface of the sliding piece 226, the inclined surface 2263 can act on the end of the intermediate force transmission component 223 under the effect of the first elastic element 227, so that axial movement is generated, and the bottom surface 2264 can enable the intermediate force transmission component 223 to be kept at the retracting state; 224 is the rotational force receiving component engaged with the rotational force driving head provided inside the electrophotographic image forming device to transmit the force and has the axis L3, a force receiving part is arranged at one end of the rotational force receiving component 224, a claw 2241 capable of being engaged with the rotational force driving head to transmit the force is arranged on the rotational force receiving component, a boss 2242 is arranged on the outer circumference, the boss 2242 is used for abutting against one end face of the sliding piece 226, the neck part 2244 is used for connecting the boss 2242 with the force receiving part, a cylinder part 2243 is arranged at the other end of the rotational force receiving component 224, the cylinder part 2243 is matched with the inner hole 2262 inside the sliding piece 226, and the cylinder part is provided with a plurality of protruding column parts 2245 (as shown in FIG. 14) in the circumference direction of the cylinder part; 229 is a third elastic element, wherein one end of the third elastic element is fixedly arranged on the sliding piece 226, and the other end of the third elastic element is locked on the neck part 2244 of the rotational force receiving component 224.

Figure 15:
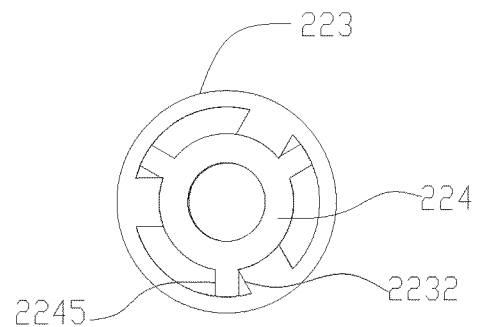
FIG. 15 illustrates an engaged cross section view of the force transmission part in the second embodiment.

FIG. 14 illustrates a specific structure view of engaged force transmission between the intermediate force transmission component 223 and the rotational force receiving component 224. As shown in the figure, a plurality of protruding parts 2232 are arranged on the inner circumference of the intermediate force transmission component 223, and correspondingly, a plurality of protruding column parts 2245 are arranged on the outer circumference of the rotational force receiving component 224; when the intermediate force transmission component 223 is engaged with the rotational force receiving component 224, the protruding parts 2232 and the protruding column parts 2245 are mutually engaged so that mutual force transmission can be realized. FIG. 15 illustrates a cross section view of an engaged part when intermediate force transmission component 223 is engaged with the rotational force receiving component 224.

The following describes the process that the process cartridge utilizing the driving assembly of the second embodiment is installed in the electrophotographic image forming device and disassembled from the electrophotographic image forming device in detail.

FIG. 16a to FIG. 16c illustrate the schematic diagram of the process that the driving assembly is engaged with the rotational force driving head when the process cartridge is installed in the electrophotographic image forming device. FIG. 16a illustrates a view of the initial state that said driving assembly 22 is installed on the process cartridge, the intermediate force transmission component 223 is kept at the retracting state under the effect of the sliding piece 226, and the second elastic element 228 is at a compressed state; and under the effects of the first elastic element 227 and the sliding piece 226, the rotational force receiving component 224 is kept at the offset state relative to the axis L1 of the photosensitive member hub. The process cartridge is installed in the electrophotographic image forming device along the Y direction, the end face 2261 of the sliding piece 226 is firstly contacted with the inner side face 141 of the electrophotographic image forming device, and at this moment, as shown in FIG. 16b, the inner side face 141 generates acting force F with a direction opposite to the installation direction of the process cartridge for the sliding piece 226. The process cartridge is continuously installed, under the effect of the force F, the first elastic element 227 is gradually compressed, the sliding piece 226 overcomes the elastic force of the first elastic element 227 to slide relatively along the direction opposite to the installation direction of the process cartridge, and drives the rotational force receiving component 224 to relatively move along the direction opposite to the installation direction of the process cartridge, and at this moment, the intermediate force transmission component gets close to the inner side face of the electrophotographic image forming device together with the process cartridge along with the installation of the process cartridge, namely the intermediate force transmission component 223 moves relative to the rotational force receiving component 224, and the axes L2 and L3 get close to each other; along with the installation of the process cartridge, during the sliding process of the sliding piece, the contact between the bottom surface 2264 of the sliding piece 226 and the end face of the intermediate force transmission component 223 is gradually disengaged, and the intermediate force transmission component 223 extends out along the longitudinal direction (namely the shown X direction) of the process cartridge under the effect of the elastic restoring force of the second elastic element 228. When the process cartridge is installed in place, as shown in FIG. 16c, FIG. 16c illustrates the working state of the driving assembly 22. The intermediate force transmission component 223 extends out along the shown X direction under the effect of the elastic restoring force of the second elastic element 228, and is engaged with the rotational force receiving component 224; after the intermediate force transmission component 223 and the rotational force receiving component 224 are engaged, the intermediate force transmission component goes on extending out, and promotes the rotational force receiving component 224 to extend out along the X direction all together to be engaged with the rotational force driving head 11 arranged inside the electrophotographic image forming device. At this moment, the photosensitive member hub 222, the intermediate force transmission component 223, the rotational force receiving component 224 and the rotational force driving head 11 are all coaxial. After the electrophotographic image forming device is started, the rotational force driving head 11 is driven to rotate by the driving gear 13, the rotational force driving head is engaged with the claw 2241 of the rotational force receiving component 224 so as to transmit the force to the rotational force receiving component 224, and rotational force is transmitted to the photosensitive member hub through the engagement between the rotational force receiving component 224 and the intermediate force transmission component 223 and the engagement between the intermediate force transmission component 223 and the photosensitive member hub, and thus the purpose (the photosensitive member hub and the photosensitive member is in close fit and are coaxial) of driving the photosensitive member to rotate by the photosensitive member hub 222 is achieved.

FIG. 17a to FIG. 17c illustrate the schematic diagram of the process that the engagement between the driving assembly and the rotational force driving head is disengaged during the process that the process cartridge is disassembled from the electrophotographic image forming device. As shown in FIG. 17a, the process cartridge is disassembled along the direction (namely the shown Y' direction) opposite to the installation process of the process cartridge. Along with the disassembly of the process cartridge, the force F of the inner side face 141 of the electrophotographic image forming device to the sliding piece 226 is gradually weakened and even disappears, the sliding piece 226 slides along the direction opposite to the disassembly direction of the process cartridge under the effect of the elastic restoring force of the first elastic element 227, the inclined surface 2263 acts on the intermediate force transmission component 223 and enables the intermediate force transmission component 223 to be retracted along the direction of the axis L1, and meanwhile the second elastic element 228 is compressed; during the process that intermediate force transmission component 223 is retracted, the engagement between the intermediate force transmission component 223 and the rotational force transmission component 224 is gradually disengaged, and when the bottom surface 2264 of the sliding piece 226 abuts against the end face of the intermediate force transmission component 223, the intermediate force transmission component can be kept at the retracted state; after the engagement between the intermediate force transmission component 223 and the rotational force receiving component 224 is disengaged, as shown in FIG. 17b, the rotational force transmission component 224 is retracted along the opposite direction (namely the shown X' direction) of the X direction under the effect of the third elastic element 229. The process cartridge is continuously disassembled, the contact between the process cartridge and the electrophotographic image forming device is completely disengaged, and as shown in FIG. 17c, the process cartridge is disassembled from the electrophotographic image forming device.

Embodiment 3

FIG. 18 to FIG. 21 illustrate the third embodiment of the present invention.

Figure 18:
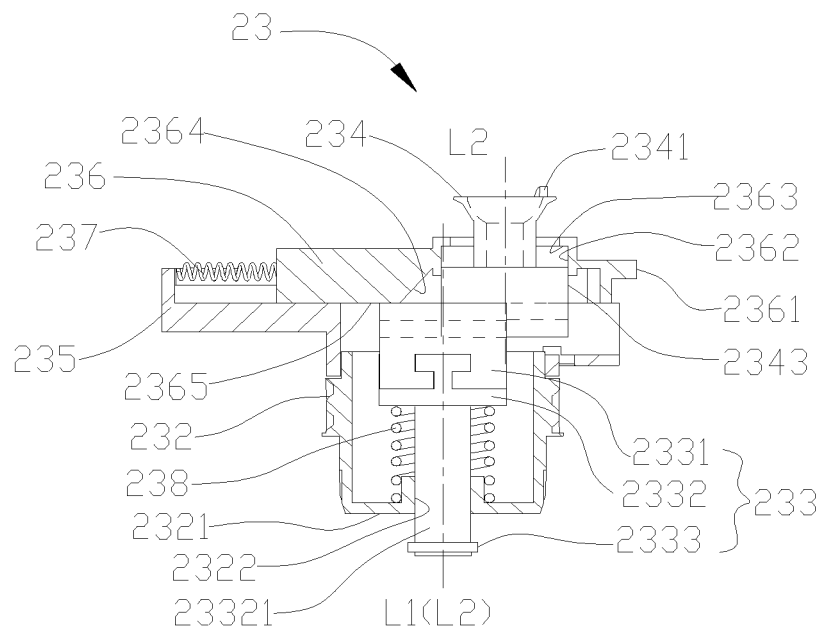
FIG. 18 illustrates a section view of a third embodiment in the present invention.

FIG. 18 is an assembly view of the driving assembly 23 in the third embodiment. 232 is a photosensitive member hub provided at one end of the photosensitive member in the longitudinal direction, the photosensitive member hub 232 has the axis L1, the cavity is formed in the interior of the photosensitive member hub 232, a bottom 2321 is further arranged, and a non-circular hole 2322 is formed in the bottom; 233 is the intermediate force transmission component, and the intermediate force transmission component 233 has the axis L2, is arranged in the photosensitive member hub 232, and is coaxial to the photosensitive member hub; the intermediate force transmission component 233 comprises three parts which are an intermediate connecting piece 2331, an end connecting piece 2332 and a pin 2333, and the pin can axially limit the intermediate force transmission component 233; 234 is the rotational force receiving component, a rotational force receiving end is arranged on the rotational force receiving component 234, a claw 2341 capable of being engaged with the rotational force driving head arranged inside the electrophotographic image forming device to transmit the force is arranged on the rotational force receiving end, a cylinder part 2343 is arranged at the other end of the rotational force receiving component, and the other end of the rotational force receiving component is connected with the intermediate connecting piece 2331; a side plate 235 is provided at one end of the photosensitive member hub, a sliding piece 236 is further arranged on the side plate 235, a sliding groove is formed in the side plate 235, the setting condition of the sliding piece 236 on the side plate 235 is the same as that in the first embodiment; a first elastic element 237 is arranged between the side plate 235 and the sliding piece 236, one end of the first elastic element 237 abuts against the side plate 235, and the other end of the first elastic element 237 abuts against the sliding piece 236; the sliding piece 236 is provided with an end face 2361, an inner hole 2362, an inner end face 2363, an inclined surface 2364 and a bottom surface 2365; the rotational force receiving component 234 is arranged in the inner hole 2362 of the sliding piece 236 in a penetrated manner, the cylinder part 2343 is matched with the inner hole 2362, and the rotational force receiving component 234 can slide relative to the inner hole 2362; under the effect of the first elastic element 237, the sliding piece 236 is kept at an offset state relative to the axis L1 of the photosensitive member hub 232; one end of a second elastic element 238 abuts against the bottom 2321 of the photosensitive member hub 232, and the other end of the second elastic element 238 abuts against the end connecting piece 2332 of the intermediate force transmission component 233; when the sliding piece 236 is at the offset state, the bottom surface 2365 of the sliding piece 236 abuts against one part of the intermediate force transmission component 233, so that the intermediate force transmission component 233 is integrally at the retracted state, and the second elastic element 238 is at a compressed state; and since the rotational force receiving component 234 is connected with the intermediate connecting piece 2331, the rotational force receiving component 234 is subjected to the traction of the intermediate connecting piece 2331 and is also at the retracted state. FIG. 18 illustrates the initial state of the driving assembly 23.

Figure 19:
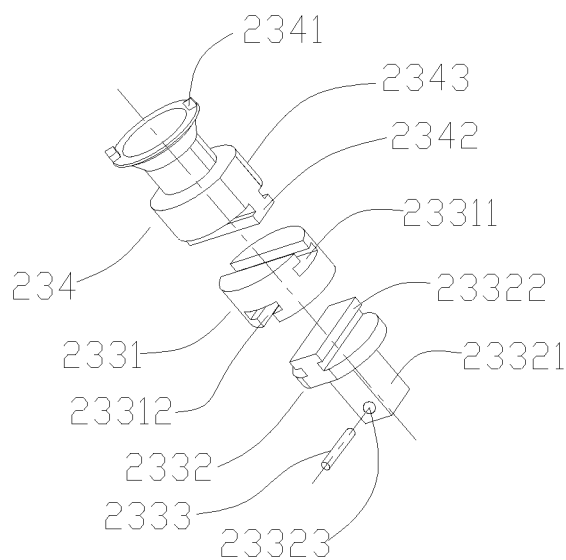
FIG. 19 illustrates a structure view of the force transmission part in the third embodiment.

FIG. 19 illustrates the specific structure and connection relation between the intermediate force transmission component 233 and the rotational force receiving component 234. Limit guide rails with limit effect are arranged at the two ends of the intermediate connecting piece 2331 and are respectively arranged to be grooves 23311 and 23312, and the two grooves are arranged perpendicular to each other and can be arranged to be of T-shaped groove structures; a key 23322 capable of being matched with the groove 23312 is arranged at one end of the end connecting piece 2232, said key is a T-shaped key correspondingly, a non-circular column 23321 is arranged at the other end of the end connecting piece 2232, the non-circular column 23321 can be matched with the non-circular hole 2322 inside the photosensitive member hub 232 to transmit the force, and a hole 23323 is formed in the non-circular column 23321 for putting the pin 2333; a force receiving part is arranged at one end of the rotational force transmission component 234, the claw 2341 is arranged at the end of the rotational force transmission component 234, and a T-shaped key 2342 capable of being matched with the T-shaped groove 23311 is arranged at the other end of the rotational force transmission component 234. Each of the connection between the intermediate connecting piece 2331 and the end connecting piece 2332 and the connection between the intermediate connecting piece 2331 and the rotational force transmission component 234 has the function of a coupling; the T-shaped keys and the T-shaped grooves can slide relatively; the shape of T has a limiting effect, and can prevent mutual disengaging between components.

Assuredly, in the embodiment, the T-shaped grooves can also be respectively arranged on the rotational force receiving component 234 and on the end connecting piece 2332, and correspondingly the T-shaped keys are arranged on the two ends of the intermediate connecting piece 2331.

The matching between said T-shaped grooves and said T-shaped keys is only a preferable embodiment of the present invention, and can also be other embodiments, and said T shapes can be symmetrical and can also be asymmetrical; said keys and said grooves can be in plane contact and can also be in arc surface contact. While the matching between the keys and the grooves needs relative sliding, certain limit effect exists in the axial direction of each component, and the force can be transmitted in a mutually matched manner.

In the embodiment, the non-circular hole and the non-circular column are used for transmitting the force in a mutually matched manner, said non-circular hole is arranged to be a square hole, and said non-circular column is arranged to be a direction column.

The following describes the process that the process cartridge utilizing the driving assembly of the third embodiment is installed in the electrophotographic image forming device and disassembled from the electrophotographic image forming device in detail.

Figures 20A, 20B, 20C:
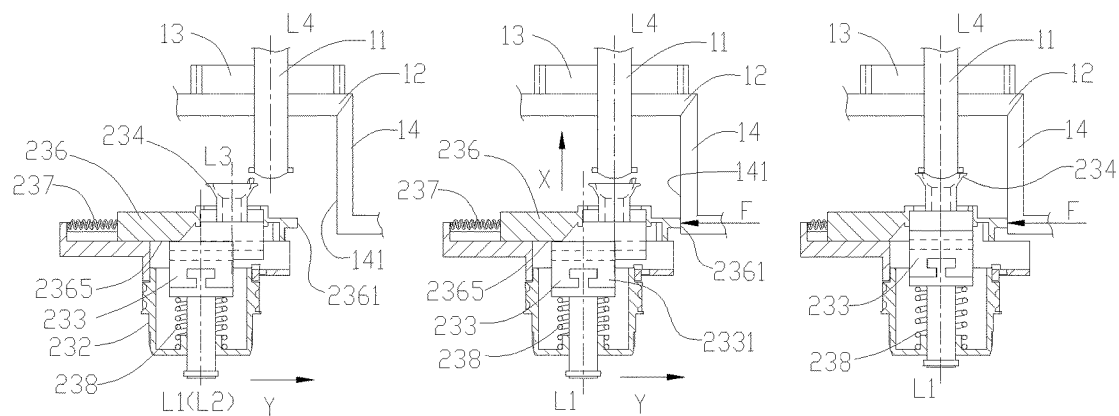
FIG. 20a illustrates a schematic diagram of the installation process of the process cartridge in the third embodiment.
FIG. 20b illustrates a schematic diagram of the installation process of the process cartridge in the third embodiment.
FIG. 20c illustrates a schematic diagram that the process cartridge is installed in place in the third embodiment.

FIG. 20a to FIG. 20c illustrate the schematic diagram of the process that the driving assembly is engaged with the rotational force driving head when the process cartridge is installed in the electrophotographic image forming device. FIG. 20a illustrates a view that the driving assembly 23 is at the initial state, the axis of the rotational force receiving component 234 is L3, at this moment, the axis L3 makes offset relative to the axis L1 of the photosensitive member hub and the axis L2 of the intermediate force transmission component, the process cartridge is installed along the shown Y direction, and when the driving assembly is at the initial state, the rotational force receiving component 234 is at the retracted state, so that when the process cartridge is installed, the rotational force receiving component 234 dose not interfere with the rotational force driving head 11 arranged inside the electrophotographic image forming device. As shown in FIG. 20a, 12 is the right side wall of the electrophotographic image forming device, 14 is the back side wall of the electrophotographic image forming device, the rotational force driving head 11 is arranged on the right side wall 12, and the driving gear 13 is used for driving the rotational force driving head 11 to rotate. The process cartridge is installed along the Y direction, the end face 2361 of the sliding piece 236 is firstly contacted with the back side face 141 of the electrophotographic image forming device, and the back side wall 14 generates the acting force F to the sliding piece 236, as shown in FIG. 20b. The process cartridge is continuously installed, under the effect of the acting force F, the sliding piece 236 slides along the direction opposite to the installation direction of the process cartridge, and the first elastic element 237 is gradually compressed; when the sliding piece 236 moves to a certain degree, the contact between the bottom surface 2365 of the sliding piece 236 and the intermediate connecting piece 2331 is disengaged, the intermediate force transmission component 233 can extend out along the direction of the axis L1 of the photosensitive member hub under the effect of the elastic restoring force of the second elastic element 238, and meanwhile the rotational force receiving component 234 is pushed to extend out along the longitudinal direction (namely the shown X direction) of the process cartridge; and after the process cartridge is installed in place, the rotational force receiving component 234 extends out to be engaged with the rotational force driving head 11 inside the electrophotographic image forming device, as shown in FIG. 20c, namely the driving assembly is at the working state. After the electrophotographic image forming device is started, the rotational force driving head 11 is driven to rotate by the driving gear 13, the rotational force receiving component 234 is driven to rotate, and thus the photosensitive member hub 232 is driven to rotate by the intermediate force transmission component, and finally the photosensitive member arranged in the process cartridge is driven to rotate by the photosensitive member hub 232. At this moment, axes of the photosensitive member 231, the photosensitive member hub 232, the rotational force receiving component 234 and the rotational force driving head 11 are basically coaxial.

Figures 21A, 21B, 21C:
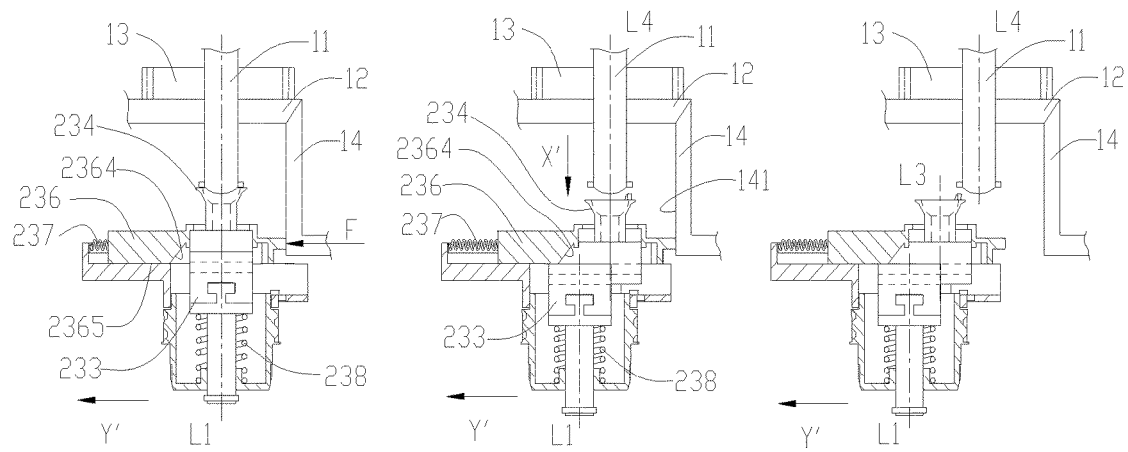
FIG. 21a illustrates a schematic diagram of the disassembly process of the process cartridge in the third embodiment.
FIG. 21b illustrates a schematic diagram of the disassembly process of the process cartridge in the third embodiment.
FIG. 21c illustrates a schematic diagram of the disassembly process of the process cartridge in the third embodiment.

FIG. 21a to FIG. 21c illustrate the schematic diagram of the process that the engagement between the driving assembly and the rotational force driving head is disengaged during the process that the process cartridge is disassembled from the electrophotographic image forming device. As shown in FIG. 21a, the process cartridge is disassembled from the electrophotographic image forming device along the direction (namely the shown Y' direction) opposite to the installation process of the process cartridge. Along with the movement of the process cartridge, the acting force F of the back side wall 14 to the sliding piece 236 is gradually weakened and even disappears, the sliding piece 236 moves along the direction opposite to the disassembly direction of the process cartridge under the effect of the elastic restoring force of the first elastic element 237, and the rotational force receiving component 234 is driven to slide, so that the rotational force receiving component 234 makes offset relative to the axis of the intermediate force transmission component 233; meanwhile, during the sliding process of the sliding piece 236, the inclined surface 2364 of the sliding piece 236 abuts against the part of the intermediate force transmission component 233, the intermediate force transmission component 233 is promoted to overcome the retraction of the elastic force of the second elastic element 238, and meanwhile the intermediate force transmission component 233 drives the rotational force receiving component 234 to be retracted along the shown X' direction as shown in FIG. 21b during the moving process of the process cartridge. As shown in FIG. 21b, the initial state of the driving assembly 23 is restored, the engagement between the rotational force receiving component 234 and the rotational force driving head 11 of the electrophotographic image forming device is disengaged, and then the process cartridge is successfully disassembled from the electrophotographic image forming device, as shown in FIG. 21c.

In the scheme of the present invention, if the distance between the axis L4 of the rotational force driving head 11 inside the electrophotographic image forming device and the inner side face 141 inside the electrophotographic image forming device is h1, since the rotational force receiving component 214 (224 or 234) extends out along the longitudinal direction of the process cartridge to be engaged with said rotational force driving head 11 to transmit the force, in order to guarantee successful engagement between the rotational force receiving component and the rotational force driving head, the distance h2 between the axis L3 of said rotational force receiving component and the end face 2161 (2261 or 2361) of said sliding piece 216 (226 or 236) is set to be equal to h1, as shown in FIG. 11a and FIG. 11b. The distance between the axis L4 of the rotational force driving head 11 in said electrophotographic image forming device and the inner side face 141 in the electrophotographic image forming device is h1, namely the distance between the axis L4 and the acting point of the external acting force F.

Through the embodiment of the present invention, the process cartridge can be successfully installed in the electrophotographic image forming device but does not generate the interference problem that the process cartridge cannot be installed in place with the rotational force driving head of the electrophotographic image forming device.

FIG. 22 to FIG. 25 illustrate the fourth embodiment of the present invention.

The driving assembly of the fourth embodiment comprises the same structure in the first embodiment, and the difference is that a buffer piece 99 is additionally arranged in the driving assembly 21. During the process that the rotational force receiving component 214 is contacted and engaged with the rotational force driving head 11, the rotational force receiving component 214 has certain pressure buffer capacity.

As shown in FIG. 22 and FIG. 23, a recess 214a is formed in one end of the rotational force receiving component 214, and a sliding groove 214b is formed in the outer surface of the rotational force receiving component 214; a through hole 2133a is formed in the surface of the second end spherical part 2133 of the intermediate force transmission component 213. The connection relation between the rotational force receiving component 214 and the intermediate force transmission component 213 is that the buffer piece 99 is provided in the recess 214a, the sliding groove 214b of the rotational force receiving component 214 and the through hole 2133a of the second end spherical part 2133 are penetrated through by a positioning pin 98. After the rotational force receiving component 214 and the intermediate force transmission component 213 are assembled, the buffer piece 99 is at a slightly compressed state, so that the elastic force of the buffer piece 99 always acts on the rotational force receiving component 214 and the intermediate force transmission component 213.

Figure 25:
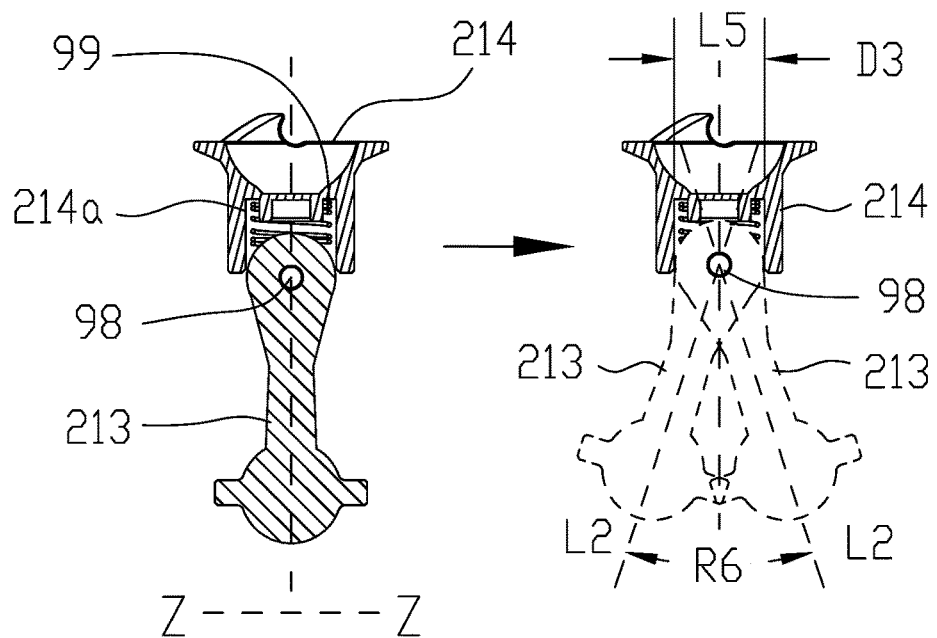

FIG. 24 and FIG. 25 illustrate action schematic diagram of the intermediate force transmission component 213 after the rotational force receiving component 214 and the intermediate force transmission component 213 are assembled. FIG. 24 illustrates a section view in the Y direction after the rotational force receiving component 214 and the intermediate force transmission component 213 are assembled. Because of the width D1 of the sliding groove 214b and the structure of the second end spherical part 2133, the positioning pin 98 arranged at one end of the intermediate force transmission component 213 is limited in the sliding groove 214b, and the intermediate force transmission component 213 can realize inclined pendulum motion relative to the rotational force receiving component 214, namely the axis L2 of the intermediate force transmission component 213 can incline relative to the axis L5 of the rotational force receiving component 214. The larger the width D1 of the sliding groove 214b is, the larger the inclined pendulum range R5 of the intermediate force transmission component 213 is. FIG. 25 illustrates the section view in the Z direction (the Z direction is basically vertical to the Y direction) after the rotational force receiving component 214 and the intermediate force transmission component 213 are assembled, the intermediate force transmission component 213 can realize inclined pendulum motion relative to the rotational force receiving component 214, namely, the intermediate force transmission component 213 can rotate around the positioning pin 98, and similarly, the axis L2 of the intermediate force transmission component 213 can incline relative to the axis L5 of the rotational force receiving component 214. The inner diameter D3 of the recess 214a of the rotational force receiving component 214 limits the pendulum range of the intermediate force transmission component 213, and the larger the inner diameter D3 of the recess 214a is, the larger the inclined pendulum range R6 of the intermediate force transmission component 213 is.

Said buffer piece 99 is arranged in the driving assembly 21, and enables the rotational force receiving component 214 to have certain pressure buffer capacity. During the process that the driving assembly 21 is engaged with the rotational force driving head 11 (refer to FIG. 11a to FIG. 11c), since the rotational force receiving component 214 extends out, even if certain probability that the top of the claw 2141 structurally interferes with or rigidly collides with the forefront ends of the transmission pins 111 mutually exists, the claw 2141 can obtain the stress of the transmission pins 111 at the same time so that the rotational force receiving component 214 realizes inward retracted movement relative to the intermediate force transmission component 213 to prevent from generating further mutual interference with the transmission pins 111, and the claw 2141 obtains certain pressure buffer in virtue of the telescopic elastic force of the buffer piece 99 to prevent from being damaged by rigid collision. When the rotational force driving head 11 begins to operate, the transmission pins 111 can prevent from being contacted with the top of the claw 2141 because of the rotation, the stress of the claw 2141 disappears, and the rotational force receiving component 214 is not compressed any longer and obtains the elastic force of the buffer piece 99, so that the rotational force receiving component 214 extends outwards relative to the intermediate force transmission component 213 to realize the engagement with the rotational force driving head 11 so as to receive the power.

Said buffer piece 99 can be a spring or elastic sponge or elastoplastic.

Said positioning pin 98 can be replaced by a latching structure.

Figure 26:
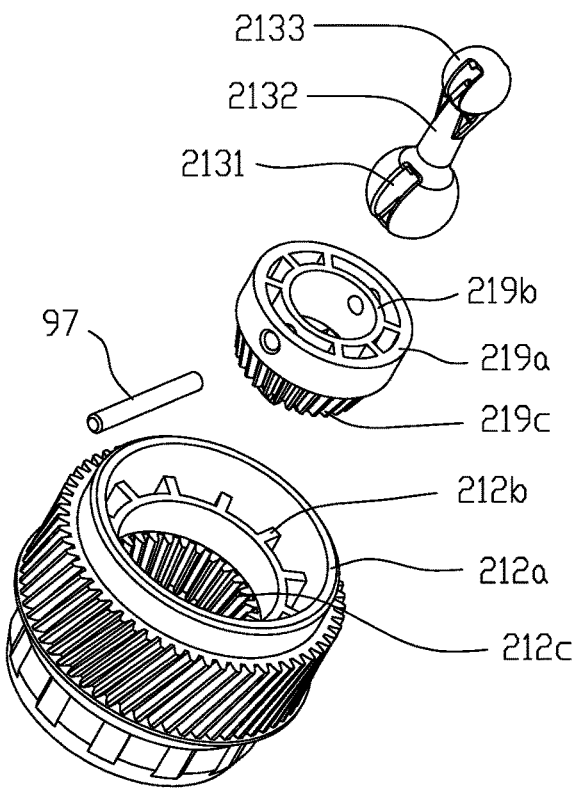
FIG. 26 illustrates a partial assembly schematic diagram of the driving assembly in a fifth embodiment.
Figure 27:
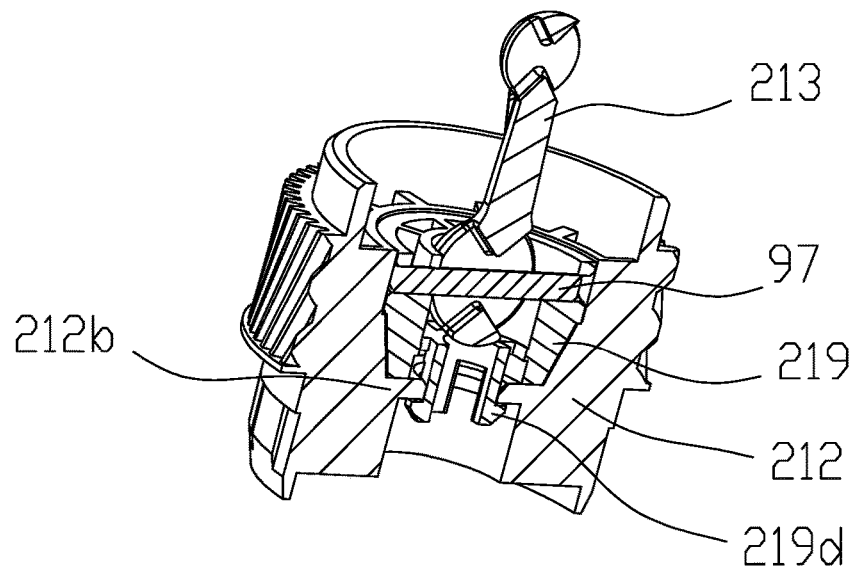
FIG. 27 illustrates a partial section view of the driving assembly in the fifth embodiment.

FIG. 26 to FIG. 27 illustrate the fifth embodiment of the present invention.

The driving assembly of the fifth embodiment comprises same elements in the first embodiment or the fourth embodiment, and the difference is the connection manner of the driving assembly and an end gear of a photosensitive drum. Specifically, As shown in FIG. 26 and FIG. 27, a connecting column 219 may comprise an inner ring 219*b* and an outer ring 219*a*, and said inner ring 219*b* and said outer ring 219*a* can be connected through a connecting rib.

The outer ring 219*a* of the connecting column 219 is provided with outer conical teeth 219*c*, namely the outer ring 219*a* of the connecting column 219 is a circular cone inclined surface, and the outer conical teeth 219*c* are arranged on the circular cone inclined surface. The inner ring 212*b* of the photosensitive member hub 212 is provided with inner conical teeth 212*c* matched with the outer conical teeth 219*c*, namely the inner ring 212*b* of the photosensitive member hub 212 is an inversely circular cone inclined surface, and the inner conical teeth 212*c* are arranged on the inversely circular cone inclined surface. As said guiding mechanisms, the outer conical teeth 219*c* and the inner conical teeth 212*c* enable the connecting column 219 to be installed in the photosensitive member hub 212. The connecting column 219 is arranged in the inner ring 212*b* of the photosensitive member hub 212 in a penetrated manner, and the outer conical teeth 219*c* is engaged with the inner conical teeth 212*c* so as to drive the photosensitive member hub 212 to rotate. On the other hand, the outer conical teeth 219*c* and inner conical teeth 212*c* also achieve the guiding effect when the connecting column 219 is arranged in the inner ring of the photosensitive member hub 212 in a penetrated manner. Here, the connecting column 219 and the photosensitive member hub 212 can be fixedly connected in an adhesive bonding or welding manner, or, a first claw 219*d* can be arranged on the inner ring 219*b* of the connecting column 219, and when the connecting column 219 is arranged in the inner ring 212*b* of the photosensitive member hub 212 in a penetrated manner from the top down, the first claw 219*d* is clamped on the inner ring 212*b* of the photosensitive member hub 212 from the inside to outside from the lower part of the inner ring 212*b* of the photosensitive member hub 212, so that the connecting column 219 cannot be disengaged from the photosensitive member hub 212 upwards. The outer surface of one end, connected with the intermediate force transmission component 213, of the connecting column 219 can be arranged to be a cylinder surface, and a through hole for being penetrated through by the connecting pin 97 is formed in the cylinder surface.

The connecting column 219 obtained by adopting said technical scheme is clamped on the photosensitive member hub 212 by adopting the first claw 219*d*, the outer conical teeth 219*c* are arranged on the outer ring of the connecting column 219, the inner conical teeth 212*c* are arranged on the inner ring of the photosensitive member hub 212, the transmission of rotational torque for the connecting column 219 to the photosensitive member hub 212 is realized in the manner that the outer conical teeth 219*c* are engaged with the inner conical teeth 212*c*, and firm connection among the intermediate force transmission component 213, the connecting column 219 and the photosensitive member hub 212 is further realized, so that the intermediate force transmission component 213 and the connecting column 219 are unlikely to be disengaged from the photosensitive member hub 212, the failure rate of the driving assembly is reduced, and the stability is improved.

On the basis of the technical scheme, the diameters of openings at the two ends of the through hole of the first end spherical part 2131 on the intermediate force transmission component 213 can be greater than that of the through hole; FIG. 27 illustrates the section view of the intermediate force transmission component 213, and the two ends of the through holes are fan-shaped, so that the angle range of relative rotation between the intermediate force transmission component 213 and the connecting column 219 is greater, and the rotation is more flexible. Similarly, the diameters of openings at the two ends of the through hole of the second end spherical part 2133 on the intermediate force transmission component 213 can be greater than that of the through hole, and the two ends of the through hole are approximately fan-shaped, so that the angle range of relative rotation between the intermediate force transmission component 213 and the rotational force receiving component 214 is greater, and the rotation is more flexible.

In the following Embodiment Six to Embodiment Eleven:

The axial direction of the process cartridge is substantially coaxial with or parallel to the axis of rotation of a developing member.

The installation direction of the process cartridge in the electrophotographic image forming device is substantially perpendicular to the axial direction.

The detaching (removing) direction of the process cartridge in the electrophotographic image forming device is opposite to the installation direction of the process cartridge.

(Process Cartridge)

Figure 28:
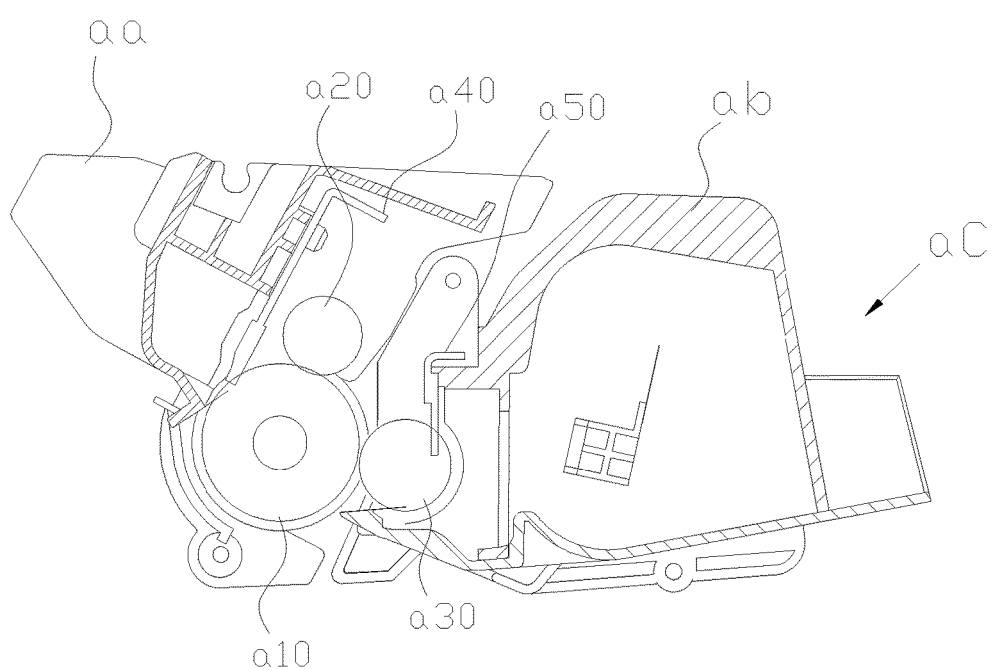
FIG. 28 is a schematic sectional diagram of a process cartridge from Embodiment Six in Embodiment Eleven.

As shown in FIG. 28, which is a schematic structural diagram of a process cartridge aC in an electrophotographic image forming device (not shown), the process cartridge aC includes a housing (a first housing aa and a second housing ab) and side walls ab1 and ab2 at two ends of the housing, the first housing aa is provide in its interior with a charging member a20, a cleaning member a40, a photosensitive member a10 etc, and the second housing ab is provide in its interior with a developing member a30, a toner controlling member a50, developing agent etc.

Rotational Force Driving Assembly

Embodiment Six

Figure 29:
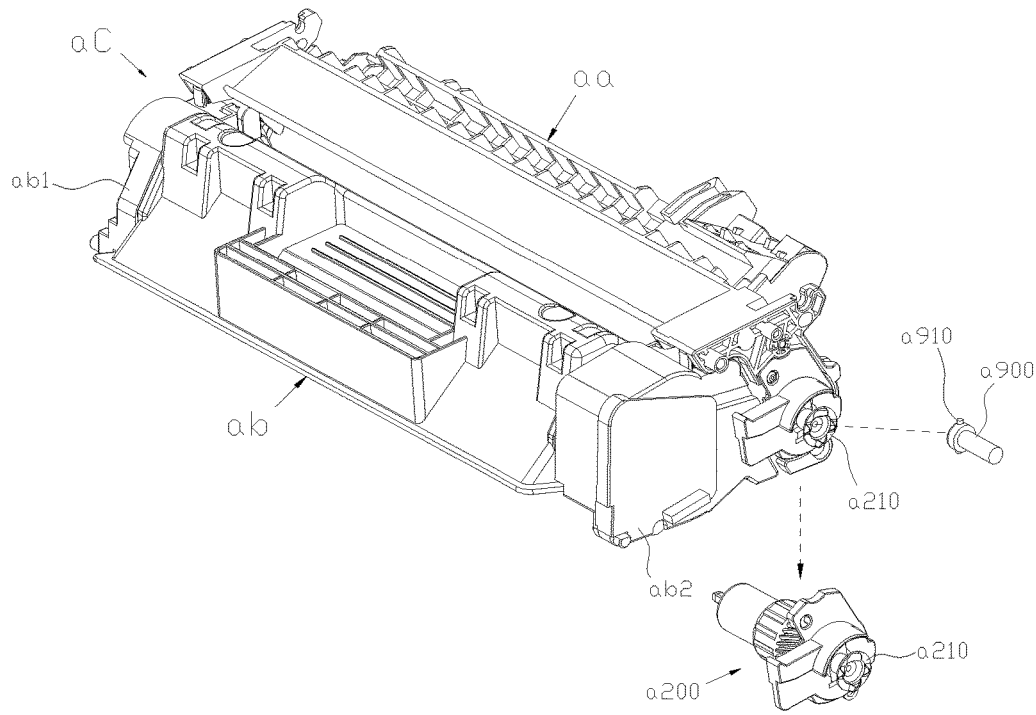
FIG. 29 is a schematic structural diagram of the process cartridge and its rotational force driving assembly in Embodiment Six to Embodiment Eleven.

As shown in FIG. 29, a rotational force driving assembly a200 is arranged at one end of the axial direction of the process cartridge aC and participates in developing processing of the electrophotographic image forming device through that the rotational force driving assembly a200 of the process cartridge engages with a driving head a900 in the electrophotographic image forming device and then a rotational driving force is transmitted into the process cartridge aC and then drives the developing member in the process cartridge aC to operate.

As shown from FIG. 29 to FIG. 35*b*, the rotational force driving assembly a200 is arranged at one end of the axial direction of the process cartridge aC, and the rotational force driving assembly a200 includes a baffle plate a290, a coupling component a210, a pressing component a220, a sliding piece a230, an elastic member a250, a transmitting component a270 and a force transmission portion a260. The coupling component a210 is provided with connecting part a216, a projection a211 provided at one end of the connecting part a216 and configured to abut and engage with a driving pin a910 of the driving head a900, and a sliding groove a215 provided at the other end of the connecting part a216; the middle portion of the connecting part a216 is also provided with a latching slot a218 and a limiting surface a212. The pressing component a220 is of a hollow frame structure, a sliding surface a224 is provided on the outer surface of the pressing component a220; a pressed part a221 is provided on the upper end of the pressing component a220, and the pressed part a221 has some curved surfaces or bevels; a pressing surface a222 is provided at a bottom surface of a pair of long sliding blocks a223 of the pressing component a220 which are protruded inwardly; and a limiting protrusion a225 is provided on the lower end of the pressing component a220. The sliding piece a230 is of a trapezoid structure with the narrow top and wide bottom, an upper surface of the sliding piece a230 is a positioning surface a235 which abuts and engages with the limiting surface a212 of the coupling component a210; a lateral surface of the sliding piece a230 is provided with an inclined bevel sliding surface a231 and the two lateral surfaces are provided with a sliding groove a232; and a through hole a236 is further provided in the sliding piece a230. The middle portion of the baffle plate a290 is provided with an hole a299; an inwardly inclined bevel a291 and a vertical sliding surface a294 are provided surround the hole a299, and the bevel a291 is arranged inclined so that the hole a299 is of a structure with narrow outer and wide inner (in FIG. 34b, aW2 is larger than aW1) on the baffle plate a290; and the limiting surface a295 is provided on the bottom end of the sliding surface a294 and cooperates with the limiting protrusion a225 of the pressing component a220 for limiting. The transmitting component a270 is of a cylindrical structure and is provided with a cavity a272 in its interior; the surface of the transmitting component a270 is provided with a gear surface a271 for transmitting a driving force; the bottom portion of the cavity a272 has a bottom surface a275; a (a pair of) limiting sliding groove(s) a273 is provided in the cavity a272; and the limiting sliding groove a273 is formed by two protrusions and is provided with a sliding groove in the middle portion. The connecting part a260 is of a cranked structure with the middle portion protruded.

Figure 30:
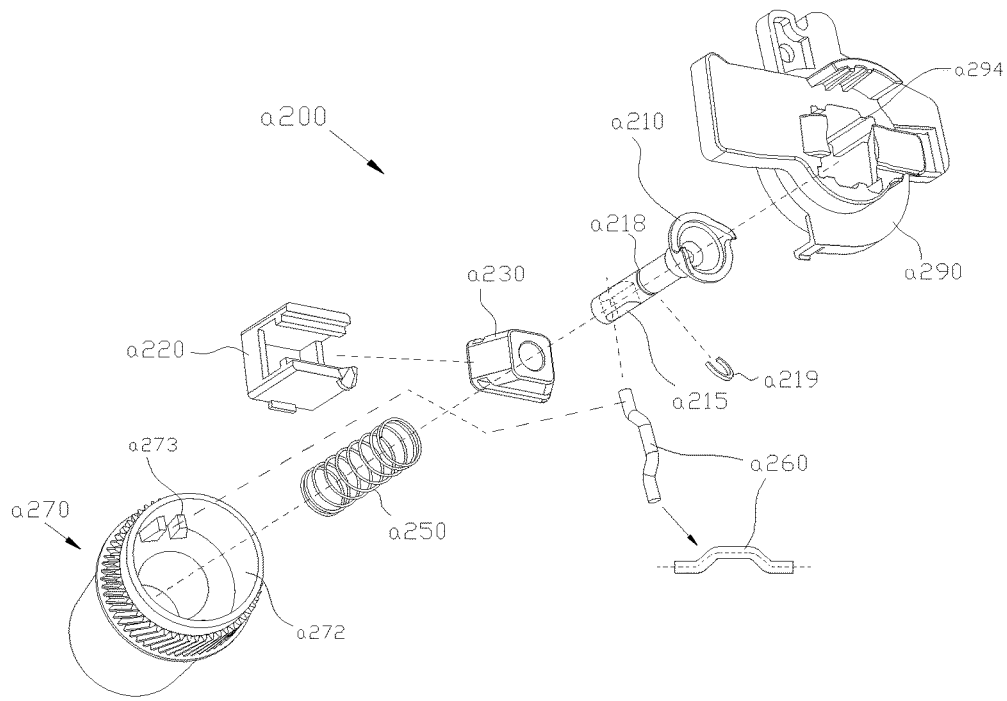
FIG. 30 is a schematic structural diagram of the process cartridge and its rotational force driving assembly in Embodiment Six.
Figure 31A:
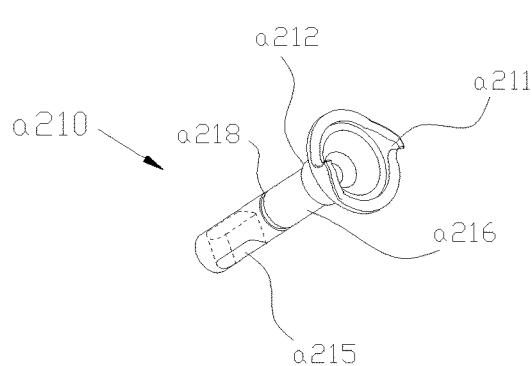
FIG. 31a and FIG. 31b are schematic structural diagrams of a coupling component of the rotational force driving assembly in Embodiment Six.
Figure 31B:
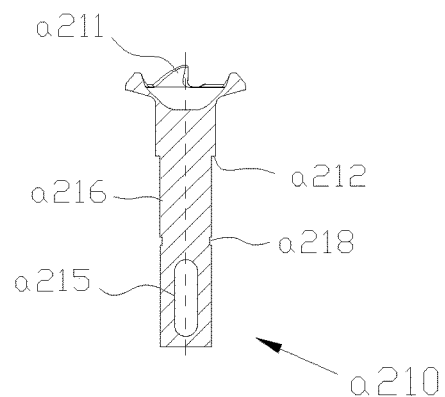
Figure 32:
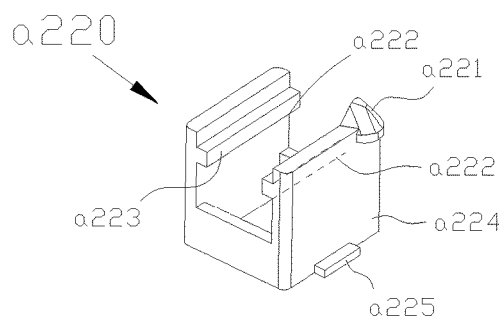
FIG. 32 is a schematic structural diagram of a pressing component of the rotational force driving assembly in Embodiment Six.
Figure 33:
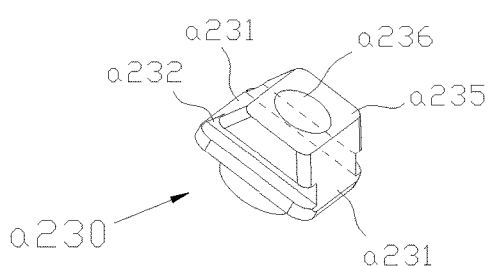
FIG. 33 is a schematic structural diagram of a sliding part of the rotational force driving assembly in Embodiment Six.
Figure 34A:
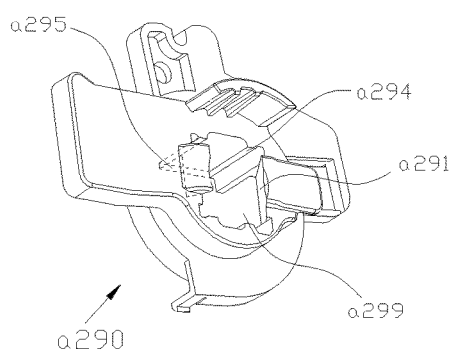
FIG. 34a and FIG. 34b are schematic structural diagrams of a baffle plate of the rotational force driving assembly in Embodiment Six.
Figure 34B:
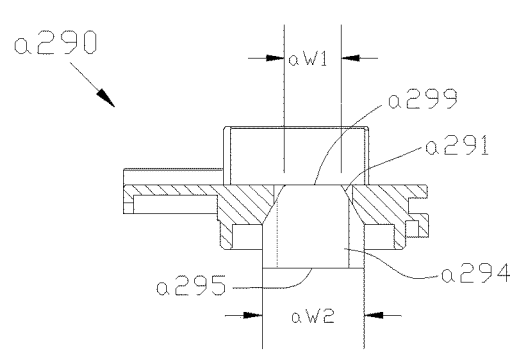
Figure 35A:
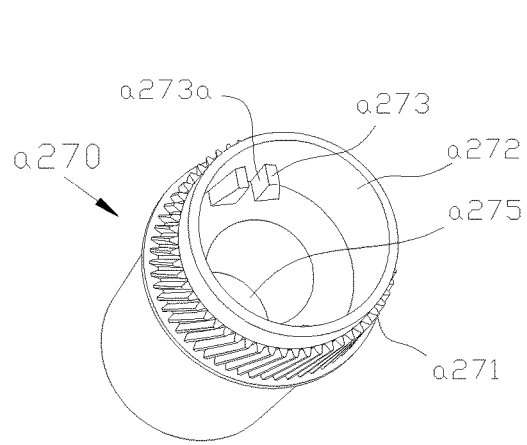
FIG. 35a and FIG. 35b are schematic structural diagrams of a transmitting component of the rotational force driving assembly in Embodiment Six.
Figure 35B:
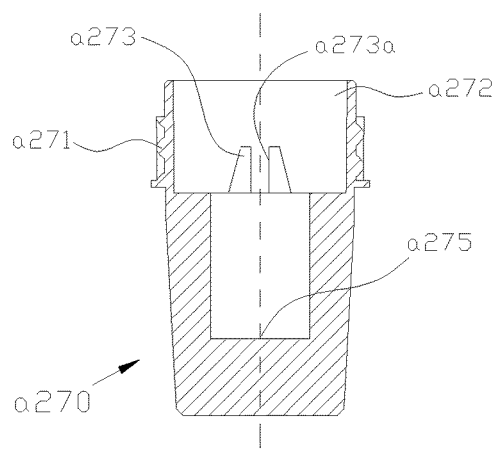
Figure 36:
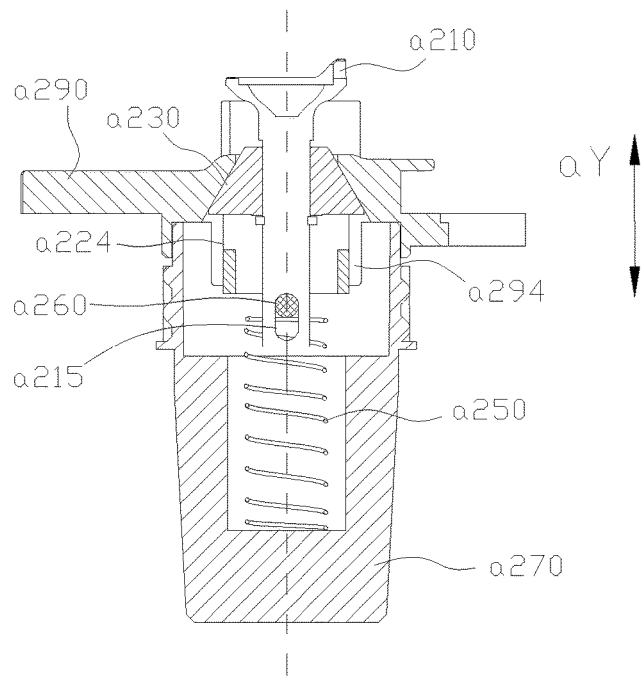
FIG. 36 is a schematic sectional diagram of the rotational force driving assembly in Embodiment Six.
Figure 37A:
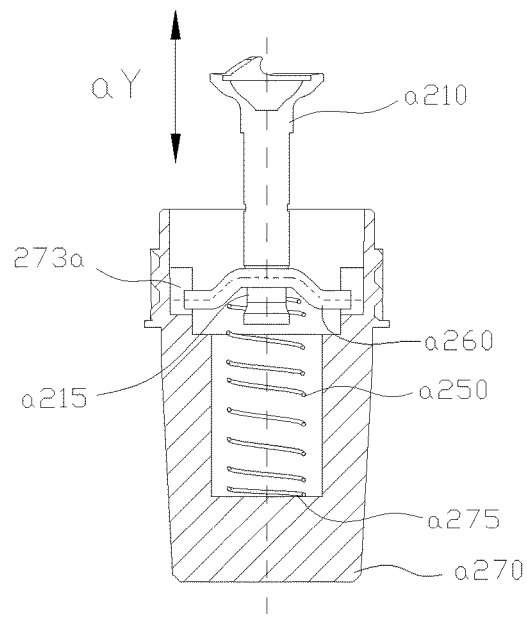
FIG. 37a and FIG. 37b are schematic diagrams of the movement of the coupling component of the rotational force driving assembly in a direction in Embodiment Six.
Figure 37B:
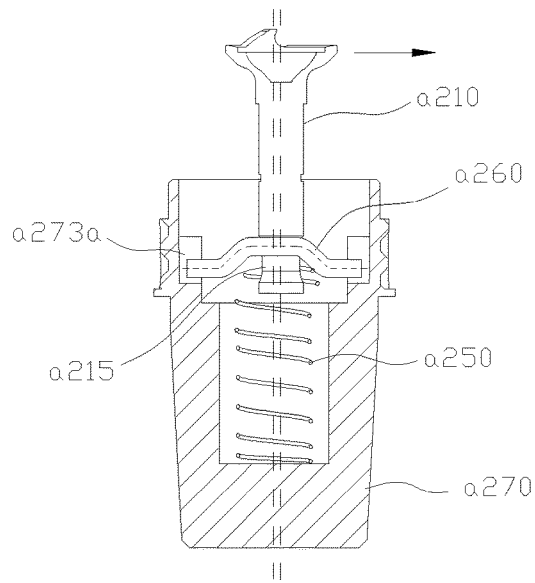
Figure 38A:
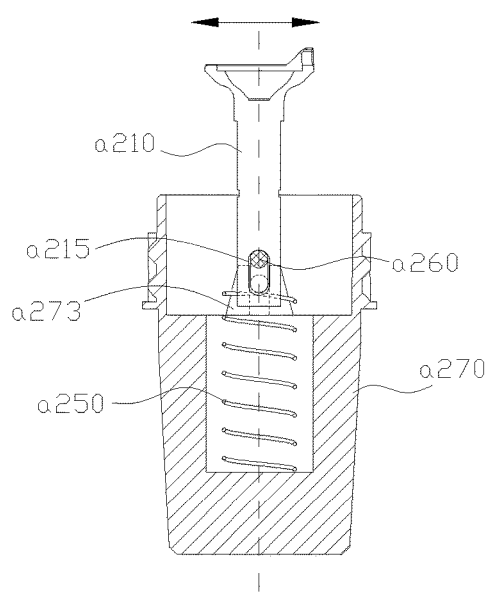
FIG. 38a, FIG. 38b and FIG. 38c are schematic diagrams of the movement of the coupling component of the rotational force driving assembly in another direction in Embodiment Six.
Figure 38B:
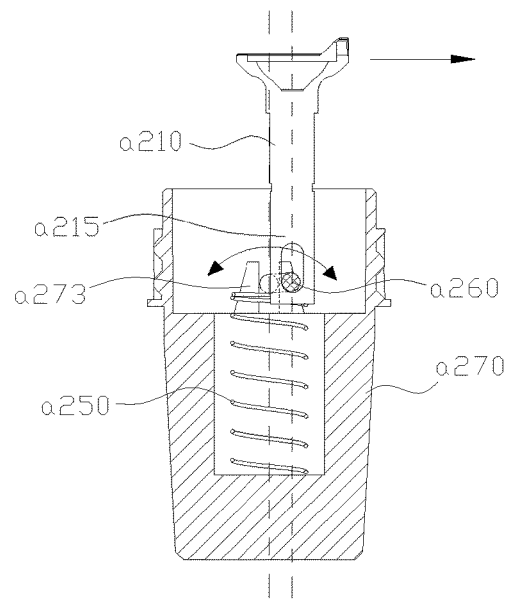
Figure 38C:
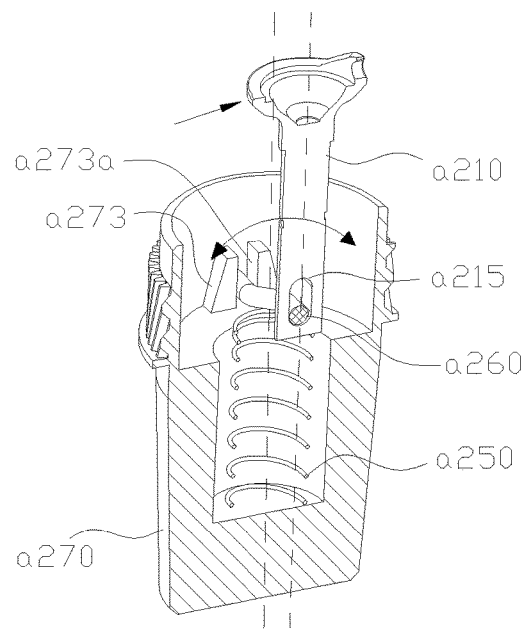

As shown in FIG. 30 and FIG. 36, the assembling relationship of the above parts is: the pressing component a220 fits with the sliding groove a232 at two sides of the surface of the sliding piece a230 in a sliding manner through the built-in long sliding block a223; the coupling component a210 passes through the through hole a236 of the sliding piece a230 and the pressing component a220 via the connecting part a216, and the limiting surface a212 of the coupling component a210 abuts the positioning surface a235 of the sliding piece a230; a latching buckle a219 is embedded into the latching slot a218 of the coupling component a210 extended from the sliding piece a230 so that the coupling component a210 is axially fixed on the sliding piece a230; the force transmission part a260 passes through a sliding groove a215 at one end of the connecting part a216, and the middle protruded portion of the connecting part a260 is located in the sliding groove a215; the elastic member a250 is placed in the cavity a272 of the transmitting component a270, two ends of the connecting part a260 are placed in the built-in limiting sliding groove a273 in the transmitting component a270, one end of the elastic member a250 abuts the bottom surface a275 of the cavity a272, and the other end abuts the two ends of the connecting part a260. After the above parts fit with each other, they can be installed as a whole into one end of the process cartridge aC, the transmitting component a270 can directly cooperate with the photosensitive member a10 or/and the developing member a30 so as to transmit a driving force; the baffle plate a290 covers the sliding piece a230; the coupling component a210 extends outward from the hole a299 of the baffle plate a290; the inclined sliding surface a231 of the sliding piece a230 abuts and fits with the bevel a291 provided in the baffle plate a290; the sliding surface a224 of the pressing component a220 fits with the sliding surface a294 of the baffle plate a290 in a vertical sliding manner; then the baffle plate a290 is fixed at one end of the process cartridge aC through screwing, gluing, welding and so on, thereby preventing the rotational force driving assembly from being separated from the process cartridge aC.

As described above, one end of the elastic member a250 abuts the connecting part a260 and two ends of the connecting part a260 are located in the limiting sliding groove a273 so that the connecting part a260 can elastically move along the limiting sliding groove a273, and the coupling component a210 which is connected with the connecting part a260 can also elastically move back and forth with respect to the transmitting component a270; similarly, the pressing component a220 and the sliding piece a230 can also move together with the stretching and retracting movement of the coupling component a210 on account of the connection between the sliding piece a230 and the coupling component a210 as well as the connection between the pressing component a220 and the sliding piece a230. Through that the baffle plate a290 covers on the sliding piece a230, since the elastic force applied by the elastic member a250 makes the inclined sliding surface a231 of the sliding piece a230 abut the bevel a291, and makes the limiting protrusion a225 of the pressing component a220 abut the limiting surface a295 to limit the stretching length of the coupling component a210 from the rotational force driving assembly a200, the coupling component a210 subjected by the elastic force can stretch and retract axially along direction aY (direction aY is substantially coaxial or overlapped with the axial direction of the developing member a30 or the photosensitive member a10, and is substantially perpendicular to direction aX).

As shown from FIG. 37a to FIG. 38c, the coupling component a210 in the rotational force driving assembly a200 can achieve the following movements (in order to more conveniently understand the movement of the coupling component a210 in the transmitting component a270, some parts of the rotational force driving assembly are not shown): (1) the coupling component a210 can stretch and retract axially along direction aY through the elastic force of the elastic member a250; (2) as shown in FIG. 37b, viewing from the length direction of the connecting part a260, since the coupling component a210 is assembled and fits with the connecting part a260 through the sliding groove a215, the coupling component a210 can slide left and right along the length of the connecting part a260, that is, the coupling component a210 can achieve parallel shift of a certain distance with respect to the transmitting component a270; (3) as shown from FIG. 38a to FIG. 38c, viewing from the end surface of the connecting part a260, since the connecting part a260 is of a cranked structure with a protrusion in the middle, and the two ends of the connecting part a260 are placed in the limiting sliding groove a273, the coupling component a210 can achieve left and right deflection movement via the cranked structure with the protrusion in the middle of the connecting part a260 by means of the connection and fit with the connecting part a260 through the sliding groove a215, that is, the coupling component a210 can achieve parallel shift of a certain extent with respect to the transmitting component a270.

Figure 39:
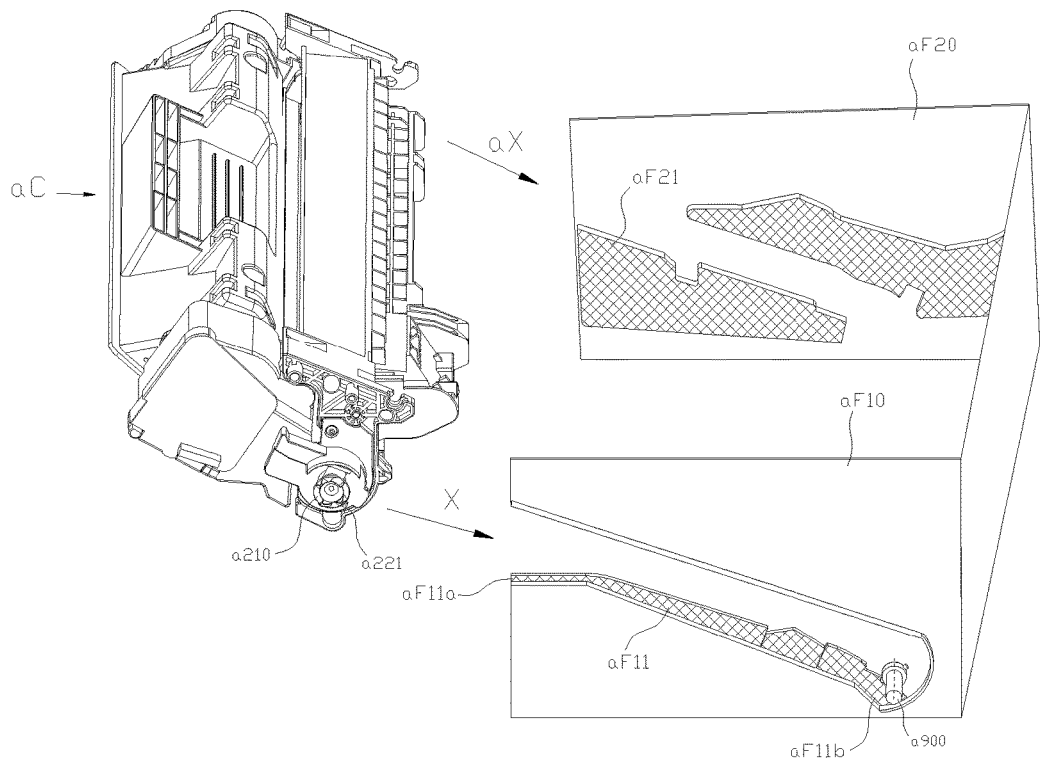
FIG. 39 and FIG. 40 are schematic diagrams showing that the process cartridge is installed into an electrophotographic image forming device in Embodiment Six.
Figure 40:
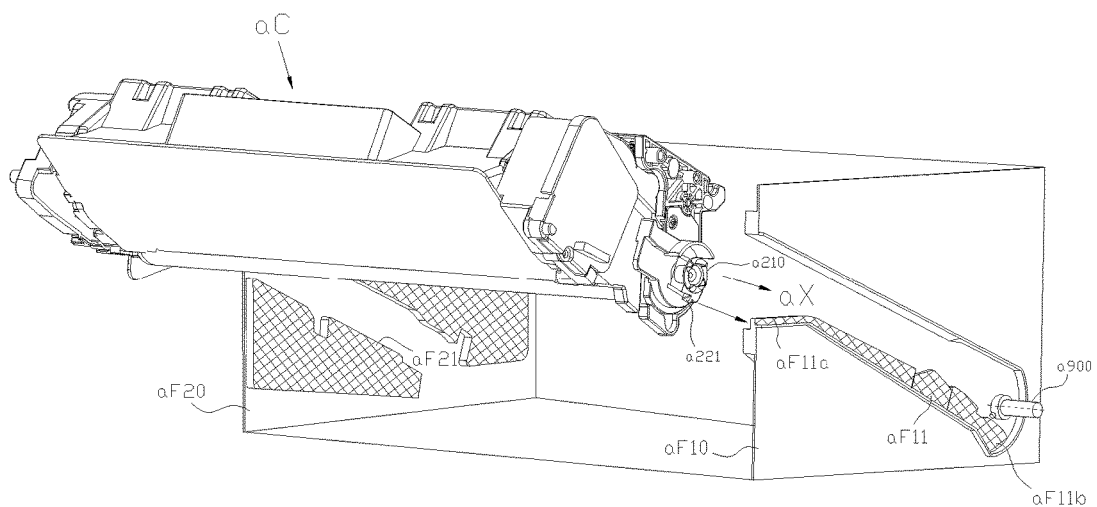

As shown in FIG. 39 and FIG. 40, which are schematic structural diagrams of the two lateral walls (aF10, aF20) in the electrophotographic image forming device (not shown), the two lateral walls (aF10, aF20) are provided with guide rails (aF11, aF21), and the guide rails (aF11, aF21) are used for guiding the process cartridge aC being installed into the electrophotographic image forming device; the guide rails (aF11, aF21) are of a lath shaped structure; the guide rail aF11 of one lateral wall aF10 has a front end aF11a and a back end aF11b, and the driving head a900 of the electrophotographic image forming device is arranged adjacent to the back end aF11b.

Figure 41A:
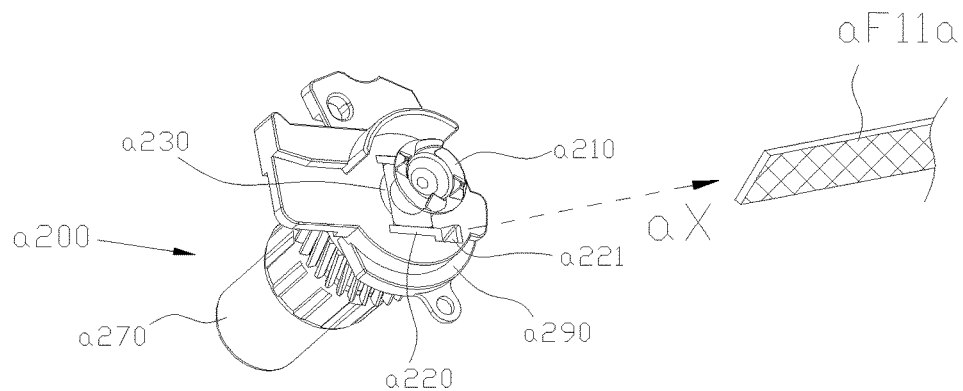
FIG. 41a, FIG. 41b and FIG. 41c are schematic structural diagrams of the rotational force driving assembly and the front end of a guide rail in Embodiment Six.
Figure 41B:
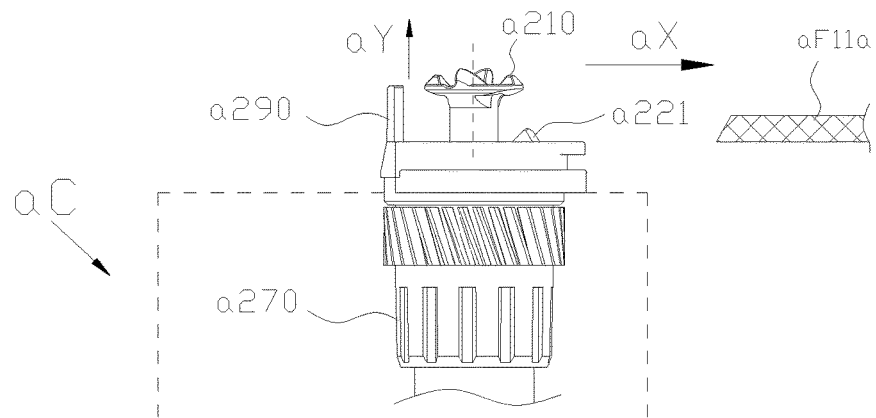
Figure 41C:
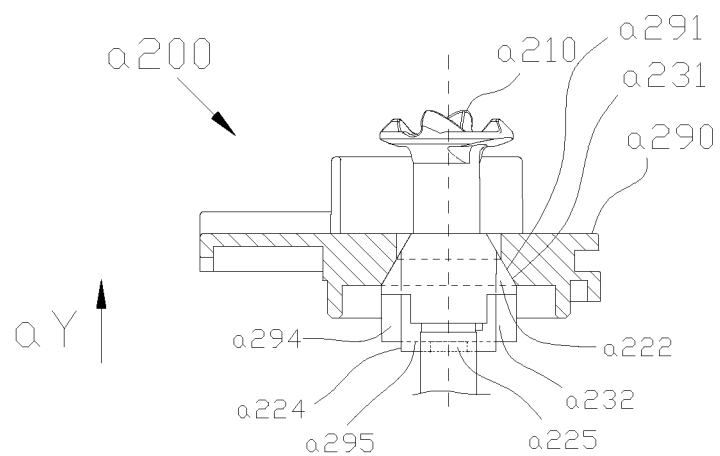
Figure 42A:
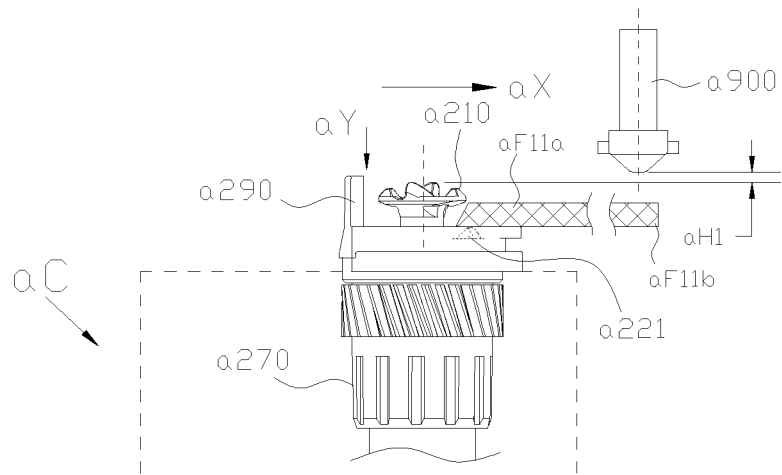
FIG. 42a and FIG. 42b are schematic diagrams showing that a pressed portion of the rotational force driving assembly is pressed by the front end of the guide rail in Embodiment Six.
Figure 42B:
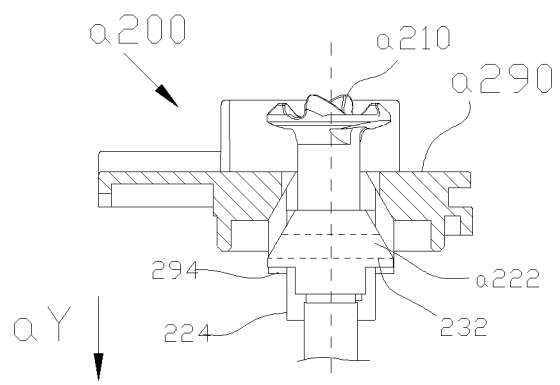
Figure 43:
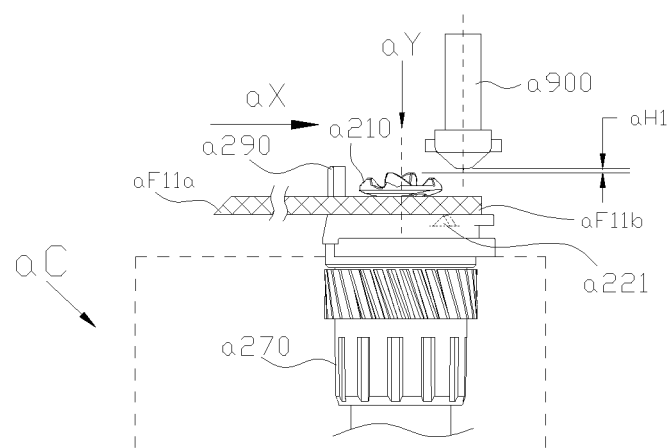
FIG. 43 is a schematic diagram showing that the pressed portion of the rotational force driving assembly is pressed by the back end of the guide rail in Embodiment Six.
Figure 44A:
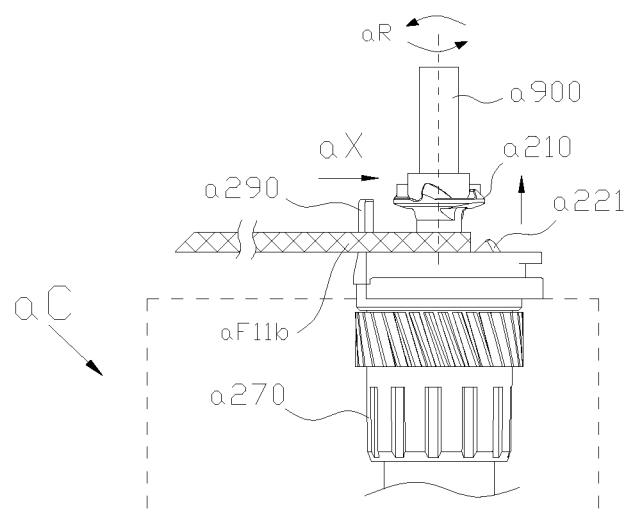
FIG. 44a and FIG. 44b are schematic diagrams showing that the coupling component of the rotational force driving assembly stretches and engages with a driving head in Embodiment Six.
Figure 44B:
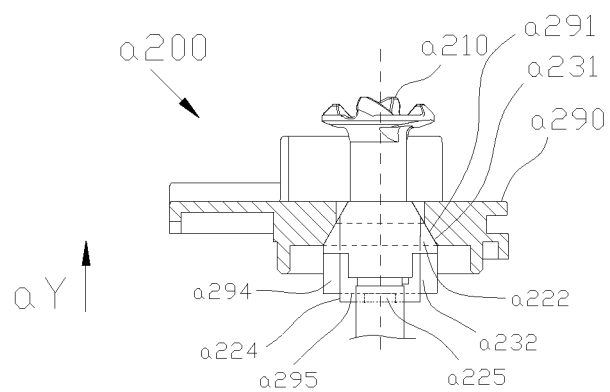

When installing the process cartridge aC into the electrophotographic image forming device through the two lateral walls (aF10, aF20) in the electrophotographic image forming device along direction aX (direction aX is substantially perpendicular to the axial direction of the developing member), the rotational force driving assembly a200 at one end of the process cartridge aC also enters into the electrophotographic image forming device along guide rail aF11. As shown from FIG. 41a to FIG. 41c, when the pressed portion a221 of the rotational force driving assembly a200 is not pressed, the coupling component a210 is in an stretched state along direction aY due to the elastic force of the elastic member a250, and the pressed portion a221 of the pressing component a220 protrudes from the outer surface of the baffle plate a290, where the outer surface is the outer side surface of the baffle plate a290, the protruding direction of the pressed portion a221 is the same with the stretching direction of the coupling component a210, refer to the direction of the arrow in direction aY in FIG. 41b. When the pressed portion a221 of the rotational force driving assembly a200 abuts the front end aF11a of the guide rail aF11 and is pressed, as shown in FIG. 42a and FIG. 42b, the whole pressing component a220 moves downward along direction aY due to the pressed portion a221 being pressed, the sliding surface a224 of the pressing component a220 is limited to move vertically downward in the sliding surface a294 of the baffle plate a290; as the pressing component a220 moving downward, the pressing surface a222 of the pressing component a220 presses the sliding groove a232 of the sliding piece a230 at the same time so that the sliding piece a230 moves vertically downward; as the sliding piece a230 moving downward, the sliding piece a230 presses the latching buckle a219 of the coupling component a210 at the same time so that the coupling component a210 moves downward at the same time. In this way, through the cooperation of the above parts, when the pressed portion a221 of the rotational force driving assembly a200 is pressed to move downward, the coupling component a210 of the rotational force driving assembly a200 moves vertically downward at the same time, that is, the coupling component a210 can achieve retraction with respect to the surface of the baffle plate a290. As shown in FIG. 42a, when the pressed portion a221 is pressed to move downward, there exists a space aH1 between the topmost end of the coupling component a210 and the axial bottommost end of the driving head a900 in the electrophotographic image forming device; as the further installation of the process cartridge aC along the guide rails (aF11, aF21) in the electrophotographic image forming device towards direction aX, the pressed portion a221 of the rotational force driving assembly a200 keeps the pressed state due to the limitation of the length of the guide rail. As shown in FIG. 43, when the process cartridge moves to the back end aF11b, the coupling component a210 which keeps the retracting state also approaches the driving head a900 in the electrophotographic image forming device as the process cartridge aC moving. When the process cartridge aC is installed in place (i.e. the operating position of the process cartridge in the electrophotographic image forming device), the rotational axis of the coupling component a210 of the process cartridge aC is substantially coaxial with the rotational axis of the driving head a900; the pressed portion a221 of the rotational force driving assembly a200 moves accordingly to the back of the back end aF11b of the guide rail aF11 and is no longer pressed, as shown in FIG. 44a and FIG. 44b; at this time the elastic member a250 of the rotational force driving assembly a200 releases the elastic force to the connecting part a260 so as to push the connecting part a260 to move; the connecting part a260 then pushes the coupling component a210 to extend outward and engage with the driving head a900; as the coupling component a210 stretching outward, the sliding piece a230 and the pressing component a220 which fit with the coupling component a210 also slide outward to the position before being pressed.

At last, the coupling component a210 transmits the rotational driving force to the connecting part a260, the connecting part a260 makes the transmitting component a270 rotate through the two ends of the connecting part a260 abutting on the driving face 273a, and the transmitting component a270 finally transmits the driving force into the process cartridge aC.

The process of removing the process cartridge aC from the electrophotographic image forming device can be referred to the process of installing the process cartridge aC into the electrophotographic image forming device, it is only needed to perform inverse operation. When removing the process cartridge aC from the electrophotographic image forming device along the guide rails (aF11, aF21) in the opposite direction of the installation direction, the pressed portion a221 of the rotational force driving assembly a200 abuts the back end aF11b of the guide rail aF11 as the process cartridge aC moving towards the removing direction; the back end aF11b presses the pressed portion a221 so that the pressed portion a221 moves downward along direction aY and finally drives the coupling component a210 to retract; then the coupling component a210 can disengage with the driving head a900, that is, it will not be difficult to remove the process cartridge aC from the electrophotographic image forming device due to the structure interference caused by the tight engagement of the coupling component a210 and the driving head a900. When the process cartridge aC is removed completely from the electrophotographic image forming device, the front end aF11a of the guide rail aF11 will not press the pressed portion a221 of the rotational force driving assembly a200 any more, thus the pressed portion a221 and the coupling component a210 stretch outward due to the elastic force of the elastic member a250, and return to the initial position before being pressed.

Figure 45:
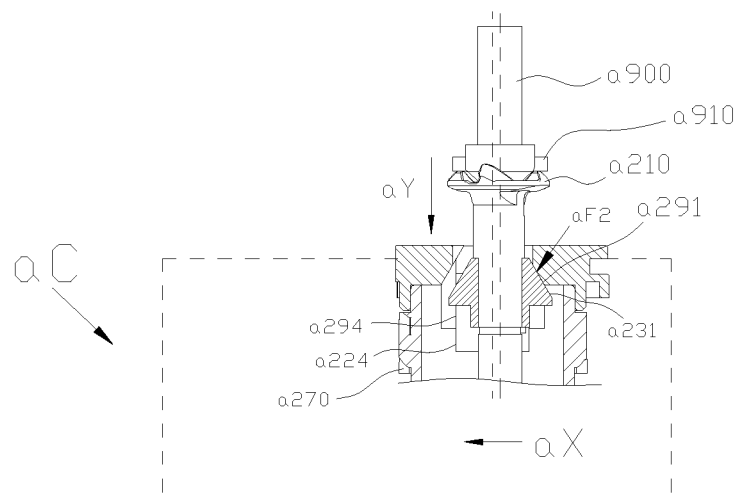
FIG. 45 is a schematic diagram showing the tight engagement state between the coupling component of the rotational force driving assembly and the driving head in Embodiment Six.

In addition, in order to facilitate removing the process cartridge aC from the electrophotographic image forming device more convenient and easier, as shown in FIG. 45, when removing the process cartridge aC from the electrophotographic image forming device along direction aX (removing direction) after completing developing process, the driving head a900 is still in tight engagement with the coupling component a210 so that it is difficult for the coupling component a210 to move towards the removing direction, but the transmitting component a270 can move with respect to the coupling component a210. Therefore, when the coupling component a210 is relatively fixed in the removing direction due to tight engagement, the movement of the transmitting component a270 along the removing direction can make the built-in bevel a291 generate a pressing force aF2 and press the inclined sliding surface a231 of the sliding piece a230 so that the sliding piece a230 retracts, and the coupling component a210 which fixedly fits with the sliding piece a230 moves downward as the sliding piece a230 retracting. Besides, when the sliding piece a230 retracts, it also presses the pressing component a220 so that the pressing component a220 retracts; the sliding surface a294 of the baffle plate a290 makes the sliding surface a224 of the pressing component a220 slide vertically inward; the coupling component a210 keeps erect while retracting by means of the cooperation of the pressing component a220 and the sliding piece a230 as well as the fixed cooperation of the sliding piece a230 and the coupling component a210 make; the rotational axis of the coupling component a210 during moving is always substantially coaxial with or parallel to the rotational axis of the transmitting component a270. In this way, through the bevel a291 of the baffle plate a290 pressing on the inclined sliding surface a231 of the sliding piece a230, finally the coupling component a210 retracts with respect to the surface of the baffle plate a290 and disengages with the driving head a900.

As described above, when removing the process cartridge aC out of the electrophotographic image forming device, through the back end aF11b of the guide rail aF11 abutting the pressed portion a221 of the rotational force driving assembly a200 such that the coupling component a210 axially retracts, and the bevel a291 of the baffle plate a290 abutting on the inclined sliding surface a231 of the sliding piece a230 such that the coupling component a210 axially retracts, the cooperation actions of the above two makes the coupling component a210 easy to be axially disengaged after the tight engagement with the driving head a900, thereby avoid the structure interference when the coupling component a210 disengages with the driving head a900.

Embodiment Seven

In Embodiment Seven, the coupling component a210, the baffle plate a290, the pressing component a220, the elastic member a250, the sliding piece a230 etc of the rotational force driving assembly a200 are referred to the relevant parts of Embodiment Six, which will not be repeated here, the main difference lies in the transmitting component a289 and the connecting part a217 of the rotational force driving assembly a200 of Embodiment Seven.

Figure 46:
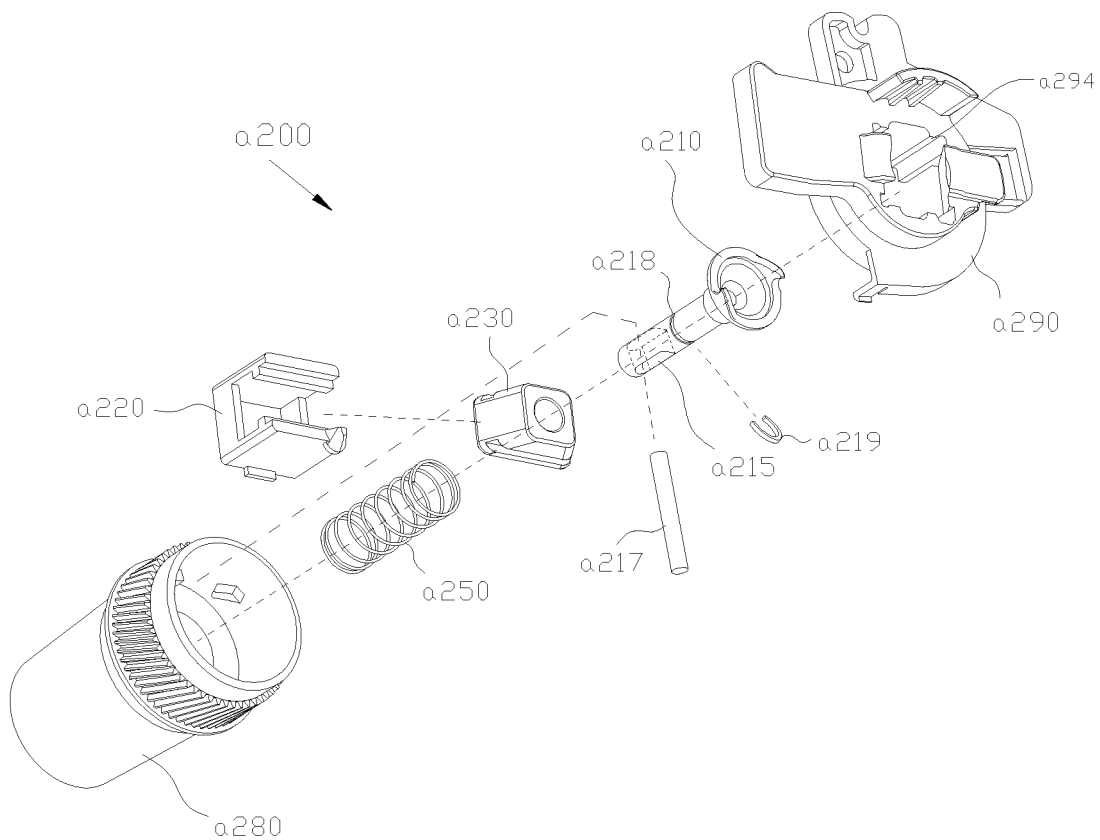
FIG. 46 is a schematic structural diagram of a rotational force driving assembly in Embodiment Seven.
Figure 48:
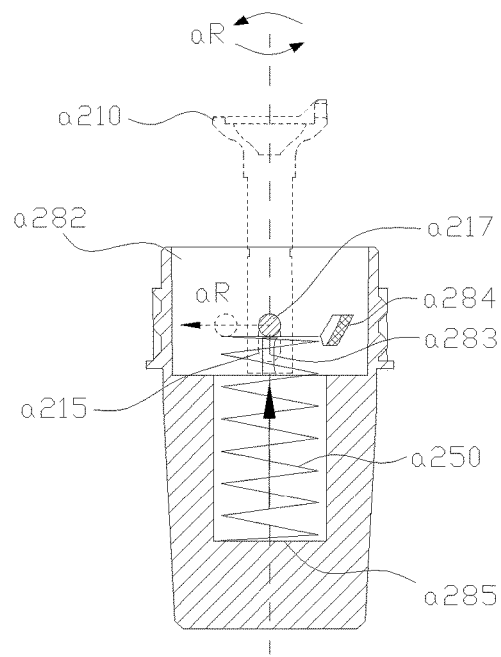
FIG. 48 is a schematic diagram showing that a connecting part is in the transmitting component in Embodiment Seven.

As shown in FIG. 46 and FIG. 47c, the connecting part a217 is of a straight-bar structure; the transmitting component a280 is of a cylindrical structure and is provided with a cavity a282 in its interior; the surface of the transmitting component a280 is provided with a gear surface a281; the cavity a282 is provided with a bottom surface a285 at the bottom; a (a pair of) stressed cylinder(s) a283 is provided in the cavity a282, and the stressed cylinder a283 is a protrusion and a concave surface a283a is provided on the protrusion; a guide block a284 is further provided in the cavity a282, with respect to the stressed cylinder a283, the guide block a284 is closer to the outer end (opening of the cavity) of the transmitting component a280; a guiding surface a284a is provided inward in the guide block a284, where the guiding surface a284a is a bevel or a curved surface; viewing from the end surface of the transmitting component a280, as shown in FIG. 47b, the stressed cylinder a283 and the guide block a284 do not overlap with each other, and viewing from the side surface of the transmitting component a280, as shown in FIG. 47c, the top end of the stressed cylinder a283 is higher than the bottom end (shown as aH2) of the guide block a284.

In the rotational force driving assembly a200 of Embodiment Seven, the elastic force of the elastic member a250 pushes outward the connecting part a217 in the sliding groove a215 of the coupling component a210 so that the connecting part a217 is higher than the stressed cylinder a283 of the transmitting component a280 but no higher than the guide block a284. In addition, since the end portion of the connecting part a217 fitting with the coupling component a210 is not limited in the transmitting component a280, when the rotation axis of the coupling component a210 and the rotation axis of the transmitting component a280 is substantially coaxial, if the coupling component a210 rotates counter-clockwise along direction aR, the connecting part a217 rotates as the coupling component a210 rotating.

Figures 49, 50:
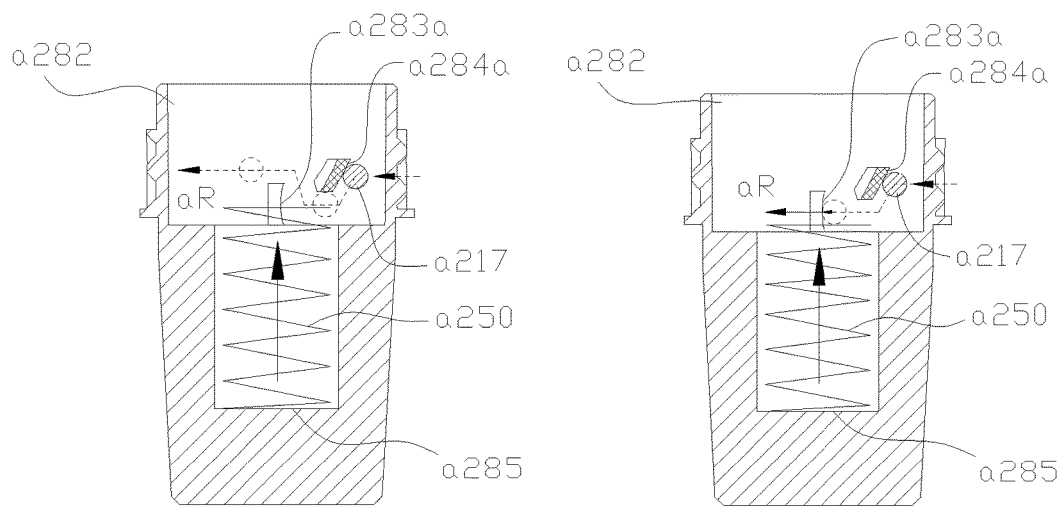
FIG. 49 is a schematic diagram showing a movement of the connecting part in the transmitting component in Embodiment Seven.
FIG. 50 is a schematic diagram showing another movement of the connecting part in the transmitting component in Embodiment Seven.
Figure 51:
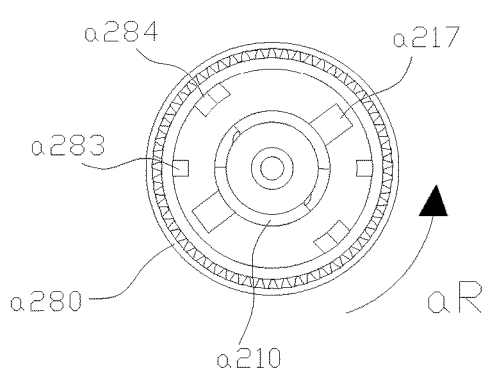
FIG. 51 and FIG. 52 are schematic diagrams showing movements of the connecting part in the transmitting component in Embodiment Seven.
Figure 52:
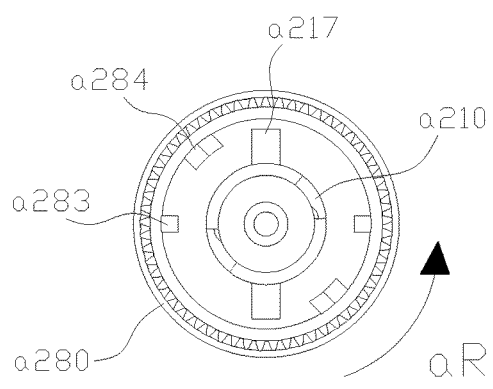

As shown from FIG. 48 to FIG. 52, the coupling component a210 of the rotational force driving assembly a200 can achieve the following movements (in order to more conveniently understand the movements of the coupling component a210 in the transmitting component a280, some parts of the rotational force driving assembly are not shown): (1) when the rotational force of the coupling component a210 is less than the elastic force of the elastic member a250, as shown in FIG. 49, as the coupling component a210 rotating, the connecting part a217 is pushed by the elastic force of the elastic member a250 so that it is higher than the stressed cylinder a283 but no higher than the guide block a284, and the connecting part a217 does not abut the stressed cylinder a283. Since the connecting part a217 is not higher than the guide block a284, when the connecting part a217 approaches the guide block a284 as the coupling component a210 rotating and then abuts the guiding surface a284a of the guide block a284, the rotating connecting part a217 is guided by the guiding surface a284a and moves downward along the sliding groove a215 and meanwhile presses the elastic member a250; when the connecting part a217 keeps rotating and goes beyond the guide block a284, the connecting part a217 is no longer pressed, and the elastic member a250 releases the elastic force to push outward the connecting part a217 back to the position before being pressed which is higher than the stressed cylinder a283. Thus, when the rotational force of the coupling component a210 is less than the elastic force of the elastic member a250, the connecting part a217 can rotate along with the coupling component a210 and does not abut with the stressed cylinder a283, thus the coupling component a210 can rotate with respect to the transmitting component a280 but does not transmit a driving force to the transmitting component a280. (2) When the rotational force of the coupling component a210 is larger than the elastic force of the elastic member a250, as shown in FIG. 50, the connecting part a217 rotates along with the coupling component a210, approaches the guide block a284 and moves downward along the sliding groove a215 through guidance of the guiding surface a284a. Since the rotational force of the coupling component a210 is larger than the elastic force of the elastic member a250 and the connecting part a217 which is moving downward is lower than the stressed cylinder a283 of the transmitting component a280, the connecting part a217 directly abuts against the stressed cylinder a283 under the action of the rotational force of the coupling component a210. Through abutting against the concave surface a283a of the stressed cylinder a283, even suffering the elastic force of the elastic member a250, the connecting part a217 will not be pushed away from the stressed cylinder a283. In this way, the coupling component a210 transmits the rotational driving force to the transmitting component a280 through the connecting part a217 abutting the stressed cylinder a283; at last the transmitting component a280 drives the process cartridge aC to participate the developing operation of the electrophotographic image forming device. When the rotational force of the coupling component a210 is less than the elastic force of the elastic member a250 or disappears, the elastic member a250 can push the connecting part a217 back to the position before being stressed which is higher than the stressed cylinder a283.

Through the structure configuration of Embodiment Seven, when the process cartridge does not participate the developing operation of the electrophotographic image forming device, the coupling component a210 of the rotational force driving assembly a200 of the process cartridge aC can rotate with respect to the transmitting component a280 but does not transmit the driving force to the transmitting component a280; when the process cartridge aC participates the developing operation of the electrophotographic image forming device, the coupling component a210 of the rotational force driving assembly a200 of the process cartridge aC transmits the driving force to the transmitting component a280.

In addition, as shown in FIG. 47c, the top end of the stressed cylinder a283 is provided with a guiding edge a283b, which is preferably a bevel edge or a curved edge. The guiding edge a283b can abut the connecting part a217 which connects with the coupling component a210 so that the connecting part a217 is easy to be stressed to slide downward, when the coupling component a210 is stressed to retract. The two ends of the connecting part a217 can avoid from generating structure interference with the top end of the stressed cylinder a283 when moving downward which will affect the stretching function of the coupling component a210.

Embodiment Eight

Figure 53:
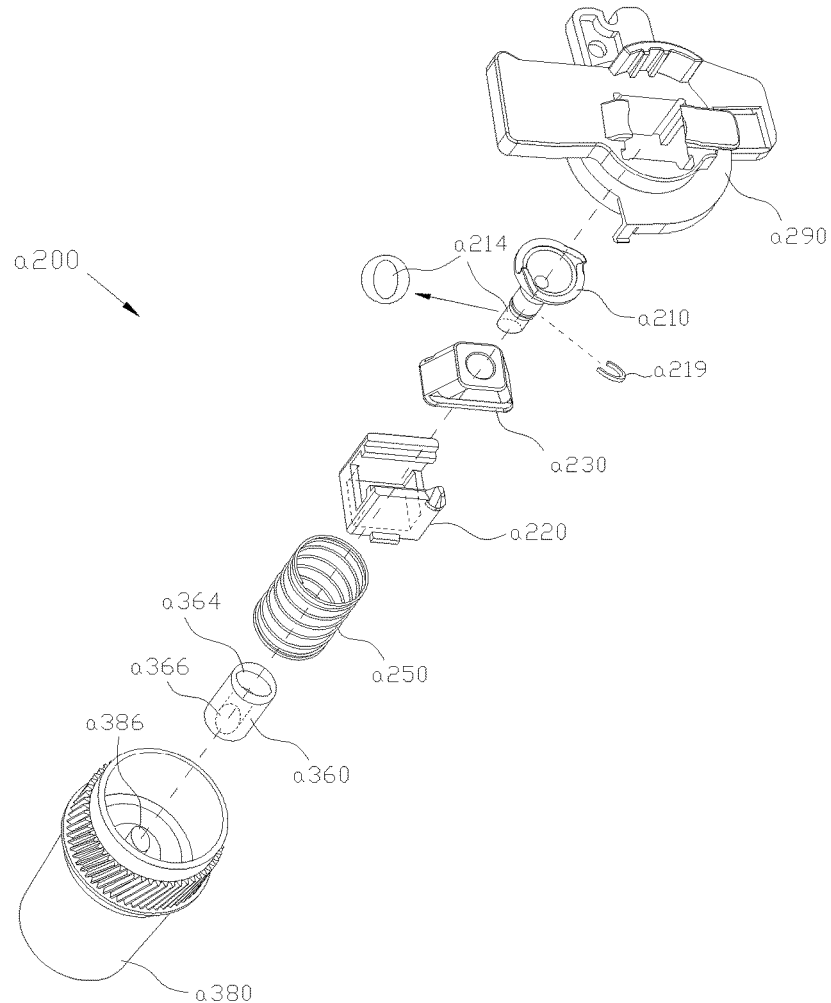
FIG. 53 is a schematic structural diagram of a rotational force driving assembly in Embodiment Eight.
Figure 54:
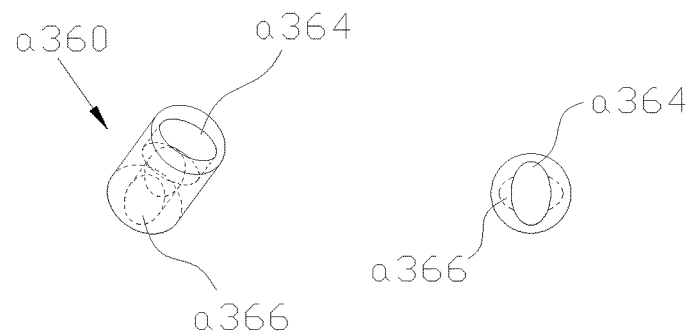
FIG. 54 is a schematic structural diagram of a connecting part in Embodiment Eight.
Figure 55:
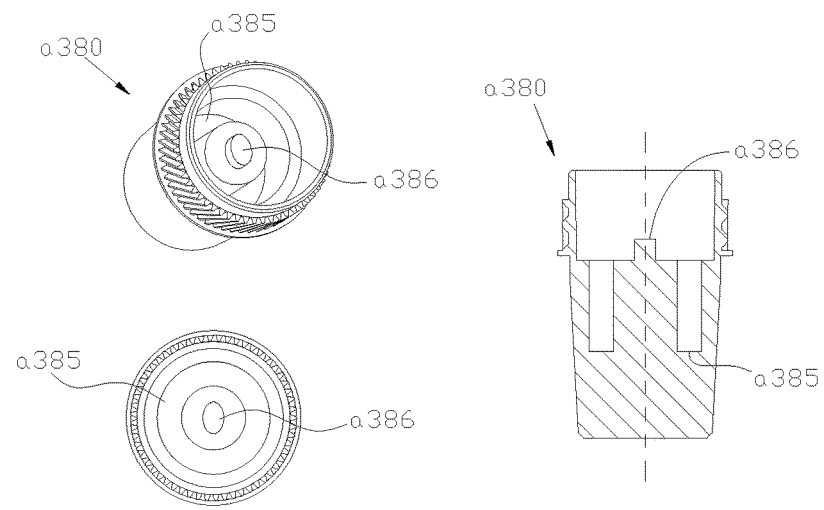
FIG. 55 is a schematic structural diagram of a transmitting component in Embodiment Eight.

As shown in FIG. 53, in Embodiment Eight, the baffle plate a290, the pressing component a220, the elastic member a250, the sliding piece a230 etc of the rotational force driving assembly a200 are referred to the relevant parts of Embodiment Six, which will not be repeated here, the main difference lies in the coupling component a210, the connecting part a360 and the transmitting component a380 of the rotational force driving assembly a200 of Embodiment Eight.

One end of the coupling component a210 is provided with a projection a211 which abuts and engages with the driving pin a910 of the driving head a900, and the other end is provided with a convex key a214; the transmitting component a380 is provided with a bottom surface a385 and a convex key a386 in its interior; one end of the connecting part a360 is provided with a first groove a364, and the other end is provided with a second groove a366; viewing from the end face of the connecting part a360, the first groove a364 and the second groove a366 are arranged mutually crossed. Preferably, the convex keys a214 and a386 are oval protrusions; the first groove a364 and the second groove a366 are oval grooves.

Figure 56:
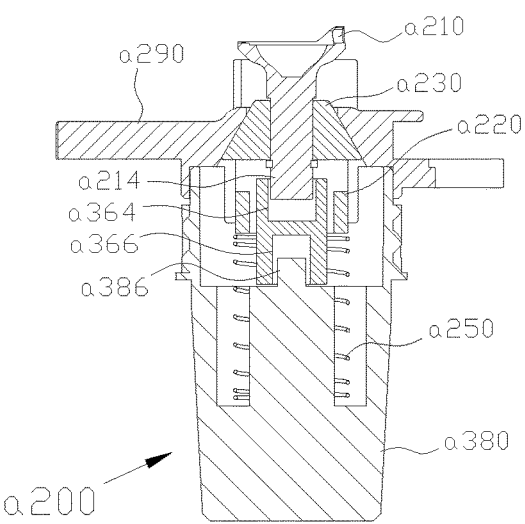
FIG. 56 is a schematic sectional diagram of a rotational force driving assembly in Embodiment Eight.

As shown in FIG. 56, in the rotational force driving assembly a200 of Embodiment Eight, the convex key a214 of the coupling component a210 is arranged in the first groove a364 of the connecting part a360; the convex key a386 in the transmitting component a380 is arranged in the second groove a366 of the connecting part a360; after the above convex keys a214 and a386 fit with the grooves a364 and a366, the connecting part a360 is located between the transmitting component a380 and the coupling component a210.

Figure 57A:
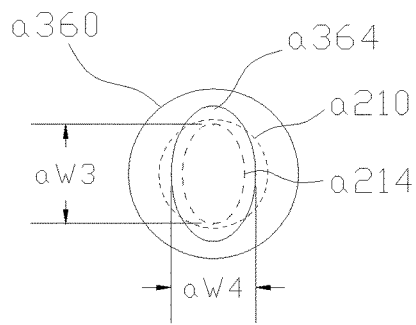
FIG. 57a, FIG. 57b and FIG. 57c are schematic diagrams showing the movement of a coupling component when connecting with the connecting part in Embodiment Eight.

As shown in FIG. 56 and FIG. 57a, which show that the convex key a214 of the coupling component a210 is in the first groove a364 of the connecting part a360, at least a portion of the convex key a214 is arranged in the first groove a364; viewing from the end face of the connecting part a360, as shown in FIG. 57a, the maximum length aW3 of the convex key a214 is larger than the minimum width aW4 of the first groove a364. Similarly, at least a portion of the convex key a386 is arranged in the second groove a366, and the maximum length of the convex key a386 is larger than the minimum width of the second groove a366.

Figure 57B:
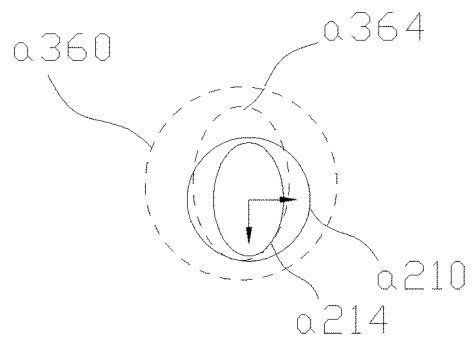

As shown in FIG. 56 and FIG. 57b, since the convex key a214 is located in the first groove a364, the coupling component a210 can move with respect to the connecting part a360 in the direction perpendicular to the rotational axis of the transmitting component a380; similarly, since the second groove a366 surrounds the convex key a386, the connecting part a360 can move with respect to the transmitting component a380 in the direction perpendicular to the rotational axis of the transmitting component a380.

Figure 57C:
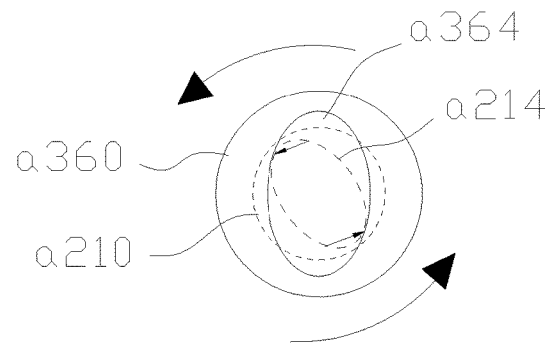

As shown in FIG. 57c, when the coupling component a210 rotates after receiving the rotational force, the portion of the convex key a214 with the maximum length which rotates accordingly abuts the portion of the first groove a364 with the minimum width and drives the connecting part a360 to rotate; the second groove a366 of the other end of the connecting part a360 rotates accordingly and its portion with the minimum width abuts the convex key a386 of the transmitting component a380 and finally drives the transmitting component a380 to rotate.

In the above Embodiment Eight, the convex keys of the coupling component a210 and the transmitting component a380 can also be grooves, the first and second grooves of the connecting part a360 can also be convex keys. In addition, when the convex keys a214 and a386 are in the grooves a364 and a366, the coupling component a210 or/and the transmitting component a380 need to keep a certain space with the connecting part a360, so as to avoid structure interference when the coupling component a210 stretches and retracts.

Embodiment Nine

Figure 58:
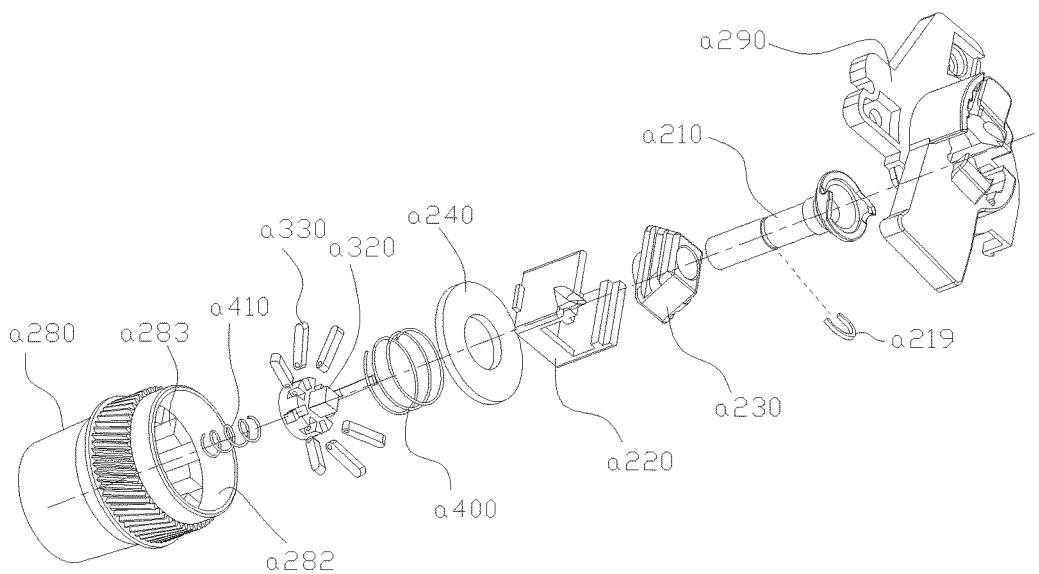
FIG. 58 is a schematic structural diagram of a rotational force driving assembly in Embodiment Nine.
Figure 59A:
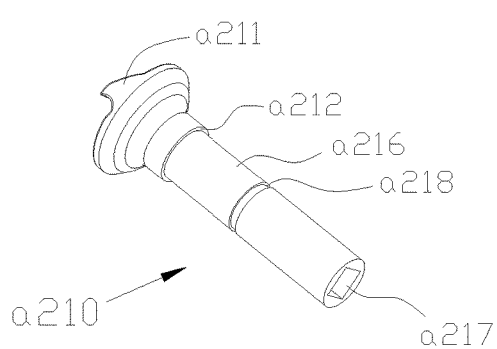
FIG. 59a and FIG. 59b are schematic structural diagrams of a coupling component in Embodiment Nine.
Figure 59B:
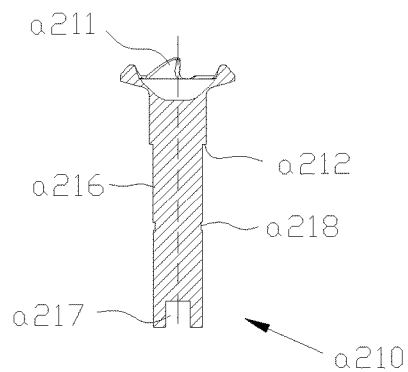

As shown in FIG. 58, in Embodiment Nine, the baffle plate a290, the pressing component a220, the sliding piece a230, the coupling component a210 etc of the rotational force driving assembly a200 can be referred to the relevant parts of Embodiment Six, which will not be repeated here, the main difference lies in the transmitting component a280, an anti-detaching ring a240, a connection portion a320, a plurality of connecting parts a330, a first return spring a400 and a second return spring a410, where the first return spring a400 is a return spring of the connecting part, and the second return spring a410 is a return spring of the coupling component.

As shown from FIG. 59a to FIG. 62b, one end of the coupling component a210 is provided with a projection a211 for abutting and engaging with the driving pin a910 of the driving head a900, the other end is provided with a groove a217 with non-circle cross section; preferably, in the present embodiment the cross section of the groove a217 is of rectangular shape. The base a320a of the connection portion a320 is provided with a protrusion a320d corresponding to the groove a217 of one end of the coupling component a210, the other end of the base a320a is provided with a groove a320e. A plurality of connecting parts a330 are uniformly arranged on the periphery of the base a320a of the connection portion a320; the connecting parts a330 and the groove a320c of the base a320a are connected with each other via a hinge, the connecting parts a330 can swing up and down about the hinge joint. After the connecting part a330 is installed on the base a320a, all the connecting parts a330 always incline towards the axial direction of the coupling component a210 due to the limiting of the groove a320c. A (a plurality of) limiting sliding groove(s) a282a is provided in the cavity a282 of the transmitting component a280, the limiting sliding groove a282a is formed by two protrusions. The anti-detaching ring a240 is provided below the pressing component a220, the diameter of the inner circle of the anti-detaching ring a240 is less than the diameter of a circle where an end point of the free end of the connecting part a330 is located, and the diameter of the outer circle is less than the diameter of the cavity a282 of the transmitting component a280.

Figure 62A:
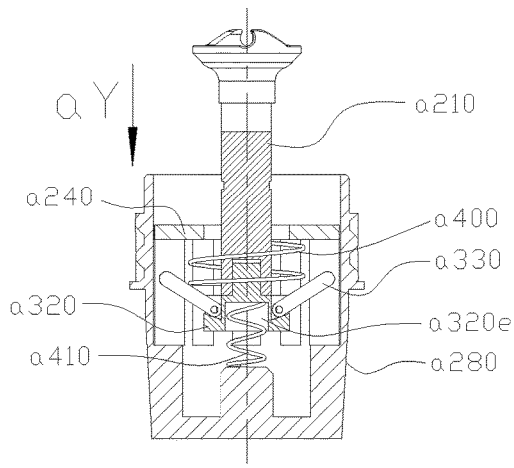
FIG. 62a and FIG. 62b are schematic diagrams showing the movement of the coupling component with respect to the transmitting component in Embodiment Nine.
Figure 62B:
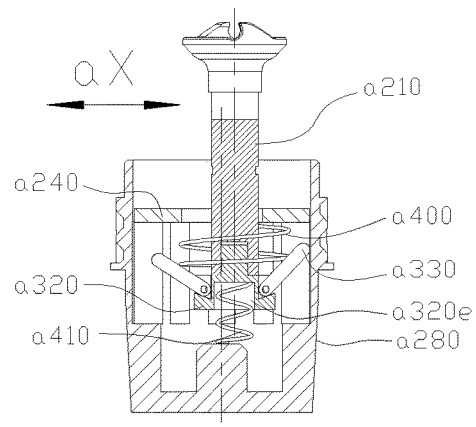

As shown in FIG. 62a and FIG. 62b, one end of the connecting part a330 is hinged on the base a320a, the other end is located in the limiting sliding groove a282a. The second return spring a410 is provided between the connection portion a320 and the transmitting component a280; one end of the second return spring a410 abuts on the bottom surface a285 of the cavity a282, the other end abuts in the groove a320e at the bottom of the base a320a. The first return spring a400 is provided between the anti-detaching ring a240 and the connecting part a330; one end of the first return spring a400 abuts on the connecting part a330, the other end abuts on the bottom surface of the anti-detaching ring; under the action of the first return spring a400, the connecting part a330 is pressed so that the top surface of the anti-detaching ring a240 contacts the bottom surface of the pressing component a220.

In the rotational force driving assembly a200 of Embodiment Nine, under the action of the first return spring a400, one end of the connecting part a330 is located in the limiting sliding groove a282a, and can move along direction aY in the limiting sliding groove a282a. Since the limiting sliding groove a282a will limit the connecting part a330 to move along the direction perpendicular to the axial direction of the transmitting component a280, the axis of rotation of the coupling component a210 is substantially coaxial with the axis of rotation of the transmitting component a280, when the coupling component a210 rotates, the connecting part a330 rotates accordingly, and drives the transmitting component a280 to rotate.

Figure 60A:
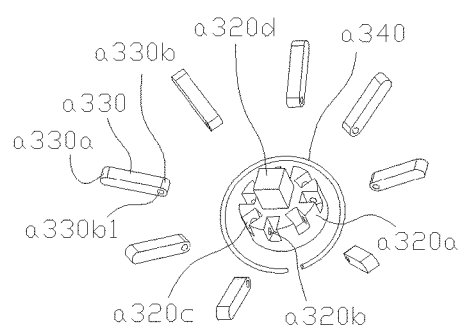
FIG. 60a and FIG. 60b are schematic structural diagrams of a connecting part and a connecting portion in Embodiment Nine.

The coupling component a210 in the rotational force driving assembly a200 can achieve the following movements (in order to more conveniently understand the movements of the coupling component a210 in the transmitting component a280, some parts of the rotational force driving assembly a200 such as the pressing component a220, the sliding piece a230 are not shown): (1) as shown in FIG. 62a, when the coupling component a210 is subjected to an external force along direction aY, the coupling component a210 will press the connection portion a320 and the second return spring a410, and the second return spring a410 will retract along direction aY, so that the coupling component a210 and the connection portion a320 move along direction aY for a certain distance, accordingly, the connecting part a330 will slide in the limiting sliding groove a282a along direction aY; when the external force disappears, the second return spring a410 pushes the connection portion a320 and the coupling component a210 to move inversely along direction aY to the topmost position, accordingly, the connecting part a330 will slide in the limiting sliding groove a282a along direction aY; (2) as shown in FIG. 62b, when the coupling component a210 is subjected to an external force in a direction perpendicular to the direction aY, the coupling component a210 will drive the connection portion a320 and the connecting part a330 to move along direction aX; in order to increase the moving distance of the coupling component a210 along direction aX as much as possible, the connecting part a330 is configured as a structure which can rotate about the base a320a, the connecting part a330 and the base a320a are connected with each other via a hinge, and a plurality of connecting parts a330 are uniformly distributed on the periphery of the base a320a. Preferably, in the present embodiment, the connecting part a330 is connected to the base a320a via a connection wire a340, as shown in FIG. 60a, the connection wire a340 goes through a circular hole a330b1 of the connecting part a330 and a circular hole a320b of the base a320a in turn, and hinges the connecting part a330 and the base a320a together; preferably, the connection wire a340 in the present embodiment is of soft material.

Figure 60B:
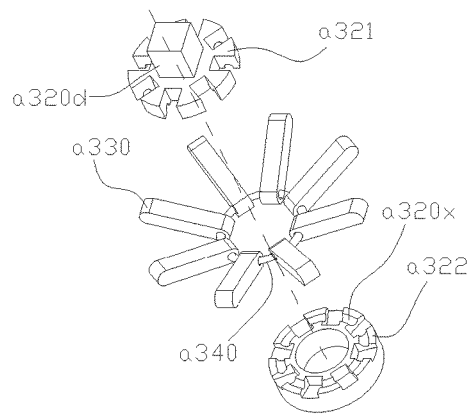
Figure 61A:
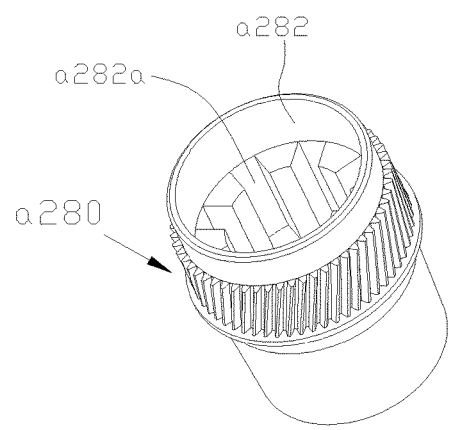
FIG. 61a and FIG. 61b are schematic structural diagrams of a transmitting component in Embodiment Nine.
Figure 61B:
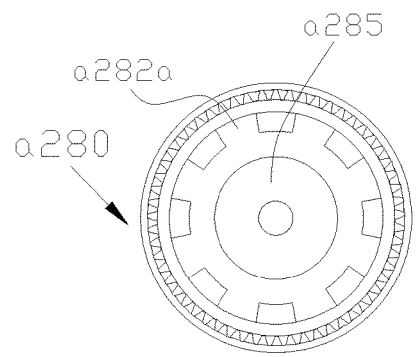

Alternatively, as shown in FIG. 60b, the connection portion a320 is divided by the diameter portion of the circular hole a320b as a first connection portion a321 and a second connection portion a322, where the first connection portion a321 includes the protrusion a320d of non-circular cross section and the upper half of the base a320a, and the second connection portion a322 includes the lower half of the base a320a. The connecting parts a330 are connected in series via the connection wire a340; then the connection wire a340 is installed in the half-circle groove a320x; the connecting parts a330 are installed in the corresponding grooves a320c respectively; at last, the first connection portion a321 and the second connection a322 are installed together. In the present embodiment, the first connection portion a321 and the second connection portion a322 can be installed together via latching, welding or gluing etc.

When the connecting part a330 moves together with the coupling component a210 and contacts with the inner wall of the cavity a282 of the transmitting component a280, the inner wall of the cavity a282 applies a force on the connecting part a330; at this time the connecting part a330 rotates inversely along direction aY for avoiding, so that the coupling component a210 keeps on moving along direction aX; when the external force disappears, the coupling component a210 moves along the direction opposite to the previous moving direction, and under the action of the first return spring a400, the connecting part a330 swings along direction aY, and finally returns to the initial position.

Embodiment Ten

Figure 63:
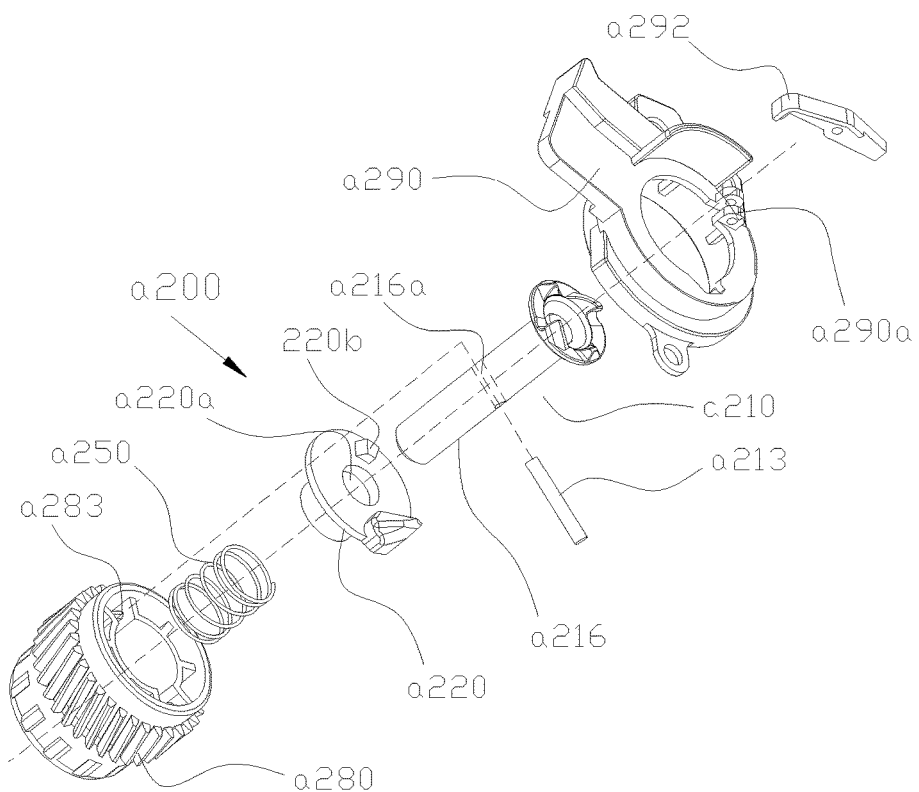
FIG. 63 is a schematic structural diagram of a rotational force driving assembly in Embodiment Ten.

As shown in FIG. 63, in Embodiment Ten, the baffle plate a290, the elastic member a250 etc of the rotational force driving assembly a200 are referred to the relevant parts of Embodiment Six, which will not be repeated here, the main difference lies in the pressing plate a292, the pressing component a220 and the transmitting component a280 of Embodiment Ten. Differing from Embodiment Six, the sliding block structure is not included in the present embodiment.

Figure 64:
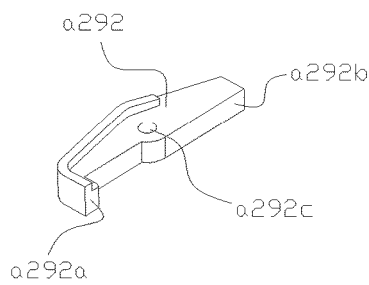
FIG. 64 is a schematic structural diagram of a pressing plate in Embodiment Ten.

The pressing plate a292 is hinged with an acting block a290a on the surface of the baffle plate a290, the pressing plate a292 can rotate about the acting block a290a, and the pressing plate a292 and the acting block a290a are assembled at a position adjacent to the front end of the baffle plate a290 with respect to the installation direction of the process cartridge aC. As shown in FIG. 64, the pressing plate a292 is rotatably hinged with the acting block a290a of the baffle plate a290 via a circular hole a292c, one end thereof is a pressing portion a292a which contacts the protrusion a220b on the surface of the pressing component a220; preferably, in order to avoid structure interference with the baffle plate a290, the pressing portion a292a is configured as a bend structure in the present embodiment. The other end of the pressing plate a292 is a pressed portion a292b.

Figure 65:
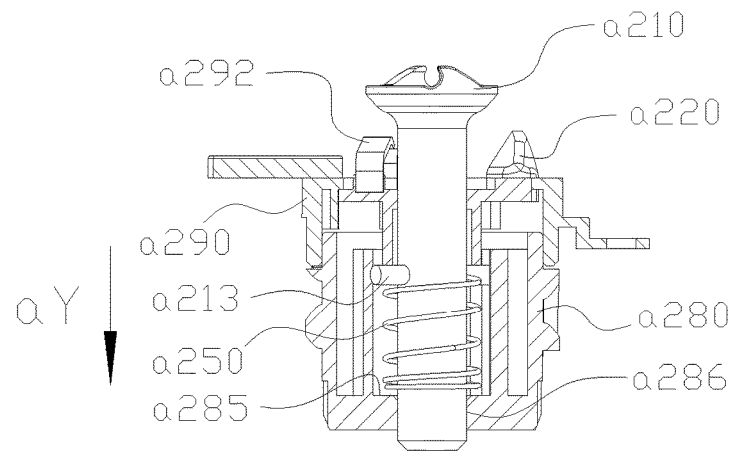
FIG. 65 is a schematic diagram showing the movement of a coupling component with respect to a transmitting component in Embodiment Ten.

As shown in FIG. 65, inserting the coupling component a210 into the circular hole a220a of the pressing component a220; after the circular hole a216a is located below the pressing component a220, inserting the connecting part a213 into the circular hole a216a of the coupling component a210, so that the coupling component a210 fits with the pressing component a220 to be a whole part. The bottom surface a285 of the transmitting component a280 is provided with a circular hole a286, after the coupling component a210 is installed on the transmitting component a280, the connecting part a216 of the coupling component a210 will go through the circular hole a286, so that the coupling component a210 can move along direction aY through the positioning of the circular hole a286 and the circular hole a220a of the pressing component a220. The inner wall of the transmitting component a280 is further provided with a limiting sliding groove a283, after the coupling component a210 is installed in the transmitting component a280, the two ends of the connecting part a213 will be located in the limiting sliding groove a283, so that the transmitting component a280 can rotate together with the coupling component a210. A spring a250 is further provided between the connecting part a213 and the bottom surface a285 of the cavity a282, one end of the spring a250 abuts the bottom surface a285, the other end abuts on the connecting part a213, and the spring a250 will apply a force along the direction opposite to the direction aY on the connecting part a213, so that the connecting part a213 abuts on the lower surface of the pressing component a220.

The installing process of the process cartridge can be referred to Embodiment Six, which will not be repeated here, the main difference between the present embodiment and Embodiment Six lies in the removing process of the process cartridge aC from the electrophotographic image forming device.

Figure 66A:
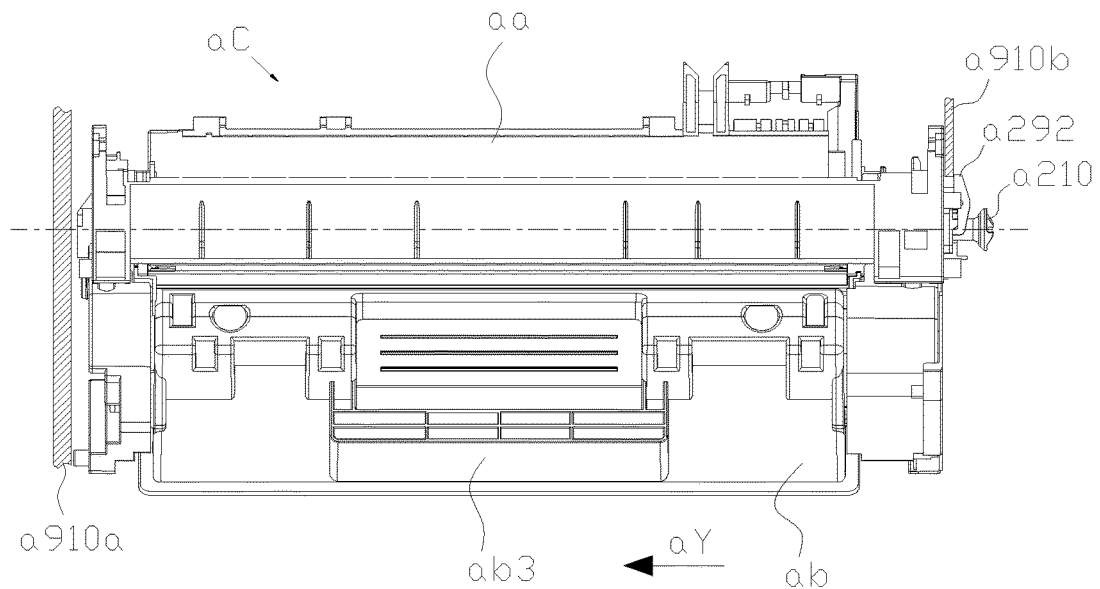
FIG. 66a and FIG. 66b are schematic diagrams showing the process of removing the process cartridge from an electrophotographic image forming device in Embodiment Ten.
Figure 66B:
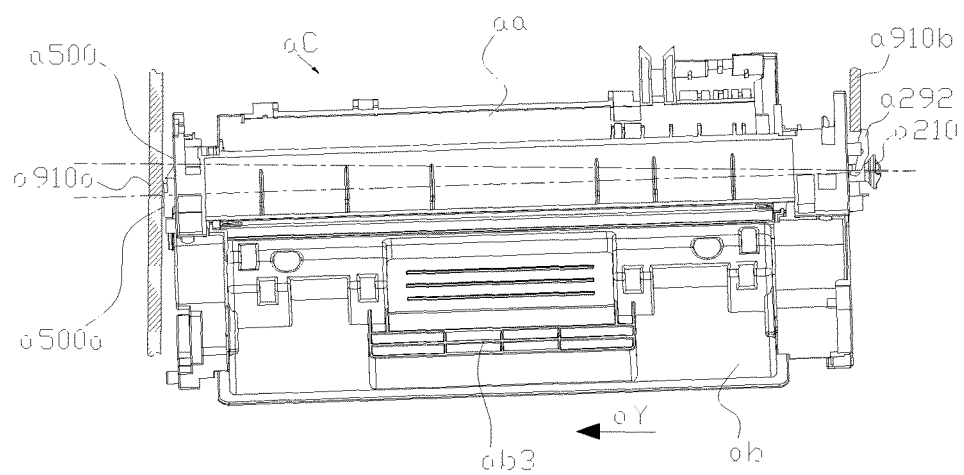

As shown in FIG. 66a, when the process cartridge aC is installed in the electrophotographic image forming device, the axial direction of the rotating part of the process cartridge aC is substantially perpendicular to the lateral wall of the electrophotographic image forming device; when removing the process cartridge aC from the electrophotographic image forming device, as shown in FIG. 66b, the process cartridge aC will incline to a certain angle due to the tight engagement of the driving head a900 and the coupling component a210 or/and the user catching the catching portion ab3 in the middle of the process cartridge aC to draw it out; at this time, as the process cartridge aC inclines, the pressed portion a292b of the pressing plate a292 contacts the lateral wall a910b, the lateral wall a910b will apply a force on the pressed portion a292b, so that the pressing plate a292 rotates about the hinge point; the pressing portion a292a which contacts the protrusion a220b of the pressing component a220 presses the pressing component a220, pushes the pressing component a220 to move downward and then press the connecting part a213 so that the coupling component a210 also moves downward along direction aY; the rotational force driving assembly a200 and the driving head a900 disengages, thus the process cartridge aC is successfully removed from the electrophotographic image forming device.

Embodiment Eleven

Figure 67:
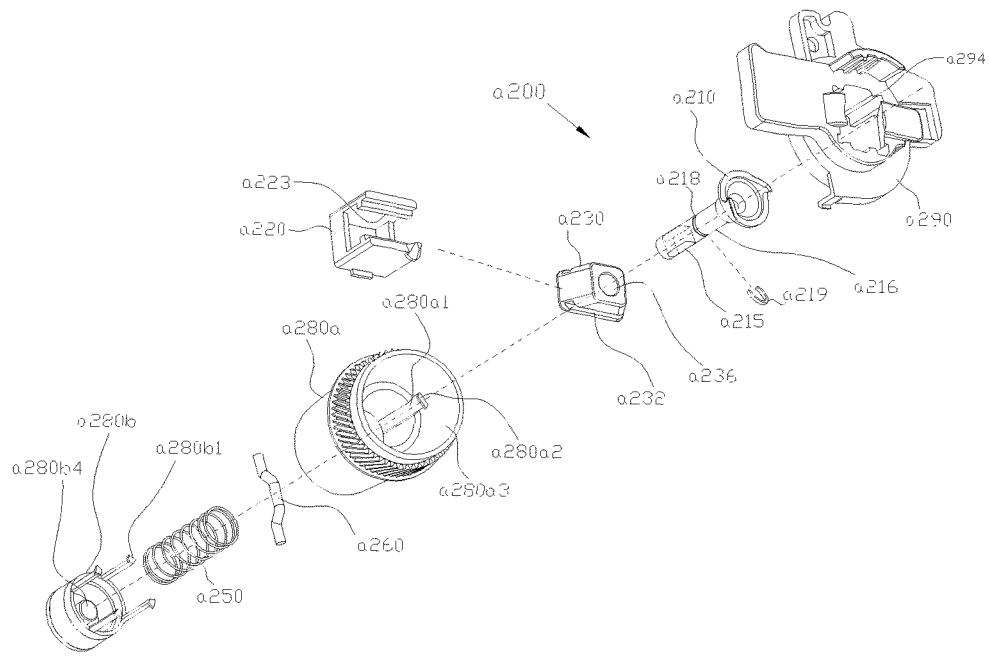
FIG. 67 is a schematic structural diagram of a rotational force driving assembly in Embodiment Eleven.

As shown in FIG. 67, in Embodiment Eleven, the baffle plate a290, the elastic member a250, the sliding piece a230 etc of the rotational force driving assembly a200 are referred to the relevant parts of Embodiment Six, which will not be repeated here, the main difference lies in the transmitting component a280 of Embodiment Eleven.

As shown in FIG. 68a and FIG. 68b, the transmitting component a280 includes a gear portion a280a and an end cover a280b. The gear portion a280a is a through hole, a limiting sliding groove a280a1 is provided in its interior, and a stopping block a280a2 is provided on the limiting sliding groove a280a1; the end cover a280b includes a circular cover portion a280b3 which fits with the gear portion a280a, a limiting block a280b2 and a latching buckle a280—b1 which fixes the gear portion a280a and the end cover a280b together.

As shown in FIG. 68b, the assembling relationship between the gear portion a280a and the end cover a280b is: assembling one end of the end cover a280b with the latching buckle a280b1 from the bottom of the gear portion a280a, the latching buckle a280b1 enters an opening a280a3 of the gear portion a280a, and is pressed by the inner wall of the opening a280a3 and deforms inward; until the end cover a280b moves to the set position, the latching buckle a280b1 latches a positioning boss a280a4 provided on the inner wall of the opening a280a3, meanwhile, the limiting block a280b2 contacts the bottom surface of the gear portion a280a.

As shown in FIG. 67 and FIG. 69, assembling relationship among the parts of the rotational force driving assembly a200 is: the pressing component a220 fits with the sliding groove a232 at two sides of the surface of the sliding piece a230 in a slidable manner through the built-in long sliding block a223; the coupling component a210 goes through the through hole a236 of the sliding piece a230 and the pressing component a220 through the connecting part a216, the limiting surface a212 of the coupling component a210 abuts the positioning surface a235 of the sliding piece a230; the latching buckle a219 is embedded in the latching slot a218 of the coupling component a210 stretched from the sliding piece a230 so as to fix the coupling component a210 on the sliding piece a230 in axial direction; the installed pressing component a220, the coupling component a210, the sliding piece a230 and the latching buckle a219 are installed as a whole in the opening a280a3 of the gear portion a280a. The connecting part a260 is installed from the bottom opening of the gear portion a280a, and goes through the sliding groove a215 of the coupling component a210, two ends of the connecting part a260 are limited in the limiting sliding groove a280a1 in the opening a280a3; one end of the spring a250 is fixed on the fixing cylinder a280b4 of the end cover a280b, then the end cover a280b is installed on the gear portion a280a from one end where the connecting part is installed into, and fixed with the gear portion a280a through the latching buckle a280b1.

The relative movement relationship between the coupling component and the transmitting component can be referred to the movement relationship in Embodiment Six.

Through the structure configuration in Embodiment Eleven, after assembling the rotational force driving assembly, the two ends of the limiting sliding groove a280a1 are closed, the connecting part can only move in the limiting sliding groove, so that the rotational force driving assembly can form as a whole. In addition, the connection manner of the end cover and the gear portion can be achieved by welding, gluing etc.

Figure 70A:
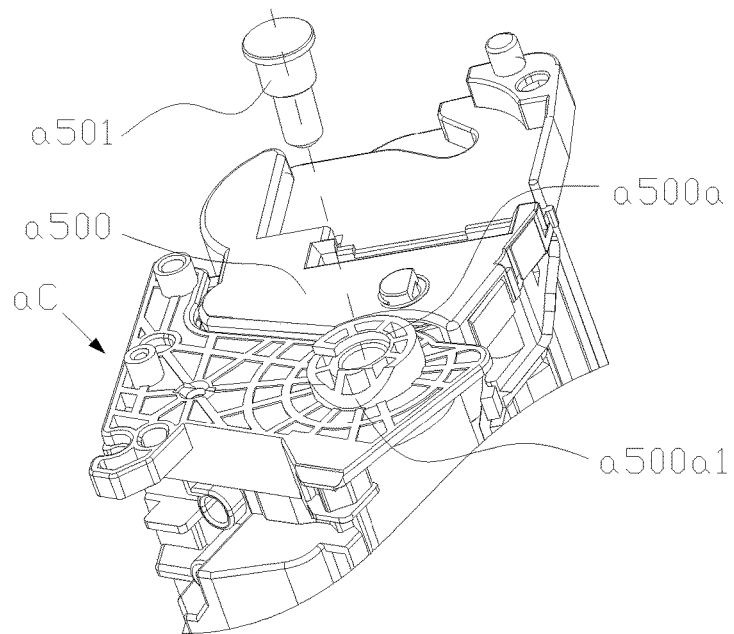
FIG. 70a, FIG. 70b and FIG. 70c are schematic structural diagrams of a limiting protrusion in Embodiment Six to Embodiment Eleven.
Figure 70B:
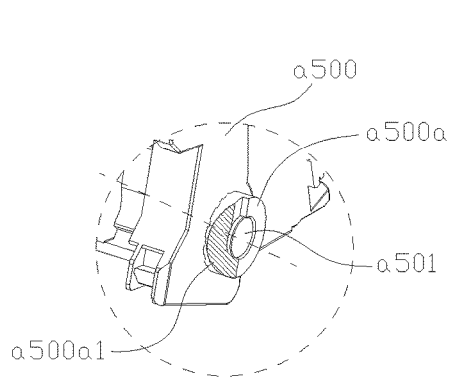

From the above Embodiment Six to Embodiment Eleven, in order to facilitate the user to remove the process cartridge aC from the electrophotographic image forming device more easily, as shown in FIG. 66b, FIG. 70a, FIG. 70b, the other end a500 which is distal to the coupling component a210 of the process cartridge aC is provided with a limiting protrusion a500a; the limiting protrusion a500a abuts a lateral wall a910a in the electrophotographic image forming device when installing the process cartridge aC into the electrophotographic image forming device, so as to limit the displacement of the process cartridge aC in the axial direction in the electrophotographic image forming device, and prevent the coupling component a210 of the process cartridge aC from disengaging with the driving head a900 on another lateral wall a910b during developing operation.

Figure 70C:
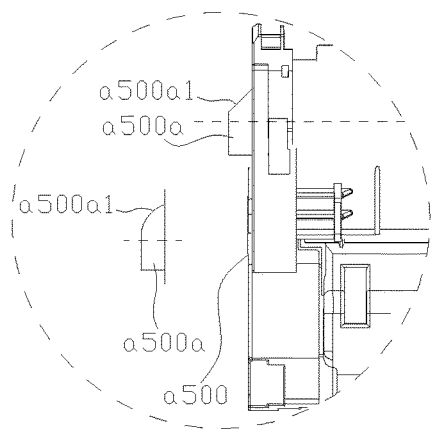
Figure 71:
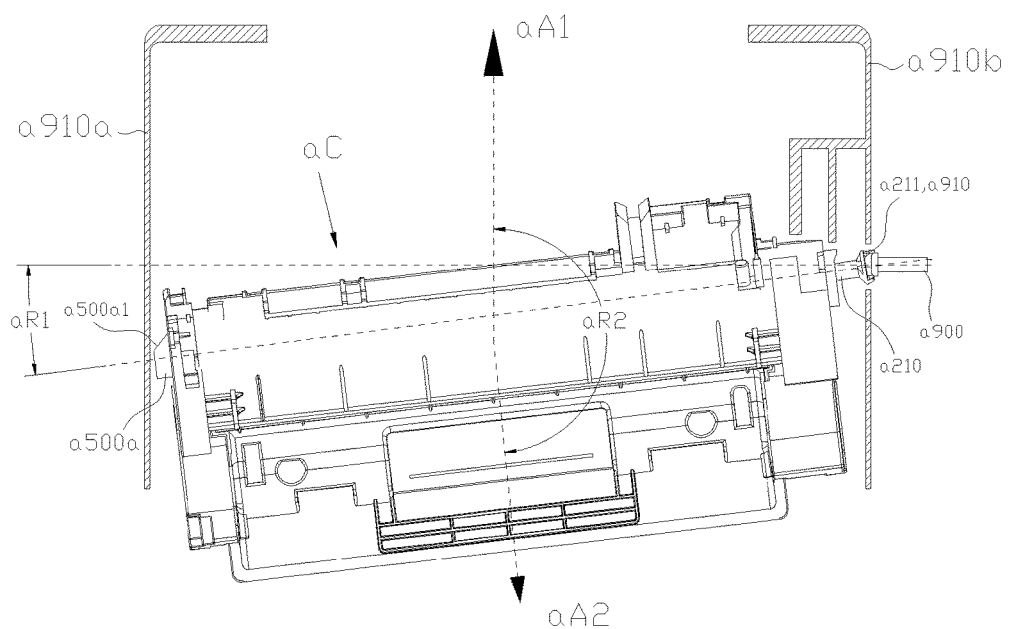
FIG. 71 is a schematic diagram of the installation direction and the removing direction of the process cartridge in Embodiment Six to Embodiment Eleven.

A conductive pin a501 which is conductive with the photosensitive member a10 is provided in the limiting protrusion a500a. The limiting protrusion a500a is provided with a guiding surface a500a1, the guiding surface a500a1 gradually extends outward with respect to the housing surface of the other end a500 of the process cartridge; the guiding surface a500a1 is provided adjacent to the front end with respect to the installation direction aA1 of the process cartridge, and the guiding surface a500a1 is preferably a bevel or a curved surface inclining with respect to the axial direction of the developing member a30 or the photosensitive member a10, as shown in FIG. 70c. As shown in FIG. 71, when removing the process cartridge aC from the electrophotographic image forming device, through the configuration of the guiding surface a500a1, the abutting surface between the limiting protrusion a500a and the lateral wall a910a reduces, so that during the removing process of the process cartridge aC the rotational axis of the coupling component a210 or the transmitting component a280 inclines with respect to the rotational axis of the driving head a900 (an inclined angle aR1 exists therebetween), or the installation direction aA1 of the process cartridge aC inclines with respect to the removing direction aA2 (an inclined angle aR2 exists therebetween). Through the relative inclining of the process cartridge aC, a space of a certain extent forms between the coupling component a210 and the driving head a900; at this time the projection a211 disengages with the driving pin a910, it is easier to remove the process cartridge aC from the electrophotographic image forming device, and the structure interference between the limiting protrusion a500a of the process cartridge aC and the lateral wall a910a or between the coupling component a210 and the driving head a900 is reduced.

Figures 72A, 72B:
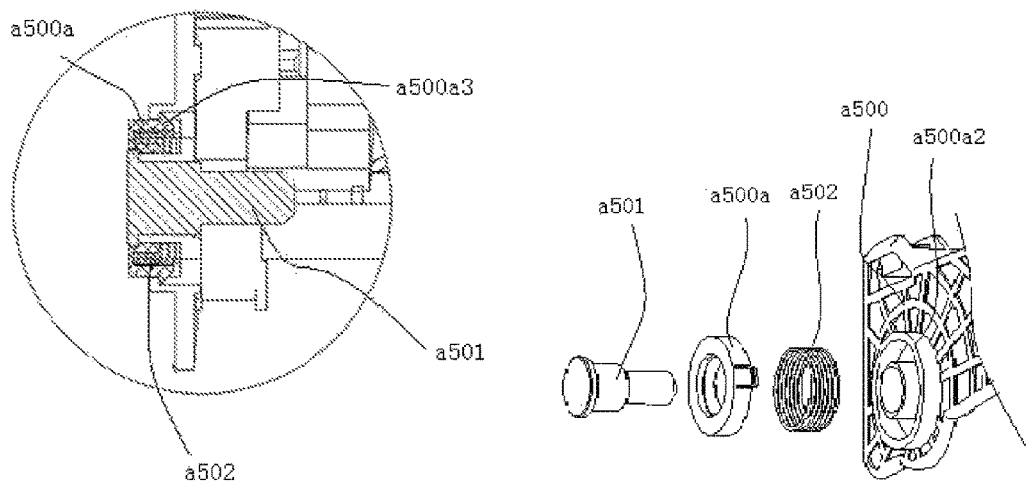
FIG. 72a and FIG. 72b are schematic structural diagrams of the stretchable limiting protrusion in Embodiment Six to Embodiment Eleven.

In addition, as shown in FIG. 72a and FIG. 72b, the limiting protrusion a500a can also adopt a stretchable structure with respect to the housing of the process cartridge aC, which further includes an elastic member a502 and a latching slot a500a2 provided on the housing of the other end a500 for fitting with the limiting protrusion a500a. The assembling relationship therebetween is: the elastic member a502 is provided in the concave hole of the limiting protrusion a500a, then the limiting protrusion a500a is installed in the latching slot a500a2, and is fixed in the latching slot a500a2 through the latching buckle a500a3 of the limiting protrusion a500a, so that the limiting protrusion a500a is stretchable with respect to the housing of the other end a500 of the process cartridge aC through the elastic member a502. Finally, the conductive pin a501 passes through the limiting protrusion a500a, the elastic member a502 is inserted into the circular hole of the latching slot a500a2. Preferably, the elastic member a502 in the present embodiment is a spring or an elastic sponge. Through the above stretchable limiting protrusion a500a, when removing the process cartridge aC from the electrophotographic image forming device, under the pressing through the abutment of the lateral wall a910a, the limiting protrusion a500a retracts inward to avoid structure interference with the lateral wall a910a, so that the process cartridge aC can be inclined with respect to the installation direction aA1 when being removed so as to facilitate removing of the process cartridge aC.

Figure 73:
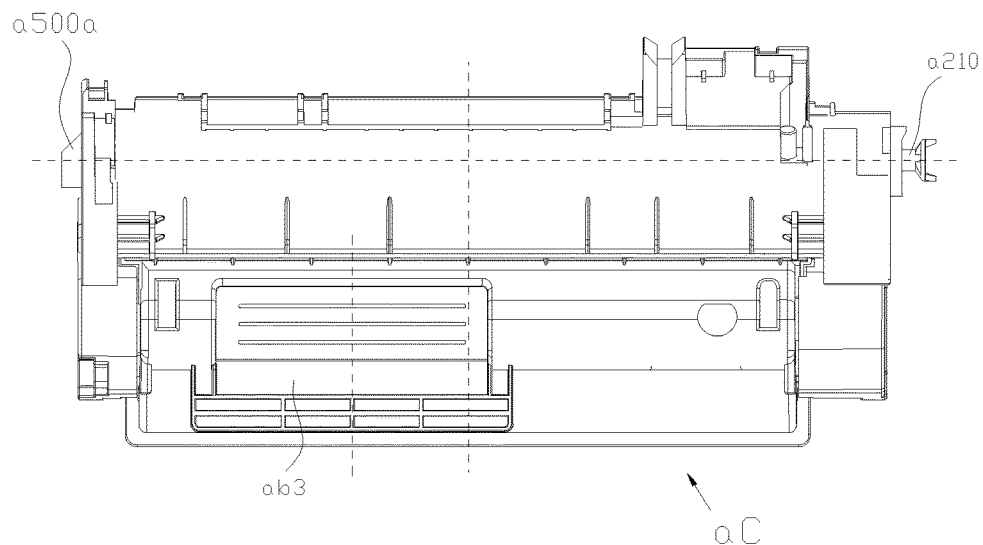
FIG. 73 is a schematic structural diagram of a catching portion of the process cartridge in Embodiment Six to Embodiment Eleven.

In addition, as shown in FIG. 73, in order to facilitate the process cartridge aC to be removed from the electrophotographic image forming device easier and achieve the relative inclining during the removing process, the catching portion ab3 on the process cartridge aC is closer to the limiting protrusion a500a on one end of the housing of the process cartridge aC than the rotational force driving assembly a200 on the other end of the housing of the process cartridge aC. In this way, through the configuration of the catching portion ab3 which deviates from the center of the housing of the process cartridge aC, the user can more conveniently remove the process cartridge aC from the electrophotographic image forming device, and it is easier to perform the relative inclined removing action of the process cartridge aC.

As shown in FIG. 71, that is, during the installation and removing process of the above process cartridge aC, when the user installs the process cartridge aC into the electrophotographic image forming device, the rotational axis of the coupling component or the transmitting component of the process cartridge aC is substantially perpendicular to the installation direction aA1 of the process cartridge aC; when removing the process cartridge aC from the electrophotographic image forming device, since the process cartridge aC is inclined due to the engagement of the coupling component a210 and the driving head a900 or the configuration of the guiding surface a500a1, the removing direction of the process cartridge aC is inclined with respect to the installation direction or inclined with respect to the rotational axis of the driving head a900.

Embodiment Twelve

Figure 74:
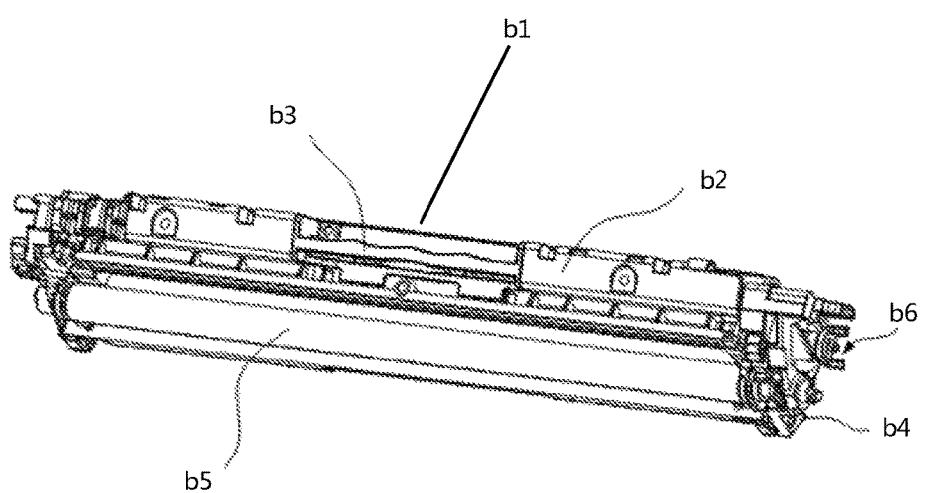
FIG. 74 is a schematic structural diagram of a process cartridge in Embodiment Twelve.
Figure 75:
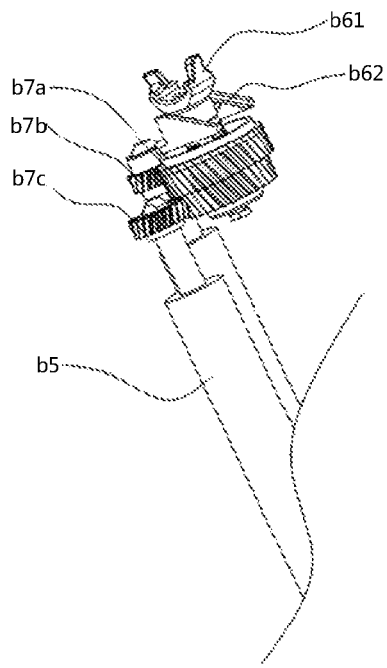
FIG. 75 is a schematic local diagram of the process cartridge in Embodiment Twelve.
Figure 76:
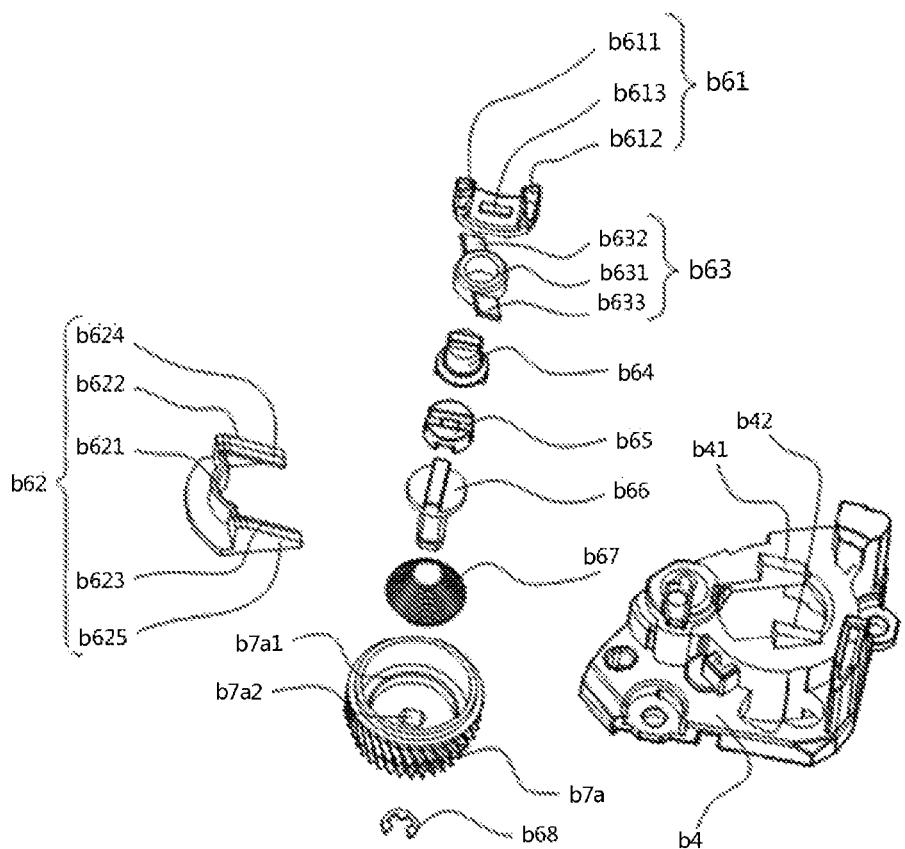
FIG. 76 is a schematic decomposition diagram of a rotational force driving assembly, a side plate and a rotating member of the process cartridge in Embodiment Twelve.

As shown from FIG. 74 to FIG. 76, a process cartridge b1 provided by Embodiment Twelve includes a housing b2, the housing includes a frame body and side plates b4 provided at two sides of the frame body, where the frame body is provided with a developing agent accommodating cavity and a developing member b5 in its interior; a rotational force driving assembly b6 and a gear assembly are provided at the end portion of the process cartridge b1, the gear assembly includes a hub b7a connected with the rotational force driving assembly b6, a developing member gear b7c and a toner feeding member gear b7b which are connected with the hub b7a, in which the hub b7a is preferably adopted as a rotating member which receives the rotational torque of the rotational force driving assembly b6; the rotational force driving assembly b6 includes: a rotational force receiving component b61 configured to receive an external force; a force transmission part which transmits the driving force received by the rotational force receiving component b61 to the rotational member in the process cartridge, and the rotational force receiving component b61 can move with respect to the force transmission part. Preferably, the force transmission part is a cylinder b66, a through hole (not shown) is provided on the cylinder b66, and a pin is inserted in the through hole of the cylinder, the force is transmitted to the hub b7a through the pin (refer to Embodiment Five, FIG. 94 and FIG. 95), or a protrusion (not shown) is extended from the inner wall of the hub b7a, thus the force is transmitted to the hub b7a by the cylinder b66 in an abutting manner between the cylinder b66 and the inner wall of the hub b7a; a guide rail, provided on the side plate b4, the guide rail includes bevels b41 and b42 which incline from the axis of the force transmission part; and an adjusting mechanism b63, located between the rotational force receiving component b61 and the guide rail, the adjusting mechanism b63 is configured so that when the rotational force receiving component b61 moves with respect to the force transmission part, the adjusting mechanism b63 shifts in both the axis direction of the rotational member and the direction perpendicular thereto.

Figure 77:
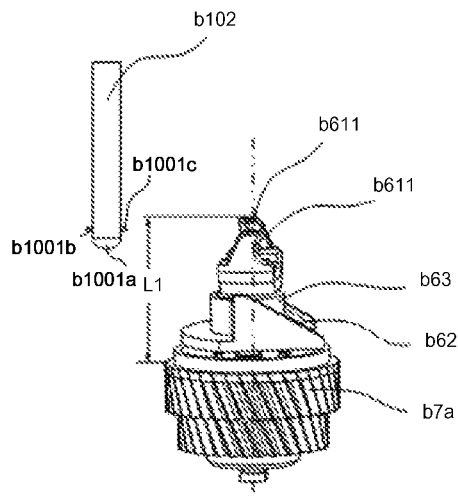
FIG. 77 is a schematic structural diagram of the rotational force driving assembly of the process cartridge in a first state in Embodiment Twelve.
Figure 78:
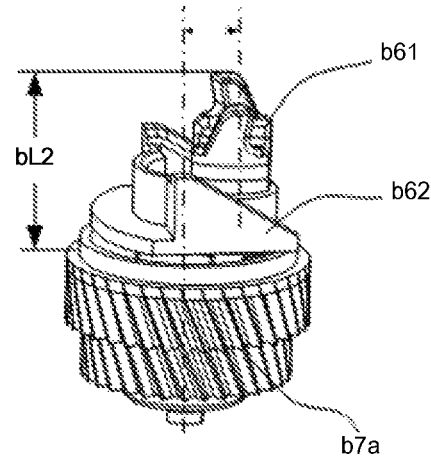
FIG. 78 is a schematic exploded diagram of the rotational force driving assembly, the side plate and the rotating member of the process cartridge in Embodiment Twelve.

The manner that the rotational force receiving component b61 moves with respect to the force transmission part is specifically shown from FIG. 76 to FIG. 78, the rotational force receiving component b61 can be in a first state that it is coaxial with the cylinder b66 and in a second state that it is not coaxial with the cylinder b66. FIG. 77 shows the first state of the rotational force receiving component b61 which is coaxial with the cylinder b66, the distance between the top end of the rotational force receiving component and the upper surface of the hub b7a is bL1. FIG. 78 shows the second state of the rotational force receiving component b61 which is not coaxial with the cylinder. During the process of the driving force adjusting mechanism b63 moving along the guide rail, with respect to the first state, the rotational force receiving component b61 retracts a distance of bL1-bL2 (which is the difference value of the bL1 and bL2) towards the housing of the process cartridge in the axial direction of the rotational force receiving component b61, and deviates a distance of bL3 towards the direction away from the hub b7a in the direction perpendicular to the axial direction of the rotational force receiving component b61, and the axis of the rotational force receiving component b61 is always parallel with the axis of the hub b7a.

As shown in FIG. 76 and FIG. 78, preferably, the rotational force driving assembly b6 includes the rotational force receiving component b61, the adjusting mechanism b63, a limiting component b62, a crossed coupling, where the crossed coupling includes an upper end portion b64, a middle sliding block b65 and a cylinder b66. The rotational force receiving component b61 includes two claws b611 and b612 which fit with the transmitting pins b1001b and b1001c on the rotational force driving head b102 in the electrophotographic image forming device; the whole rotational force receiving component b61 is substantially a flat U shape, thus the U shape bottom can better abut the head portion b1001a of the rotational force driving head b102, and the flat shape facilitates better engagement between the rotational force receiving component b61 and the rotational force driving head b102 when the process cartridge is installed. A protrusion is provided on the upper end portion b64 of the crossed coupling, which can be inserted into the concave hole b613 on the rotational force receiving component b61, obviously, the upper end portion b64 can also be integrated with the rotational force receiving component b61 as a whole. A first groove which fits with the upper end portion b64 is provided on the upper surface of the middle sliding block b65, a second groove perpendicular to the first groove is provided on the lower surface, and the second groove fits with the cylinder b66; in this way, under the action of the crossed coupling, the rotational force receiving component can move about the axis of the hub b7a in a plane. The driving force adjusting mechanism b63 includes a circular sleeve b631 which is sleeved on the cylinder portion of the upper end portion b64, two inclined bosses are extended from a side of the circular sleeve b631, and the two inclined bosses respectively includes an inclined sliding surfaces b632 and b633. A reset part is provided between the cylinder b66 and the inner wall of the hub b7a, the reset part can keep the rotational force receiving component b61 and the crossed coupling in the first state, the reset part can be any member including spring, tension spring or magnet etc, which in the present embodiment is preferably a tapered spring b67, and one end of the tapered spring b67 abuts the inner side of the cylinder b66, the other end abuts a stepped surface b7a1 in the hub b7a. The limiting component b62 includes an inner circle, the inner circle is provided with a circular curved section b621; the two ends of the circular curved section b621 respectively include inner circle planes b622 and b625, and inner bevels b624 and b623 extend inward respectively from the two inner circle planes b622 and b625. After completing assembling the rotational force driving assembly, the inclined sliding surface b632 of the boss is located between the bevel b41 and the inner circular bevel b624, the inclined sliding surface b633 of the boss is located between the bevel b42 and the inner circular bevel b623, and the circular sleeve b631 is sleeved on the outer portion of the upper end portion b64. Before installing the process cartridge b1 in the electrophotographic image forming device, the rotational force receiving component b61 is in the first state shown in FIG. 77; in the process of installing the process cartridge, the rotational force receiving component will abut the rotational force driving head b102, then the rotational force receiving component b61 will be subjected to an external force and move along the opposite direction of the installation direction; during moving of the rotational force receiving component b61, the adjusting mechanism b63 will also receive a same external force, and will move along the guide rail under the action of the external force; to be specific, the inclined sliding surface b632 and b633 of the boss move respectively along the bevels b41 and b42, then the force and the direction of which is opposite to the installation direction, received by the adjusting mechanism b63 is divided into two forces respectively along the axial direction of the rotating member and along the direction perpendicular to the axial direction of the rotating member, and under the action of the driving mechanism b63 the rotational force receiving component b61 will be in the second state; the limiting component b62 can facilitate the movement of the adjusting mechanism along the preset guide rail; after the installation of the process cartridge is accomplished, the rotational force driving head b102 is substantially coaxial with the rotational force receiving component b61 in the axial direction, so that the rotational force receiving component b61 will be in the first state under the action of the reset part, and can receive a rotational force from the rotational force driving head b102. When removing the process cartridge b1 from the electrophotographic image forming device, the rotational force receiving component b61 will turn into the second state from the first state in which the force is transmitted, the rotational force receiving component b61 retracts toward the frame side of the process cartridge in the axial direction of the rotating member, the interference with the rotational force receiving component b61 will not occur, in this way, the process cartridge can be successfully removed; after the process cartridge is completed removed, the rotational force receiving component b61 will turn into the first state under the action of the reset part.

As shown in FIG. 76, preferably, the process cartridge b1 further includes a latching buckle b68 configured to prevent the cylinder b66 from detaching, the cylinder b66 can be inserted into the through hole b7a2 of the hub b7a, and the outer size of the cylinder b66 is less than the size of the hub through hole b7a2, the inner size of the latching buckle b68 is less than the outer size of the cylinder b66 and is larger than the size of the through hole b7a2; in this way, the cylinder b66 can be inserted into the hub through hole b7a2 first, then the latching buckle b68 is latched on the cylinder b66, thus the cylinder b66 will not detach from the hub b7a by using the latching buckle b68.

It should be noted that, the function of the crossed coupling is to better fit with the rotational force receiving component b61 in the second state, so that the axis of the rotational force receiving component b61 is always parallel to the axis of the rotating member; and the upper end portion b64 can be integrated with the rotational force receiving component b61 as a whole.

Embodiment Thirteen

Figure 79:
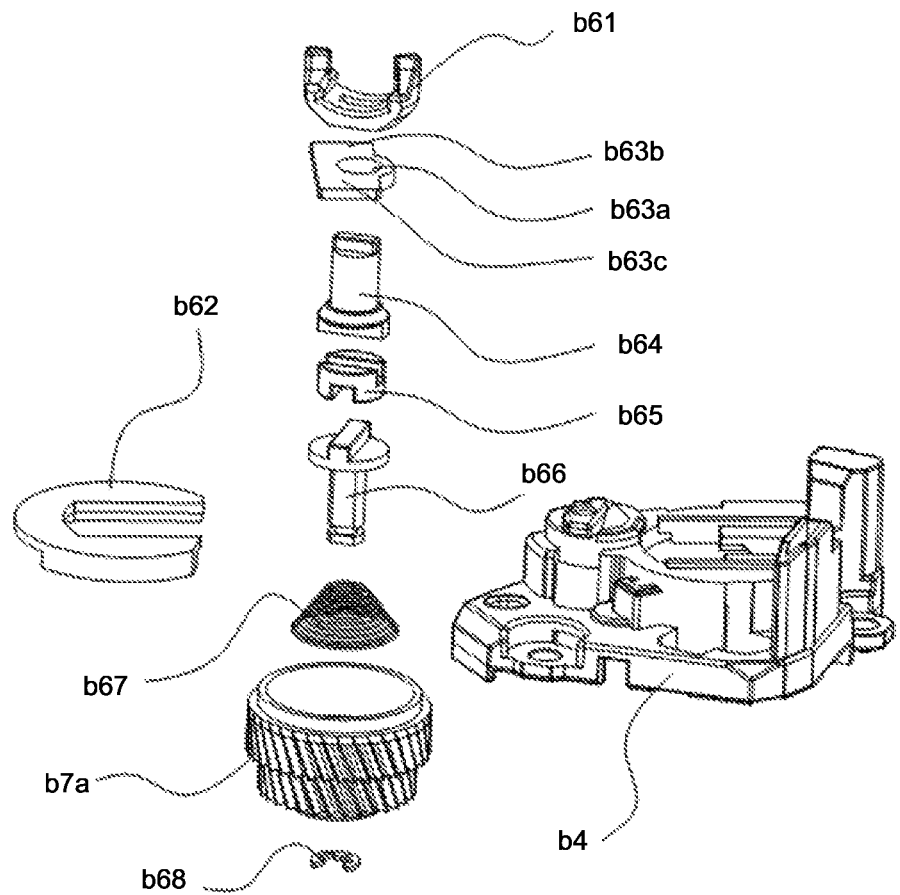
FIG. 79 is a schematic structural diagram of a rotational force driving assembly of a process cartridge in a second state in Embodiment Thirteen.
Figure 80:
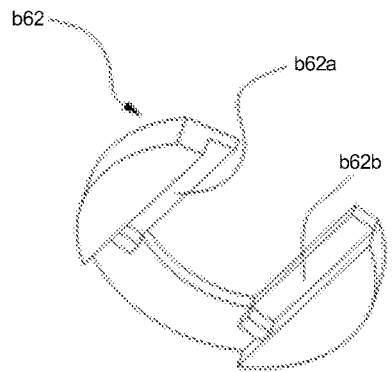
FIG. 80 is a schematic structural diagram of an adjusting mechanism in the rotational force driving assembly of the process cartridge in Embodiment Thirteen.
Figure 81:
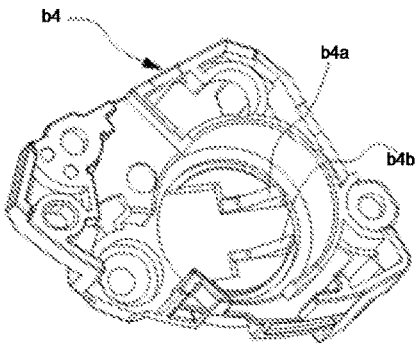
FIG. 81 is a schematic structural diagram of a side plate of the process cartridge in Embodiment Thirteen.

A process cartridge provided by Embodiment Thirteen also includes a housing, the housing also includes a frame body and side plates located on two sides of the frame body, a developing agent accommodating cavity and a developing member; a rotational force driving assembly and a gear assembly, the gear assembly includes a gear connected with the rotational force driving assembly, a developing member gear and a toner feeding member gear which are connected with the hub, in which the gear is preferably adopted as a rotating member which receives the rotational torque of the rotational force driving assembly; and the adjusting mechanism is configured so that when the rotational force receiving component b61 in the rotational force driving assembly moves with respect to the force transmission part, the adjusting mechanism shifts in both the axis direction of the rotational member and the direction perpendicular thereto. The process cartridge further includes a tapered spring b67, one end of the tapered spring b67 abuts the inner side of the cylinder b66, the other end abuts the stepped surface b7a1 in the hub b7a; and a latching buckle b68 configured to prevent the cylinder b66 from detaching from the cylinder b66. However, the difference lies in that:

As shown from FIG. 79 to FIG. 81, the adjusting mechanism b63 moves perpendicular to the axis of the hub b7a, at least a portion of the rotational force driving assembly b6 abuts the bevels b4a and b4b on the guide rail. Specifically, as shown in FIG. 79, the adjusting mechanism b63 includes a second circular sleeve b63a which is sleeved on the bottom of the rotational force receiving component b61 (after the driving assembly is assembled, the bottom of the rotational force receiving component b61 is the upper end portion b64), and second bosses b63b and b63c which are symmetrically provided on the side wall of the circular sleeve. As shown in FIG. 79 and FIG. 80, the rotational force driving assemble is further provided with a limiting component b62, the limiting component b62 includes limiting planes b62a and b62b which fit with the bosses, and the planes (i.e. the upper surface of the boss) of the second bosses b63b and b63c on the adjusting mechanism can slide with respect to the limiting planes b62a and b62b of the limiting component. As shown in FIG. 81, the guide rail includes second bevels b4a and b4b which are provided on the side plate b4.

After the rotational force driving assembly of the process cartridge is assembled, a cylinder b66 which is similar to Embodiment Twelve is arranged coaxial to the hub b7a, under the action of the reset part, the rotational force receiving component b61 is arranged coaxial to the hub b7a; during installing process or removing process of the process cartridge, the rotational force receiving component b61 receives an external force from the rotational force driving head b102 in the electrophotographic image forming device, meanwhile the adjusting mechanism b63 moves along a direction preset by the limiting component b62, through the adjusting mechanism b63, the upper end portion b64 of the crossed coupling at the bottom of the rotational force receiving component b61 moves together with the rotational force receiving component b61; and the upper end portion b64 or the middle sliding block b65 abuts the second bevels b4a and 4b on the side plate b4, in this way, the rotational force receiving component b61 is in the second state which is similar in Embodiment Twelve.

Embodiment Fourteen

Figure 82:
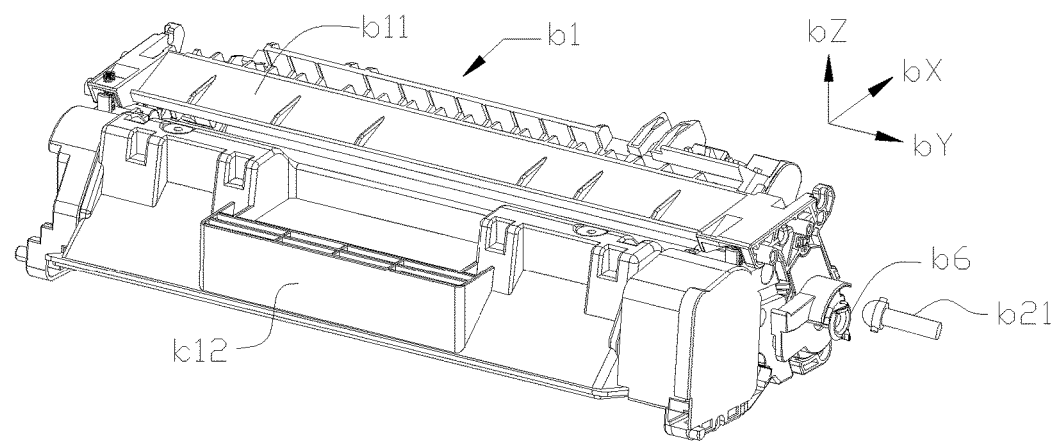
FIG. 82 is a stereo diagram of the process cartridge.

In FIG. 82, the process cartridge b1 includes a developing unit b12 and a cleaning unit b11; in addition, developing agent, a charging member, a developing member and a photosensitive member are also provided in the process cartridge b1. After the process cartridge b1 is installed into the electrophotographic image forming device (not shown in the figure), the rotating part in the process cartridge is driven by the electrophotographic image forming device to rotate, for example, through the engagement between the rotational force driving head b21 in the electrophotographic image forming device and the rotational force driving assembly b6 in the process cartridge, after starting the electrophotographic image forming device, the rotational force driving head b21 transmits a rotational force to the rotational force driving assembly b6, so as to drive the rotating member in the process cartridge to rotate, for example, the photosensitive member which is one of the rotating members is driven to rotate, then photosensitive member or the component provided on the photosensitive member drives other rotating members (such as the charging member, the developing member etc) in the process cartridge, and finally the objective of printing the developing agent in the process cartridge b1 onto the medium is achieved.

As shown in FIG. 82, coordinate direction by is the longitudinal direction of the process cartridge b1, a rail (not shown) for guiding the installation of the process cartridge b1 is provided in the electrophotographic image forming device, specifically, the rail will guide the process cartridge b1 to be installed along a direction perpendicular to the longitudinal direction of the process cartridge, that is, to be installed along the coordinate direction bX. The rotational force driving assembly b6 is arranged at one end of the process cartridge b1 along the longitudinal direction of the process cartridge b1, at least a portion of the rotational force driving assembly b6 is exposed at the end portion of the process cartridge b1 in the longitudinal direction; the rotational force driving head b21 is arranged in the electrophotographic image forming device in a direction perpendicular to the installation direction of the process cartridge b1, and is opposite to the end portion of the process cartridge b1 at which the rotational force driving assembly b6 is provided. After the process cartridge b1 is installed in the electrophotographic image forming device, the rotational force driving assembly b6 engages with the rotational force driving head b21 to transmit force. The rotational force driving assembly b6 includes an engaging portion, an adjusting mechanism and an intermediate connection portion; the engaging portion is configured to receive an external driving force; the adjusting mechanism makes the engaging portion shift with respect to the longitudinal direction of the process cartridge, and makes the axis of the engaging portion deviate substantially in parallel with respect to the axis of the photosensitive member; the intermediate connection portion transmits torque between the engaging portion and the photosensitive member hub.

Figure 83:
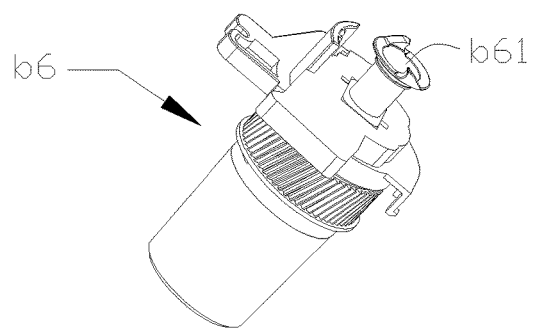
FIG. 83 is a stereo diagram of a rotational force driving assembly in Embodiment Fourteen.
Figure 84:
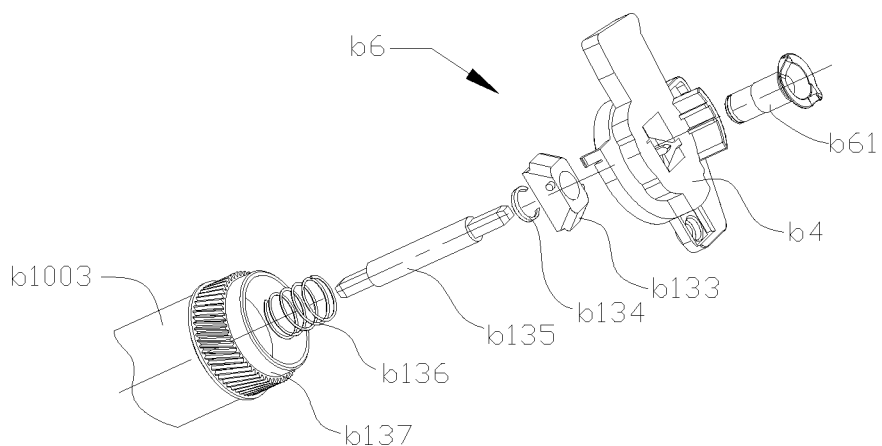
FIG. 84 is an exploded diagram of the rotational force driving assembly in Embodiment Fourteen.

FIG. 83 is a stereo diagram of the rotational force driving assembly b6, FIG. 84 is an exploded diagram of the rotational force driving assembly b6. As shown in FIG. 84, the rotational force driving assembly b6 includes the rotational force receiving component b61, the side plate b4, a wedge base b133, a latching buckle b134, a flexible shaft b135, a spring b136 and a photosensitive member hub b137. In the present embodiment, the rotational force driving assembly b6 is arranged at one end portion of the photosensitive member b1003, the photosensitive member hub b137 is coaxial to the photosensitive member b1003 and is fixedly connected thereto; under the condition that no external force exists, the axis of the of the rotational force receiving component b61 is coaxial to the axis of the photosensitive member hub b137. The engaging portion is the rotational force receiving component b61, the adjusting mechanism includes the side plate b4, the wedge base b133 and the spring b136, at least a portion of the intermediate connection portion is provided as reelable, the reelable portion is the flexible shaft b135.

Figure 85:
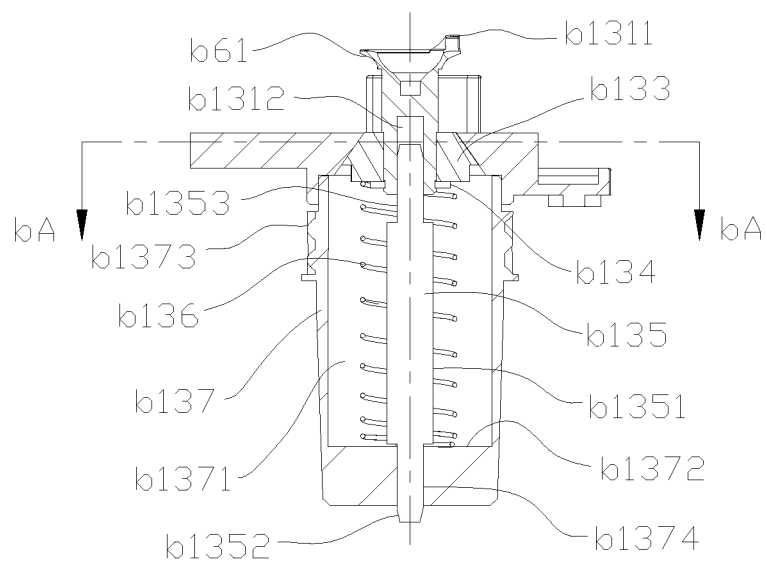
FIG. 85 is a schematic assembling drawing of the rotational force driving assembly in Embodiment Fourteen.

FIG. 85 is a schematic assembling drawing of the rotational force driving assembly b6. As shown in FIG. 85, the outer periphery of the photosensitive member hub b137 is provided with a hub gear b1373, a hollow portion b1371 is in its interior, the bottom thereof includes a hub boss b1372, the hub boss b1372 is provided with a square hole b1374; and end portion of the rotational force receiving component b61 includes a plurality of claws b1311, in the present embodiment preferably two claws, which are configured to engage with the rotational force driving head in the electrophotographic image forming device to transmit force; as shown in FIG. 86, the body portion of the rotational force receiving component b61 is of cylindrical structure, its outer periphery is provided with a cylindrical boss b1313, so that the diameter bD2 of the outer periphery of a portion of the cylinder of the rotational force receiving component b61 is less than the diameter bD1 of the outer periphery of another portion of the cylinder (as shown in FIG. 87), the cylinder portion with diameter bD1 is closer to the end portion at which the claw b1311 of the rotational force receiving component b61 is located, the other end portion of the body is provided with a latching slot b1314, configured to install the latching buckle b134; in addition, FIG. 87 is a cross sectional diagram of the rotational force receiving component b61, a blind hole b1312 is provided in the interior of the rotational force receiving component b61, and the cross section of the blind hole b1312 is a square.

The flexible shaft b135 shown in FIG. 88 includes a body portion b1351, a first end portion b1352 and a second end portion b1353; the body portion b1351 is cylindrical, the first end portion b1352 and the second end portion b1353 are cut as square shape to fit with the square hole b1374 at the end portion of the photosensitive member hub b137 and fit with the square blind hole b1312 in the rotational force receiving component b61. The square hole b1374 can be arranged at two ends of the flexible shaft b135, accordingly, the end portion of the rotational force receiving component b61 can be made as square cylinder which can fit with the square hole b1374, a square cylinder which may fit with the square hole b1374 is accordingly provided in the photosensitive member hub b137.

Specifically, the structure of the flexible shaft is formed by winding a plurality of layers of steel wires, the area bJ shown in FIG. 89 shows the interior structure of the flexible shaft b135, which is another layer of winded steel wire, and is wrapped inside the outer layer; the area bK shown in the partial sectional diagram of FIG. 90 shows that the flexible shaft b135 is formed by winding a plurality of layers of steel wires; specifically, the winding direction of each layer of steel wire is the same, that is, all right-handed rotation or all left-handed rotation; the plurality layers of steel wire can be two layers, three layers or more, which can be arranged according to design requirements, the rigidity of the flexible shaft as well as its capability of transmitting torque can be changed by changing the diameter of the steel wire or the number of winding layers of the flexible shaft.

Figure 91:
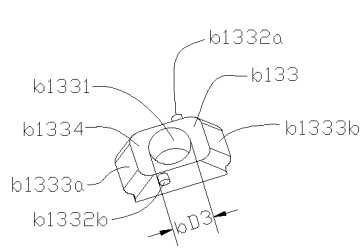
FIG. 91 is a stereo diagram of a wedge base in Embodiment Fourteen.

FIG. 85 shows the wedge base b133, FIG. 91 is a stereo diagram of the wedge base b133 (the same with the sliding piece a230 in Embodiment Six). A base through hole b1331 is provided at the middle portion of the wedge base b133, the base through hole b1331 is configured to fit with the cylindrical body portion of the rotational force receiving component b61, the diameter bD3 of the base through hole b1331 is less than the diameter bD1 of the outer periphery of the rotational force receiving component b61, and fits with the cylinder of the bD2 portion shown in FIG. 87; after the rotational force receiving component b61 is installed into the base through hole b1331 of the wedge base b133, the latching buckle b134 shown in FIG. 85 is latched into the latching slot b1314 of the rotational force receiving component b61, the upper top surface b1334 of the wedge base (the same with the positioning surface a235 of Embodiment Six) abuts the surface of the cylindrical boss b1313 (the same with the limiting surface a212 of Embodiment Six) of the rotational force receiving component b61, so that the rotational force receiving component b61 is relatively fixed and connected to the wedge base b133, and the rotational force receiving component b61 can rotate with respect to the wedge base b133; the wedge base b133 includes two base inclined sliding surface b1333a and b1333b located at opposite sides, base protrusions b1332a and b1332b are provided at the other two opposite sides of the wedge base b133.

Figure 92:
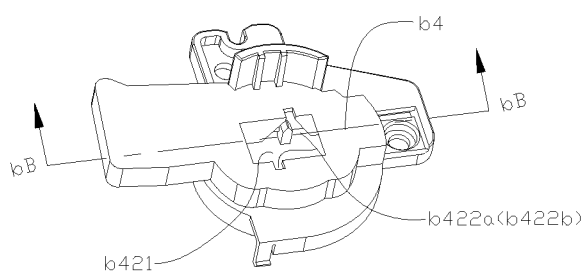
FIG. 92 is a stereo diagram of a side plate in Embodiment Fourteen.

FIG. 85 shows the side plate b4, FIG. 92 is a stereo diagram of the side plate b4. The middle portion of the side plate b4 includes a hollow portion b421 (the same with the inner hole a299 of Embodiment Six), configured to place the wedge base b133. The inner surface of opposite sides of the side plate hollow portion b421 is provided with two side plate concave portion b422a and b422b, configured to place the base protrusion b1332a and b1332b provided on the wedge base b133.

Figure 93:
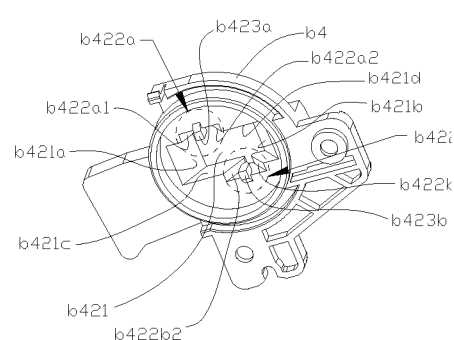
FIG. 93 is a diagram of the side plate diagramming from another bottom direction in Embodiment Fourteen.

FIG. 93 is a diagram of the side plate b4 diagramming from the bottom surface, as shown in the figure, the inner surface of the side plate hollow portion b421 includes a pair of side plate bevels b421a and b421b located at opposite sides, the two side plate bevels fit with base inclined sliding surfaces b1333a and b1333b of the wedge base; the inner surface of the side plate hollow portion b421 further includes two opposite side plate planes b421c and b421d; side plate concave portions b422a and b422b shown in FIG.

Figure 94:
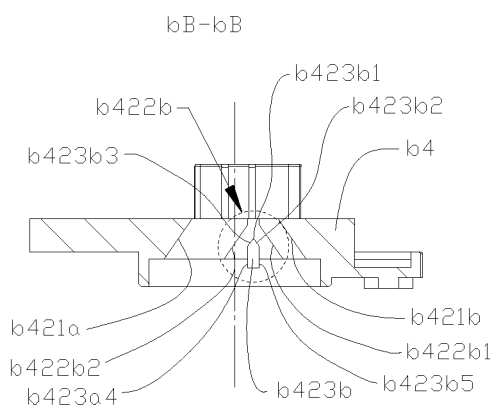
FIG. 94 is a sectional diagram along bB-bB shown in FIG. 92.
Figure 95:
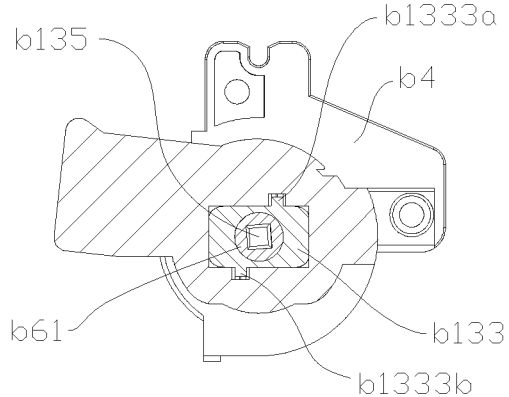
FIG. 95 is a sectional diagram along bA-bA shown in FIG. 85.

92 are respectively arranged on the side plate planes b421c and b421d, which is shown by the dotted circle in FIG. 93; the side plate concave portions b422a and b422b are of the same structure, and are arranged on opposite positions of the lateral planes b421c and b421d, however, the opposite positions are not in a connection line, but are arranged stagger; the shape of the side plate concave portion is a structure like an inverted triangle with upper end opening narrower than the lower end opening, as shown in the sectional diagram of FIG. 94; the side plate concave portion b422a includes concave bevels b422a1 and b422a2 which are in mirror symmetry, a protrusion b423a which protrudes towards the interior of the side plate hollow portion b421 is provided on the central axis of these two mirror symmetrical concave bevels; since the structures of the side plate concave portions b422b and b422a are the same, the side plate concave portion b422b includes symmetrical concave bevels b422b1 and b422b2, and is further provided with a protrusion b423b.

FIG. 94 shows the sectional diagram bB-bB of the side plate b4, the shape of the side plate concave portion b422b and its position on the side plate are shown as the dotted circle, the top of the protrusion b423b is a tip portion, which includes a protrusion vertex b423b1, vertex inclined sliding surface b423b2 and b423b3 located at two sides of the protrusion vertex b423b1, and vertex planes b423b4 and b423b5 located at two sides of the protrusion vertex.

Through the understanding of the structures of each part of the rotational force driving assembly b6, the assembling relationship of the rotational force driving assembly b6 can be understood. To be specific, FIG. 85 is a schematic assembling drawing of the rotational force driving assembly b6. First the wedge base b133 is installed into the side plate hollow portion b421 of the side plate b4 according to matching relationship of its shape, the matching relationship after the wedge base b133 is installed into the side plate hollow portion b421 of the side plate b4 is as shown in bA-bA sectional diagram of FIG. 95, the base protrusions b1332a and b1332b are respectively located in the side plate concave portions b422b and b422a of the side plate b4; then the rotational force receiving component b61 is installed into the base through hole b1331 of the wedge base b133, the latching buckle b134 is latched into the latching slot b1314, so that the rotational force receiving component b61 is relatively fixed with the wedge base b133; then one end of the flexible shaft b135 is inserted into the square hole b1374 of the hub b137, the spring b136 is sleeved on the flexible shaft b135, and then the assembled wedge base b133, the rotational force receiving component b61 and the side plate b4 are installed as a whole on the photosensitive member hub b137, the blind hole b1312 of the rotational force receiving component should be aligned with the other end of the flexible shaft b135 to be installed, then the side plate is fixed on the process cartridge via a screw, so as to fix the rotational force driving assembly b6 on the process cartridge b1. Through the fit of the end portion of the flexible shaft b135, the photosensitive member hub b137 and the base through hole b1331 of the wedge base b133, the objective of force transmission can be achieved. After assembling, the photosensitive member hub b137 is coaxial with the photosensitive member b1003 and is relatively fixed thereto, the flexible shaft b135 and the spring b136 are arranged between the photosensitive member hub b137 and the rotational force receiving component b61, one end of the spring b136 abuts the hub boss b1372 of the photosensitive member hub b137, the other end abuts the bottom surface of the wedge base b133; after assembling, the spring b136 has a certain amount of compression, so that the wedge base b133 contacts the hollow portion of the side plate b4, and the wedge base b133 can slide with respect to the side plate b4, during the relative movement, the rotational force receiving component b61 is driven to shift along the direction of its axis bF2, and the axis bF2 is substantially parallelly offset with respect to the axis bF1 of the photosensitive member hub (the axis of the photosensitive member hub is coaxial with the axis of the photosensitive member); before the relative sliding between the wedge base b133 and the side plate b4, the base protrusions b1332a and b1332b on the wedge base are respectively located above the protrusion vertexes b423b1 and b423a1 of the protrusions b423b and b423a on the side plate b4; when the wedge base b133 and the side plate b4 slide relatively, meanwhile, the base protrusions b1332a and b1332b on the wedge base can slide with respect to the concave bevels b422b1 and b422a2 at the same time, or slide with respect to the concave bevels b422b2 and b422a1.

Figure 96A:
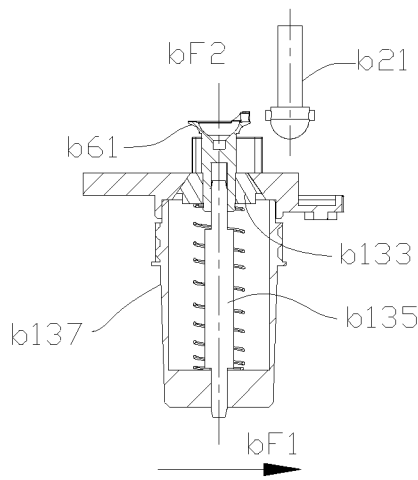
FIG. 96a to FIG. 96d are diagrams showing a change of relative position between a rotational force driving assembly and a rotational force driving head in an electrophotographic image forming device when the process cartridge is installed into the electrophotographic image forming device in Embodiment Fourteen.
Figure 96B:
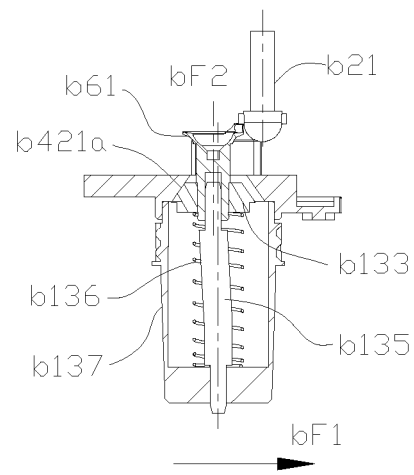
Figure 96C:
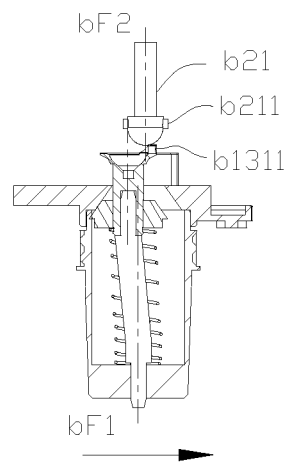
Figure 96D:
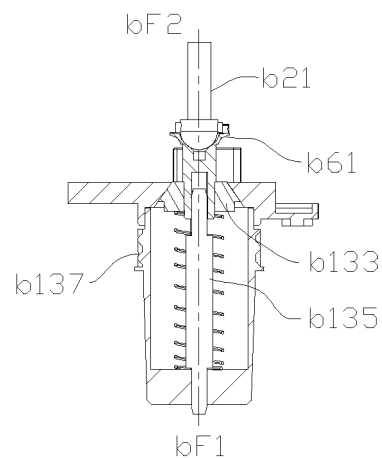

FIG. 96a to FIG. 96d are schematic diagrams which show the process that the process cartridge is installed into the electrophotographic image forming device, and the rotational force receiving component b61 located on the end portion of the process cartridge b1 engages with the rotational force driving head b21 in the electrophotographic image forming device. In the figures, the direction shown by the arrow is the installation direction of the process cartridge b1 (the installation direction is perpendicular to the longitudinal direction of the process cartridge). When installing the process cartridge b1 into the electrophotographic image forming device along the direction shown by the arrow, the end portion of the rotational force receiving component b61 contacts the end portion of the rotational force driving head b21 in the electrophotographic image forming device, at this time, they are in the interference stage, as shown in FIG. 96; as the further installation of the process cartridge b1, the rotational force receiving component b61 makes the wedge base b133 slide with respect to the side plate b4 through the interaction force between the rotational force receiving component b61 and the rotational force driving head b21, at this time, the rotational force receiving component b61 deviates towards the direction opposite to the installation direction of the process cartridge b1, that is, the base inclined sliding surface b1333a of the wedge base b133 relatively slides with respect to the side plate bevel b421a which engages with it; at this time, the base protrusion b1332a on the wedge base slides along the side plate bevel b422b2 of the side plate b4, the base inclined sliding surface b1333a slides along the side plate bevel b421a; the axis F2 of the rotational force receiving component b61 is parallelly offset with respect to the axis bF1 of the photosensitive member hub b137, and the rotational force receiving component b61 retracts in its axis bF1 and along the direction opposite to the extending direction of the rotational force receiving component from the process cartridge, which gradually deforms the flexible shaft b135 to a certain extent, as shown in FIG. 96b and FIG. 96c; until the end portion of the rotational force receiving component b61 avoids the rotational force driving head b21, as shown in FIG. 96c, the rotational force receiving component b61 extends due to the springback effect of the spring b136 and engages with the transmitting pin b211 on the end portion of the rotational force driving head b21 through the claw b1311 on its end portion, at this time, the flexible shaft returns to the initial state, as shown in FIG. 96d, so that the process cartridge is installed in place. Starting the electrophotographic image forming device, the force can be transmitted to the rotational force receiving component b61 through the rotational force driving head b21, then the rotational force can be transmitted to the photosensitive member hub b137 through the flexible shaft, and then the force is transmitted to the rotating members in the process cartridge.

Figure 97A:
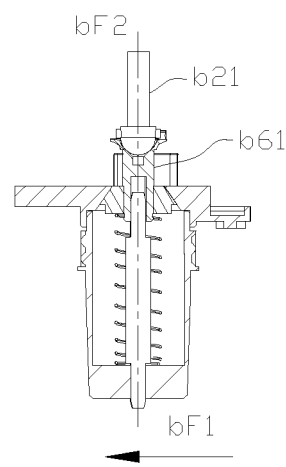
FIG. 97a to FIG. 97d are diagrams showing a change of relative position between the rotational force driving assembly and the rotational force driving head in the electrophotographic image forming device when the process cartridge is removed from the electrophotographic image forming device.
Figure 97B:
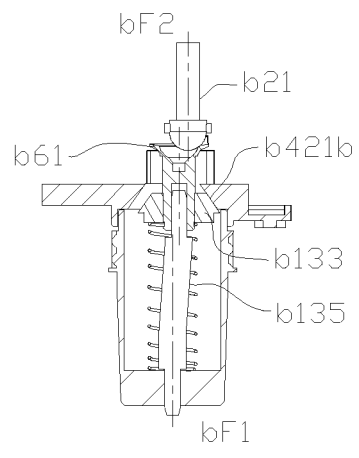
Figure 97C:
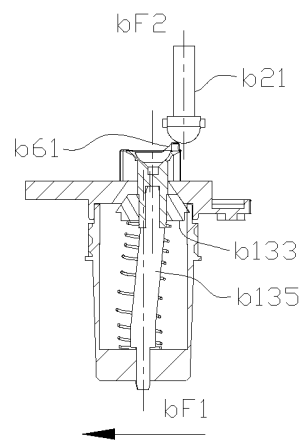
Figure 97D:
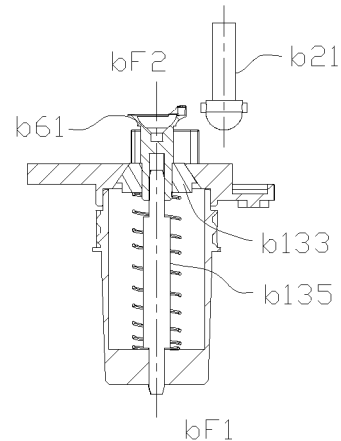

FIG. 97a to FIG. 97d are schematic diagrams which show the process that the process cartridge is uninstalled from the electrophotographic image forming device, and the rotational force receiving component b61 arranged on the end portion of the process cartridge disengages with the rotational force driving head b21 in the electrophotographic image forming device. FIG. 97a shows the state that the rotational force receiving component b61 still engages with the rotational force driving head b21; when uninstalling the process cartridge along the direction shown by the arrow, the rotational force receiving component b61 makes the wedge base b133 to slide with respect to the side plate b4 through the interaction between the rotational force receiving component b61 and the rotational force driving head b21; at this time, the inclined sliding surface b1333b of the wedge base b133 in FIG. 97a slides with respect to the side plate bevel b421b in the side plate b4 which contacts with it, as shown in FIG. 97b; meanwhile the protrusion b1332a on the wedge base slides along the concave bevel b422b1 in the side plate b4, the protrusion b1332b slides along the concave bevel b422a2; under the interaction between the rotational force receiving component b61 and the rotational force driving head b21, the rotational force receiving component b61 retracts gradually, and its axis bF2 parallelly offsets with respect to the axis bF1 of the photosensitive member hub b137, as the uninstalling of the process cartridge b1 from the electrophotographic image forming device, the flexible shaft b135 is bended and deformed, as shown in FIG. 97b and FIG. 97c, until the rotational force receiving component b61 completely disengages from the rotational force driving head, as shown in FIG. 97c; the rotational force receiving component b61 returns to the initial state under the action of the spring b136, the flexible shaft also returns to the initial state, as shown in FIG. 97d; at last, the process cartridge b1 is uninstalled from the electrophotographic image forming device.

Figure 98:
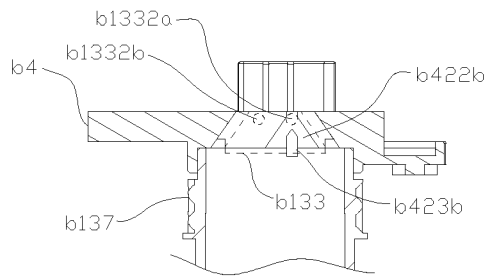
FIG. 98 is a schematic diagram showing the relative movement between the wedge base and the side plate during the engaging process of the rotational force driving assembly and the rotational force driving head in the electrophotographic image forming device.

FIG. 98 to FIG. 101 are schematic diagrams which show the relative movement between the wedge base and the side plate during the process of engagement between the rotational force driving assembly and the rotational force driving head of the electrophotographic image forming device. In order to illustrate the relative movement, the wedge base b133 is denoted with dotted line, the other parts are shown in sectional diagram. As shown in FIG. 98, the dotted line shows the wedge base b133, the side plate b4 is arranged at the end portion of the photosensitive member hub b137, the wedge base is arranged at the middle portion of the side plate b4; a protrusion b423a is provided on the side plate b4, a base protrusion b1332a is provided on the lateral side of the wedge base b133, the base protrusion b1332a relatively slides in the side plate concave portion b422b provided on the side plate b4; when the rotational force driving assembly is not under the action of external force, the base protrusion b1332a on the wedge base b133 is above the protrusion b423b on the side plate b4.

Figure 99:
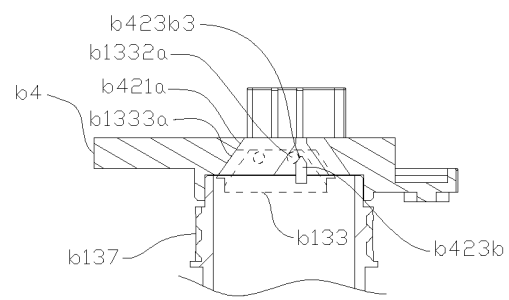
FIG. 99 is a schematic diagram showing the relative movement between the wedge base and the side plate during the engaging process of the rotational force driving assembly and the rotational force driving head in the electrophotographic image forming device.

When installing the process cartridge into the electrophotographic image forming device, the rotational force receiving component b61 on the rotational force driving assembly abuts the rotational force driving head b21 in the electrophotographic image forming device, the action generated between the two parts is applied to the rotational force receiving component b61, the rotational force receiving component b61 further acts on the wedge base b133, the wedge base b133 then slides with respect to the side plate b4 as shown in FIG. 99; that is, the base inclined sliding surface b1333a of the wedge base b133 fits with the side plate bevel b421a and relatively slides, and the base protrusion b1332a on the wedge base b133 slides with respect to the bevel b423b3 on the protrusion portion of the side plate b4; thus, the wedge base b133 can drive the rotational force receiving component b61 to parallelly offset with respect to the axis of the photosensitive member hub b137; and the bevel b421a is parallel to the bevel b423b3, which can limit the swinging of the wedge base b133 along the direction perpendicular to the axial direction of the photosensitive member hub b137.

Figure 100:
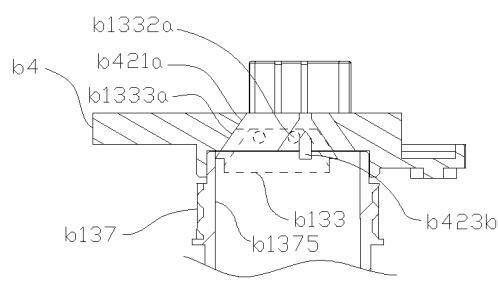
FIG. 100 is a schematic diagram showing the relative movement between the wedge base and the side plate during the engaging process of the rotational force driving assembly and the rotational force driving head in the electrophotographic image forming device.

When the wedge base b133 relatively slides with respect to the side plate b4 to a certain extent, the lower end portion of the inclined sliding surface b1333a of the wedge base b133 contacts the inner surface b1375 of the photosensitive member hub b137, as shown in FIG. 100.

Figure 101:
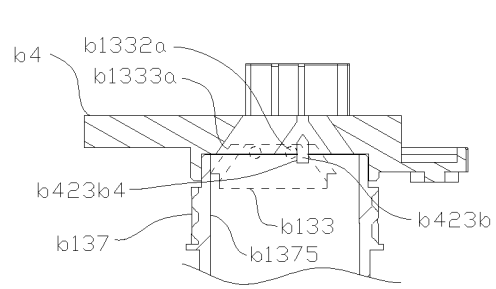
FIG. 101 is a schematic diagram showing the relative movement between the wedge base and the side plate during the engaging process of the rotational force driving assembly and the rotational force driving head in the electrophotographic image forming device.

As shown in FIG. 101, after the inclined sliding surface b1333a of the wedge base b133 contacts the inner surface of the photosensitive member hub b137 is blocked, the relative offset of the wedge base b133 with respect to the axis of the photosensitive member hub b137, the rotational force receiving component b61 is further subjected to a force, and acts on the wedge base b133, the base inclined sliding surface b1333a of the wedge base 133 abuts on the inner surface b1375 of the photosensitive member hub, and the base protrusion b1332a of the wedge base contacts the lateral plane b423b4 on the protrusion b423b of the side plate; thus, the wedge base b133 can shift in the direction parallel to the axis of the photosensitive member hub b137 through the two parallel planes b1375 and b423b4 limiting the sliding of the wedge base b133.

Figure 102:
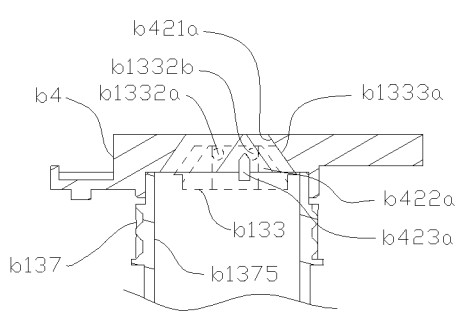
FIG. 102 is a schematic diagram showing the relative movement between the wedge base and the side plate during the engaging process of the rotational force driving assembly and the rotational force driving head in the electrophotographic image forming device.

FIG. 102 is a sectional diagram in the direction opposite to the sectional diagrams shown from FIG. 98 to FIG. 101, the dotted line shows the wedge base b133. As shown in FIG. 102, the other plane of the wedge base b133 which is opposite to the plane where the protrusion b1332a is located is provided with a protrusion b1332b which is of the same structure with the protrusion b1332a but is not symmetrically arranged with the protrusion b1332a; similarly, the hollow portion of the side plate b4 is further provided with a concave portion b422a on the plane opposite to the plane where the concave portion b422b is located, the concave portion b422a is of the same structure with the concave portion b422b; at the moment when the protrusion b1332a relatively slides in the concave portion b422a, the protrusion b1332b relatively slides in the concave portion b422a. The movement is the same with the movement shown from FIG. 98 to FIG. 101, which will not be repeated here.

Through the above manner, the relative sliding track of the wedge base and the side plate is restrained, and the inclining or swinging of the wedge base during the sliding process is avoided, which guarantee the stability of the operation of the rotational force driving assembly.

Figure 103:
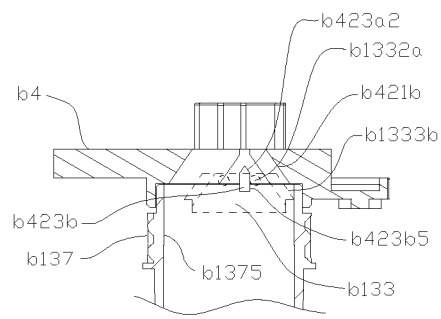
FIG. 103 is a schematic diagram showing the relative movement between the wedge base and the side plate during the disengaging process of the rotational force driving assembly and the rotational force driving head in the electrophotographic image forming device.

When uninstalling the process cartridge from the electrophotographic image forming device, the rotational force driving head b21 provided in the electrophotographic image forming device acts on the rotational force receiving component b61; then the rotational force receiving component b61 acts on the wedge base b133 so that the wedge base b133 slides with respect to the side plate b4, as shown in FIG. 103. At this time, the another inclined plane b1333b on the wedge base b133 relatively slides with respect to another inclined surface b421b of the side plate b4, the base protrusion b1332a of the wedge base slides with respect to the inclined plane b423a2 on the protrusion b423a of the side plate b4 and the plane b423b5 on the other side, the movement of the wedge base b133 is, as described above, limited between the surface b423a2 and b421b and between the surface b423b5 and b1375, the inclining or swinging of the wedge base b133 during the sliding process is avoided, which guarantees the stability of the operation of the rotational force driving assembly. Similarly, the protrusion b1332b has the same relative movement in the concave portion b422a, which will not be repeated here.

The above situation occurs when the rotational force receiving component is subjected to an external force, when the external force disappears, the wedge base can return to the initial state under the action of the spring.

Embodiment Fifteen

Figure 104:
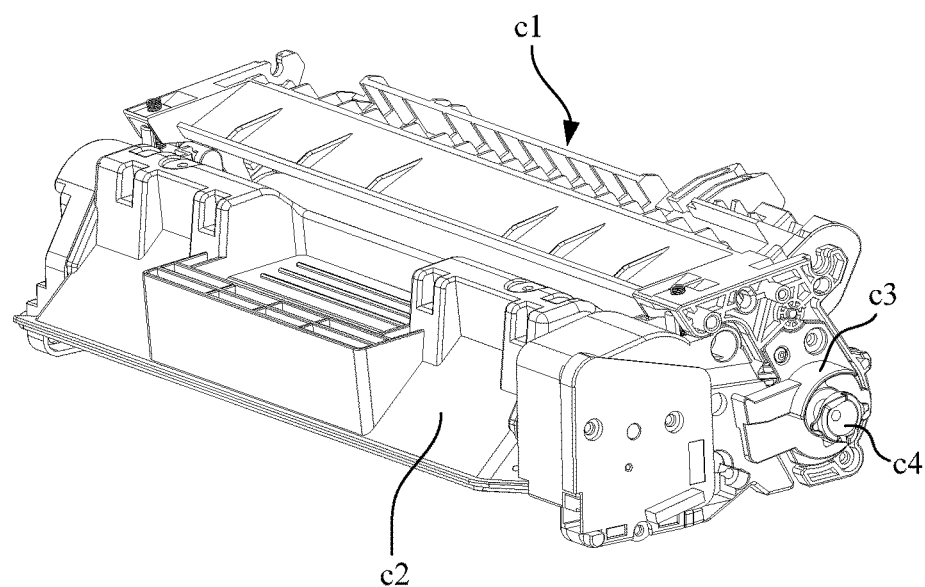
FIG. 104 is a schematic structural diagram of a process cartridge in Embodiment Fifteen.
Figure 105:
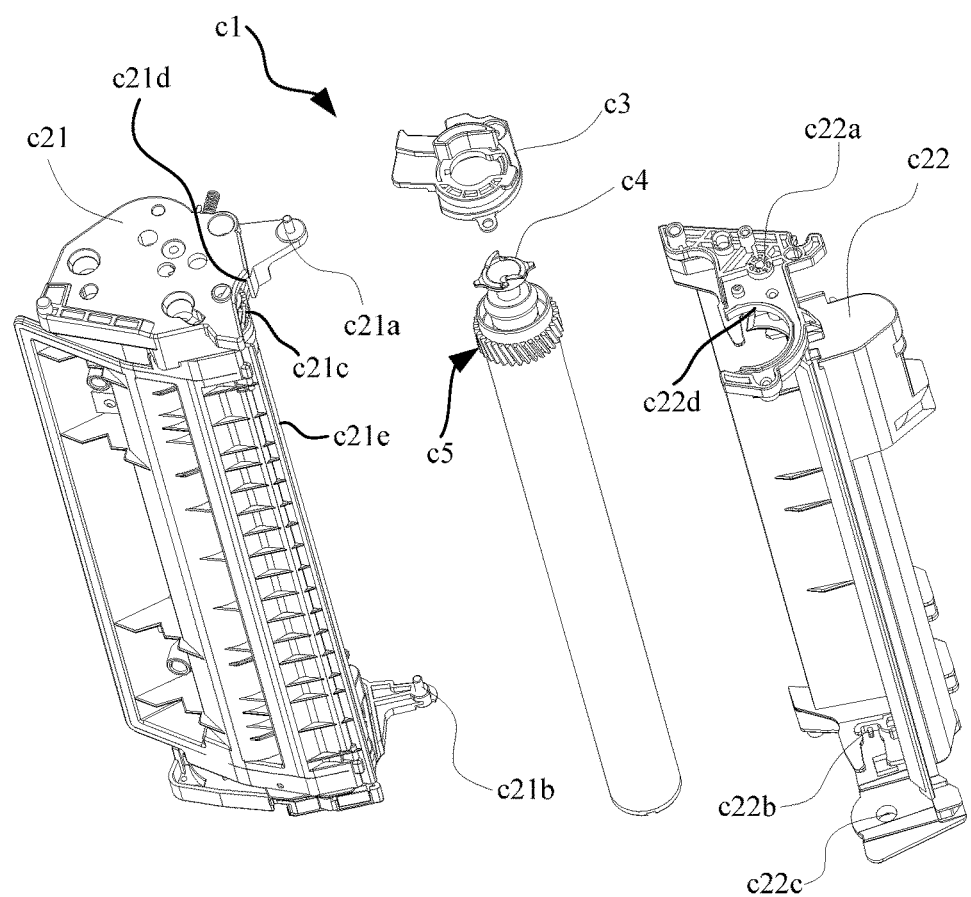
FIG. 105 is a schematic exploded diagram of the process cartridge in FIG. 104.
Figure 106:
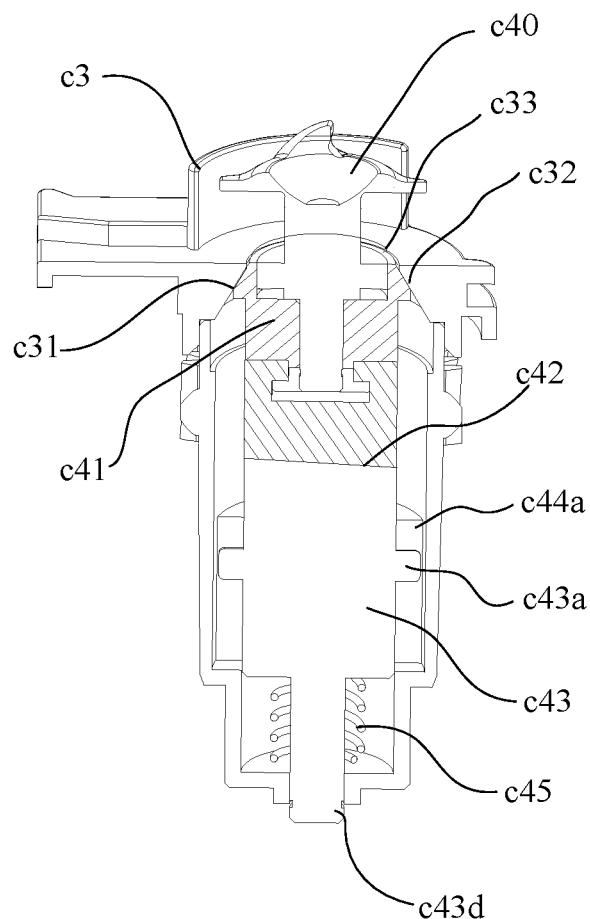
FIG. 106 is a sectional diagram of a driving assembly and a supporting part in the process cartridge in Embodiment Fifteen.

As shown from FIG. 104 to FIG. 106, Embodiment Fifteen provides a process cartridge c1, the process cartridge c1 can be detachably installed into the electrophotographic image forming device. As shown in FIG. 104, the process cartridge c1 includes a process cartridge housing c2, a driving assembly c4 which receives a driving force in the electrophotographic image forming device, a supporting part c3 provided on the lateral wall of the process cartridge housing c2; the supporting part c3 is provided with a through hole, the rotational force driving part c40 of the driving assembly c4 can pass through the through hole, at least a portion of the driving component is exposed outside the process cartridge housing c2.

As shown in FIG. 105 and FIG. 106, the process cartridge c1 includes a toner hopper c21 for accommodating carbon toner, a waste toner hopper c22 for collecting waste toner and a photosensitive member c5; the toner hopper c21 and the waste toner hopper c22 are respectively provided with crescent arcs c21d and c22d for supporting the above supporting part c3; the inner wall of the supporting part c3 is provided with guiding bevels c31 and c32 which limit the swinging of the driving assembly c4, the toner hopper c21 is provided with extending portions c21a and c21b, the waste toner hopper c22 is provided with through holes c22a and c22b, and the extending portions c21a and c21b are respectively hinged with the through holes c22a and c22b through a pins; one end of the photosensitive member c5 is supported through the supporting part c3, the other end is fixed and connected with the through hole c22c of the waste toner hopper c22 through a pin. The driving assembly c4 receives a driving force from the electrophotographic image forming device, and drives the photosensitive member to rotate, and a bevel gear c4a is provided outside the hub c44 of the driving assembly c4, the bevel gear c4a can transmit the force to the magnetic roller c21e through the gear c21c at the end portion of the magnetic roller c21e, the magnetic roller c21e is always parallel to the axis of the photosensitive member.

As shown in FIG. 106, in the driving assembly c4, the driving component c40 which receives the driving force from the electrophotographic image forming device is sleeved in the hub c44 through a coupling, and a spring c45 is provided between the coupling and the hub c44, thus the driving component c40 can retract in the axial direction with respect to the inner wall of the hub c44; so that the process cartridge c1 can be installed into the electrophotographic image forming device.

Figure 107:
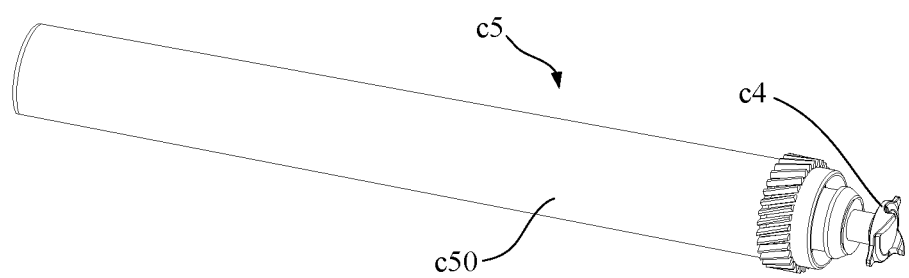
FIG. 107 is a schematic structural diagram of a photosensitive drum assembly in Embodiment Fifteen.

As shown in FIG. 107, the photosensitive member c5 provided by the present embodiment includes a photosensitive drum c50 which can print the image onto the imaging medium (such as paper), the driving assembly c4 provided at the end portion of the photosensitive drum c50; the photosensitive drum includes a hollow cylinder, a layer for forming static sub-image is provided on the surface of the cylinder; the rotational axis of the driving assembly c4 is substantially coaxial with the axis of the photosensitive drum c50.

Figure 108:
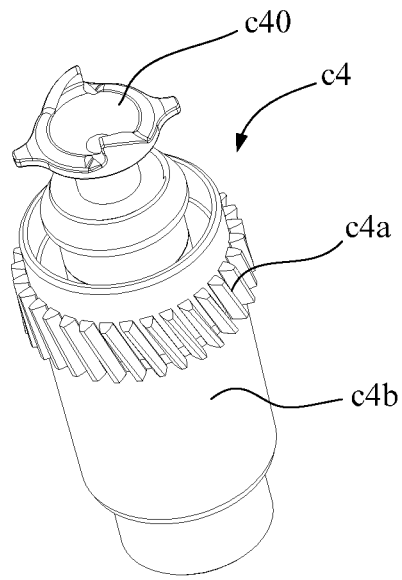
FIG. 108 is a schematic structural diagram of the driving assembly in Embodiment Fifteen.
Figure 109:
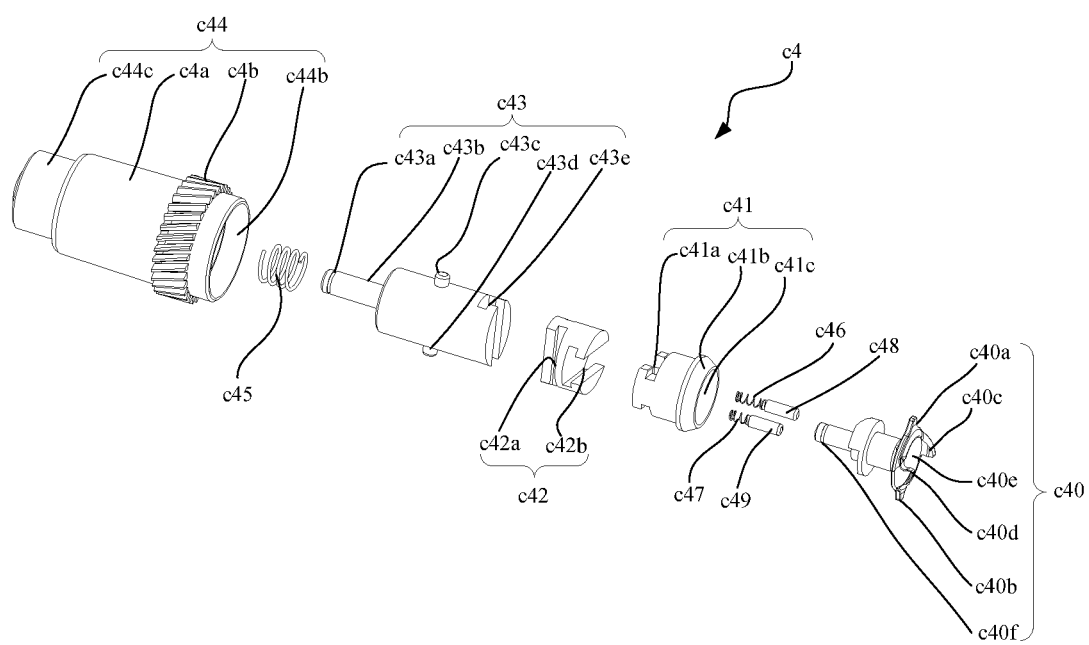
FIG. 109 is a schematic exploded diagram of the driving assembly in Embodiment Fifteen.

As shown in FIG. 108 and FIG. 109, the driving assembly c4 includes a driving component c40 which receives a driving force of the electrophotographic image forming device, a hub c44 of the driving assembly c4 which sleeves the driving component c40, the diameter of the outer wall c4b of the hub c44 is a little larger than the inner diameter of the photosensitive drum c50, in this way, the hub of the driving assembly can be installed into the photosensitive drum c50 in a manner of compressive embedding, and the driving assembly c4 will not detach from the photosensitive drum c50.

Figure 110:
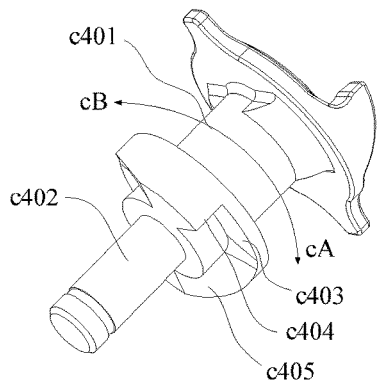
FIG. 110 is a schematic structural diagram of a driving component in the driving assembly in Embodiment Fifteen.

As shown in FIG. 109 and FIG. 110, the preferred driving component c40 of the present embodiment can fit with the rotational force driving head c1002 in the electrophotographic image forming device in FIG. 121. The rotational driving head c1002 includes a driving rod c1002d which connects with the motor, a tapered ball head c1002a provided at the front end of the driving rod c1002d, and transmitting pins c1002b and c1002c provided at two sides of the driving rod c1002d. The driving assembly c4 includes a driving component c40, the driving component c40 is provided with an engaging portion for receiving a driving force and a self-adaptive adjusting portion for adjusting the rotation of the engaging portion; preferably, a groove c40e is provided on the driving component c40, the engaging portion includes two engaging claws c40c and c40d which are symmetrically arranged in the axis direction of the driving component, the engaging claws c40c and c40d are arranged on the periphery of the groove c40e, and the engaging claws c40c and c40d can extend upward along the axial direction of the driving component c40; thus when the driving component c40 engages with the rotational force driving head c1002, the tapered ball head c1002a is located in the groove c40e, the transmitting pins c1002b and c1002c respectively engages with the engaging claws c40c and c40d, thus the rotational force driving head c1002 receives a force from the motor and transmits to the driving component c40. Preferably, the self-adaptive adjusting portion on the driving component c40 includes extending portions c40a and c40b which are arranged on the periphery of the groove c40e along the direction perpendicular to the axial direction of the driving component, the extending portions c40a and c40b are arranged to form about 90° angle relative to the engaging claws c40c and c40d on the periphery of the groove c40e.

Preferably, two grooves are symmetrically provided on the protruding cylinder of the driving component c40, each groove is provided with a first plane c403, the first plane is substantially perpendicular to the axis of the driving component; a second plane c404, which is substantially parallel to the driving component; a first cambered surface c405 which is arranged opposite to the first plane.

Figure 113:
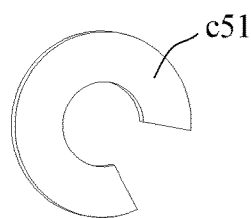
FIG. 113 is a schematic structural diagram of a latching spring in the driving assembly in Embodiment Fifteen.

As shown in FIG. 106 and FIG. 109, the driving component is sleeved in the hub c44 through a coupling, a stretching part is provided between the coupling and the hub c44, configured to control the axial stretching of the driving component c40 and the coupling, preferably, the stretching part is a spring c45 sleeved on the end portion of the coupling, one end of the spring abuts the inner wall of the hub, the other end abuts the coupling; the end portion of the coupling includes a groove c43a, the coupling is latched on the hub c44 through an E shaped latching spring c51 shown in FIG. 113 for latching the groove c43a, so as to avoid the driving component c40 from detaching from the hub c44.

As shown in FIG. 109, the coupling is a crossed coupling, the crossed coupling includes a first part c41, a second part c42, a third part c43, the first part c41 includes an "I" shaped protrusion c41a, the second part c42 includes a sliding groove c42b which fits with the protrusion c41a in the first part and a protrusion c42a corresponding to the sliding groove c42, the third part c43 includes a groove c43e which engages with the protrusion c42a in the second part, pins c43c and c43d which transmit a force to the hub c44, cylinder c43b which is sleeved on the spring c45, and a groove c43a which fits with the E shaped latching spring c51. As shown in FIG. 106, preferably, the sliding surface between the groove c43e and the protrusion c42a is inclined from the axis of the driving component, thus during the process of axial shifting of the driving component c40, there is a larger distance of travel along the axial direction, which facilitates the disengagement of the driving component c40 from the rotational force driving head c1002 in the electrophotographic image forming device.

Figure 112:
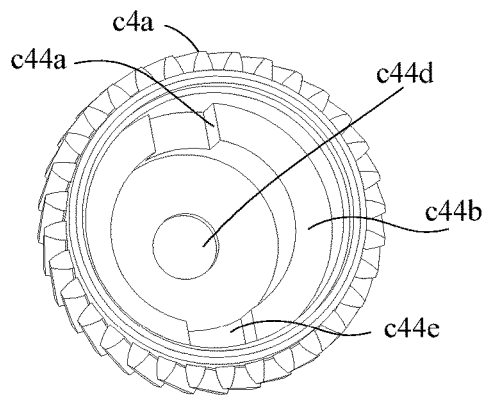
FIG. 112 is a schematic structural diagram of a hub in the driving assembly in Embodiment Fifteen.

As shown in FIG. 109 and FIG. 112, the exterior of the hub c44 is provided with a bevel gear c4a, a concave cavity c44b which accommodates the coupling, a through hole c44d which can let the cylinder c43a on the coupling pass through is provided in the hub c44, two symmetrical grooves c44a and c44e are provided on the inner wall of the hub c44, the grooves respectively fit with the pin c43c and c43d which transmit the force on the coupling, and transmit the rotational force of the driving component c40 to the hub c44, so as to drive the photosensitive drum c50 to rotate.

Figure 111:
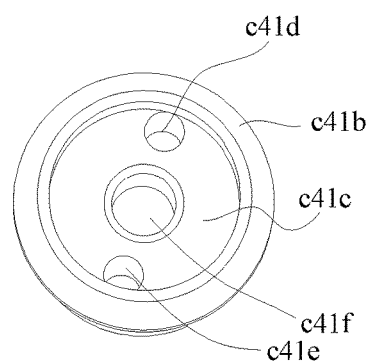
FIG. 111 is a schematic structural diagram of a first part of a coupling in the driving assembly in Embodiment Fifteen.

As shown in FIG. 109 and FIG. 111, preferably, a mechanism which controls the driving component c40 to unidirectionally rotate is provided between the coupling and the driving component c40, the mechanism includes springs c46, c47 and cylinders c48, c49 in the through holes c41d and c41e provided in the first part c41 of the coupling, one end of the cylinders c48 and c49 is respectively inserted into the through hole c41d and c41e, the other end respectively fits with two grooves which are symmetrically arranged on the protrusion cylinder, one end of the springs c46 and c47 is respectively sleeved in the cylinders c48 and c49, the other end contacts the surface of the second part c42; thus, when the driving component c40 moves along the cA direction in FIG. 110, since the cylinders c48 and c49 abut the first plane, and the first plane is substantially parallel to the axis of the driving component, the rotation of the driving component c40 is stopped; however, when the driving component c40 moves along direction cB in FIG. 110, the first cambered surface c405 can apply a force on the cylinders c48 and c49 along direction cB, so that the cylinders c48 and c49 continually press the springs c46 and c47, in this way the cylinder will not stop the driving component from rotating along direction cB, therefore the mechanism can control the driving component c40 to unidirectionally rotate. Preferably, the end portion of the driving component c40 can pass through the through hole c41f on the first part c41, then the driving head is avoided from detaching from the coupling through the E shaped latching spring c51.

Embodiment Sixteen

As shown from FIG. 114 to FIG. 118, another driving assembly is provided, the other portions are the same with Embodiment Fifteen, including a driving component c140, a coupling, a controlling mechanism which controls the driving component to unidirectionally rotate, a hub c148 which accommodates the coupling, and a stretching mechanism which controls the coupling and the driving component to stretch axially. Preferably, the driving component c140 includes a force engaging portion which receives a force on the rotational force driving head c1002 in the electrophotographic image forming device, the engaging potion includes engaging claws c140a which is the same with Embodiment Fifteen, the engaging claws are symmetrically arranged on the periphery of a groove; differing from Embodiment Fifteen, the driving component includes an engaging portion, a protrusion c140d and a connecting cylinder c140c which connects the protrusion c140d and the engaging portion, the protrusion c140d of the driving component is directly arranged as a part of the coupling, an self-adaptive adjusting portion is provided on the lateral wall of the connecting cylinder c140c, which are two protruding teeth c140b symmetrically arranged. The coupling of the present embodiment can omit the first part in Embodiment Fifteen, and still includes a second part c141 and a third part c142, and the second part c141, the third part c142 and the protrusion c140d are connected with each other via a crossed coupling. It should be noted that, the second part c141 of the coupling is only configured to provide more directions of sliding between the driving component and the hub, in order to simplify the technical solution of the present embodiment, the second part c141 can be omitted.

Figure 114:
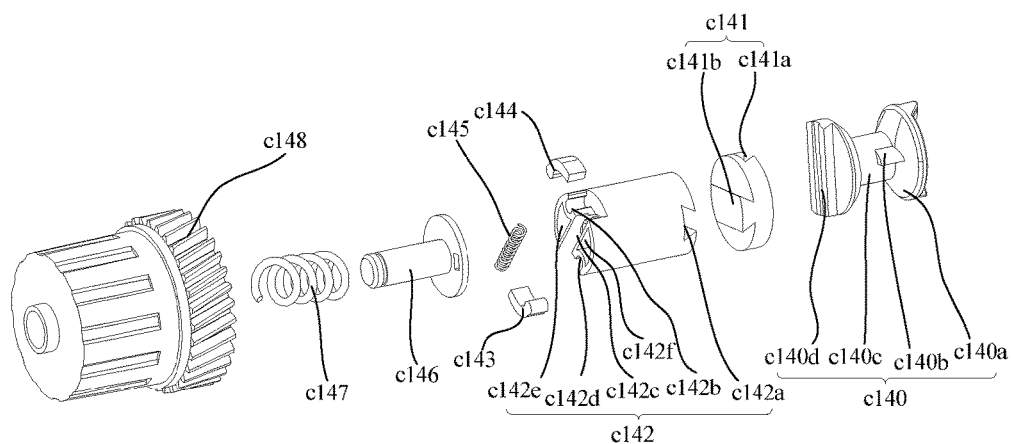
FIG. 114 is a schematic decomposition diagram of a driving assembly in Embodiment Sixteen.
Figure 115:
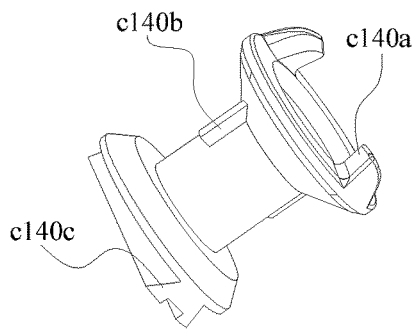
FIG. 115 is a schematic structural diagram of a driving component in the driving assembly in Embodiment Sixteen.
Figure 116:
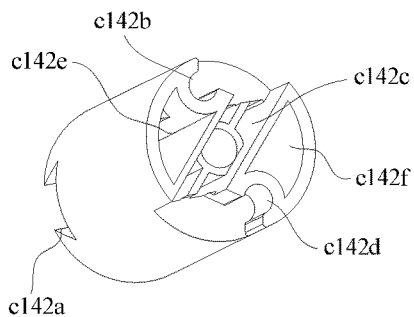
FIG. 116 is a schematic structural diagram of a third part in the driving assembly in Embodiment Sixteen.

As shown in FIG. 114, a supporting cap c146 is further provided between the coupling and the hub c148, the supporting cap c146 is configured to support the third part c142, it is also possible to configure the supporting cap c146 and the third part c142 as a whole, preferably in the present embodiment, they are separately configured, so as to facilitate installation of the spring in the ratchet mechanism. A spring c147 which is the same with Embodiment Fifteen is provided between the supporting cap c146 and the hub c148. The end portion of the supporting cap c146 is fixed on the exterior of the hub through an E shaped latching spring.

Figure 117:
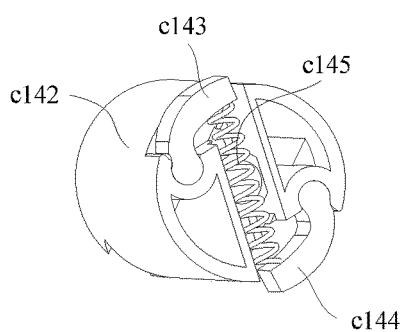
FIG. 117 is an assembling drawing of the third part, a blocking part and a spring in the driving assembly in Embodiment Sixteen.
Figure 118:
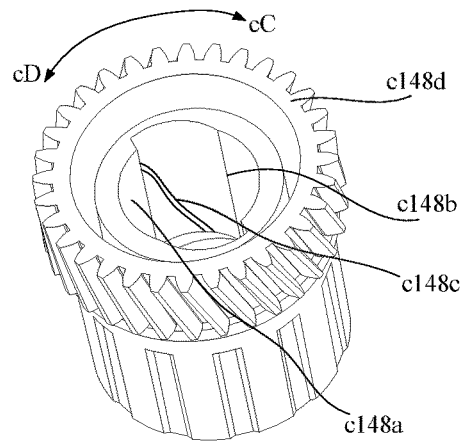
FIG. 118 is a schematic structural diagram of a hub in the driving assembly in Embodiment Sixteen.
Figure 119:
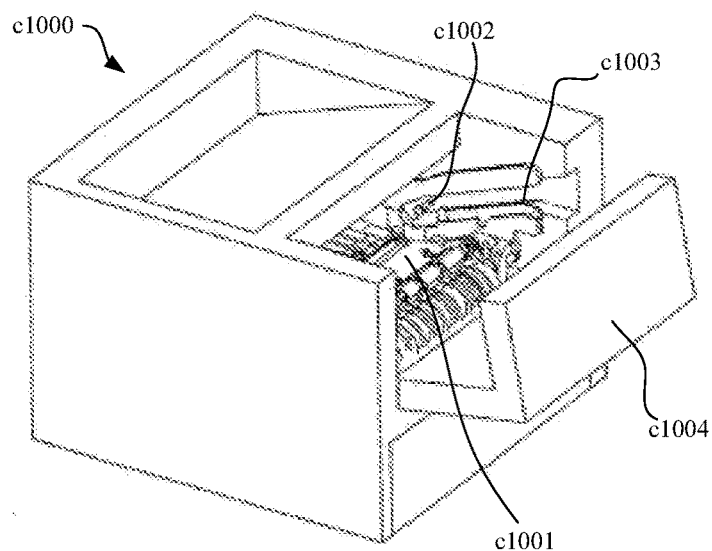
FIG. 119 is a schematic structural diagram of an electrophotographic image forming device in Embodiment Seventeen.

As shown in FIG. 114, FIG. 116, FIG. 117 and FIG. 118, in the present embodiment, the hub c148 is fixedly connected with the photosensitive member, the protrusion c140d at the end portion of the driving component c140 is configured as a part of the coupling, thus the driving component c140 cannot rotate about the coupling, but can unidirectionally rotate about the hub through the coupling, so that it is possible to control the driving component to unidirectionally rotate about the hub; since the hub is fixedly connected to the photosensitive drum, the driving component c140 can unidirectionally rotate about the photosensitive drum. Preferably, in the present embodiment, the ratchet mechanism controls the coupling to unidirectionally rotate about the hub; specifically, the ratchet mechanism includes a spring c145 provided in the sliding groove c142c at the end portion of the third part c142, blocking members c143 and c144 which respectively rotate about the inner arcs c142b and c142d of the third part c142, one end of the blocking members c143 and c144 is provided with a cambered surface corresponding to the arcs c142b and c142d, the other end is provided with a plane abutting the hub c148. As shown in FIG. 117, the spring c145 makes at least a portion of the blocking members c143 and c144 be located outside the third part c142. As shown in FIG. 118, the hub c148 includes an accommodating portion c148a which accommodates the coupling and a gear c148d; grooves which are symmetrically arranged on the inner wall of the hub c148, the groove includes a first plane c148b parallel to the axis of the hub, and a cambered surface c148c arranged opposite to the first plane c148b. In this way, after the driving assembly is assembled, the plane of the end portion of the blocking members c143 and c144 is located in the groove of the hub c148, when the coupling rotates along direction cC in FIG. 118, the plane of the end portion of the blocking members c143 and c144 abuts the first plane c148b of the groove in the hub, thus the rotation of the coupling part along direction cC is blocked; when the coupling rotates along direction cD in FIG. 118, the cambered surface c148c in the hub will press the blocking members c143 and c144, the blocking members further press the spring c145; thus the coupling can unidirectionally rotate in the hub c148.

It should be noted that, the self-adaptive adjusting portion in the present embodiment can be configured same with Embodiment Fifteen; the mechanism which controls the driving component c140 to unidirectionally rotate can also adopt the structure in Embodiment Fifteen.

Embodiment Seventeen

As shown from FIG. 119 to FIG. 126, an electrophotographic image forming device is provided which includes an electrophotographic image forming device and a process cartridge which can be detachably installed into the electrophotographic image forming device; the process cartridge is preferably the process cartridge provided in Embodiment Fifteen, the electrophotographic image forming device c1000 includes a process cartridge installing portion c1001 to which a process cartridge can be installed; a rotational force driving head c1002 which fits with the driving assembly in the process cartridge, the rotational force driving head c1002 transmits force with the motor through a gear or a belt; the electrophotographic image forming device further includes a guide rail c1003 which guides the process cartridge to be installed and a cover c1004 which stabilizes the process cartridge to the process cartridge installing portion c1001. Preferably, the guide rail c1003 includes a first stepped surface c1003a, a second stepped surface c1003b parallel to the first stepped surface in horizontal direction, a third stepped surface c1003c which is connected with the second stepped surface c1003b and inclines with respect to the second stepped surface c1003b, and the size of the third stepped surface c1003c in the axial direction of the photosensitive drum in the process cartridge gradually increases along the installation direction of the process cartridge; an arc portion c1003d is further provided on the guide rail c1003, after the process cartridge is completely installed into the electrophotographic image forming device, the front end of the process cartridge abuts the arc portion c1003d. Preferably, the rotational force driving head c1002 includes a driving rod c1002d, a tapered ball head c1002a which is provided on the front end of the driving rod c1002d, and transmitting pins c1002b and c1002c provided at two sides of the driving rod c1002d.

Preferably, the driving assembly in the process cartridge of the present embodiment is the driving assembly c4 described in Embodiment Sixteen.

Figure 123:
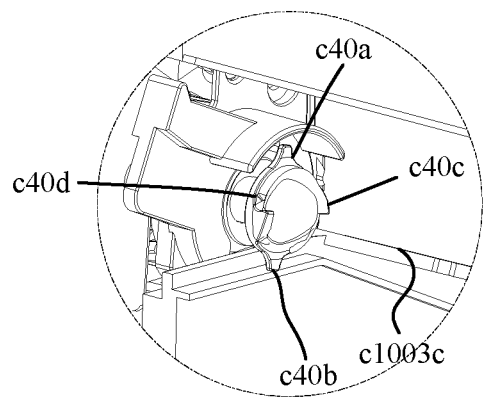
FIG. 123 is a schematic locally enlarged diagram of FIG. 122.

As shown in FIG. 122 and FIG. 123, which are schematic structural diagrams showing that the process cartridge c1 is installed into the electrophotographic image forming device in the first state; it is assumed that the driving assembly c4 does not includes the self-adaptive adjusting portion, the engaging claws c40c or engaging claws c40d of the driving component c40 are located at the front in the axial direction of the driving component c40 in the installation direction of the process cartridge, and the engaging claws c40c and c40d are protruded in the axial direction of the driving component, therefore, during installation process, the engaging claw c40c or c40d will interfere the tapered ball head c1002a at the front end of the driving component c1002, which will affect the installation of the process cartridge c1. Therefore, preferably, the driving component c40 of the present embodiment is provided with two extending portion c40a and c40b as the self-adaptive adjusting portion, which will make, during the installation process of the process cartridge, the engaging claws c40c and c40d automatically adjust to the position that will not interfere with the tapered ball head c1002a, through the collision of the extending portion c40a or c40b with the third stepped surface c1003c on the guide rail.

Figure 124:
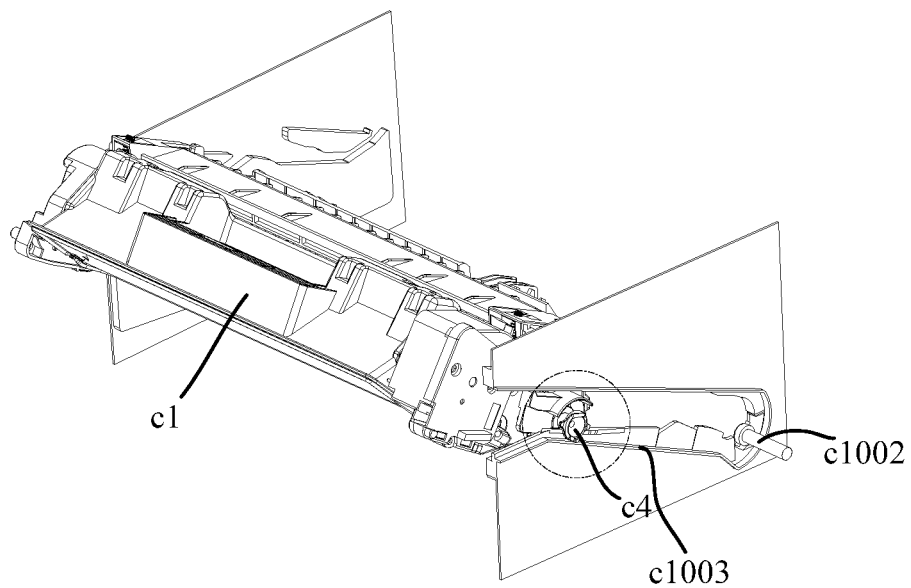
FIG. 124 is a schematic structural diagram showing that the process cartridge is in a second state in the electrophotographic image forming device in Embodiment Seventeen.
Figure 125:
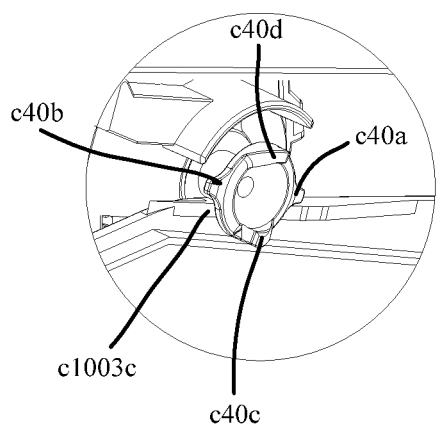
FIG. 125 is a schematic locally enlarged diagram of FIG. 124.

As shown in FIG. 124 and FIG. 125, which are schematic structural diagrams showing that the process cartridge c1 is installed into the electrophotographic image forming device in the second state; in this state, the extending portions c40a or c40b are located at the front in the axial direction of the driving component c40 in the installation direction of the process cartridge; thus the engaging claws c40c and c40d will not interfere with the tapered ball head c1002a, then the extending portions c40a and c40b as the self-adaptive adjusting portion do not need to adjust the state of the driving component c40 through the guide rail. As described in Embodiment Sixteen in detail, a mechanism is further provided in the driving assembly between the coupling and the driving component c40, configured to control the driving component c40 to unidirectionally rotate, preferably, the driving component c40 can unidirectionally rotate along the clockwise direction shown in FIG. 123; therefore the driving component c40 will not rotate optionally during installation, which facilitates the engaging claws c40a and c40b on the driving component c40 rotating according to preset track.

Figure 126:
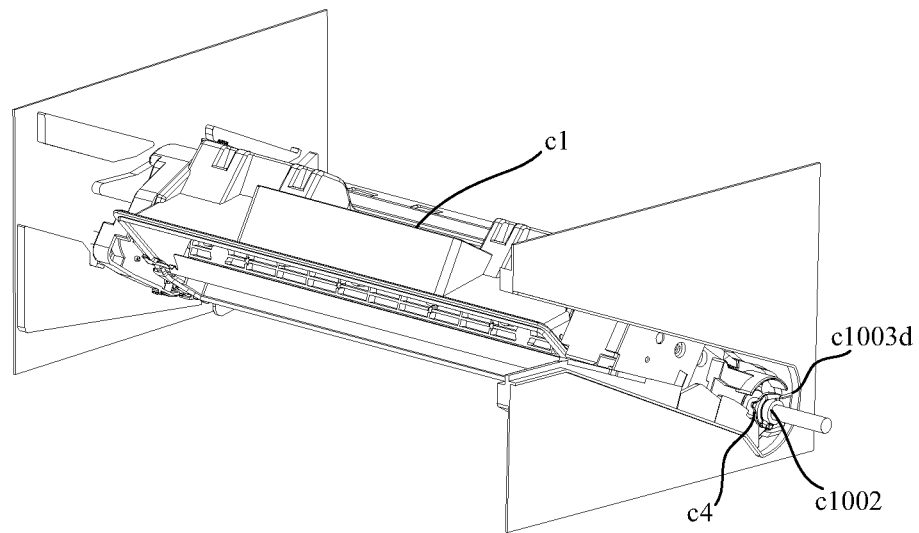
FIG. 126 is a schematic structural diagram showing that the process cartridge is in a third state in the electrophotographic image forming device in Embodiment Seventeen.

As shown in FIG. 126, which is a schematic structural diagram showing that the process cartridge is completely installed into the electrophotographic image forming device c1000, at this time the driving component c40 in the driving assembly c4 engages with the rotational force driving head c1002, specifically, the engaging claws c40c and c40d on the driving component c40 respectively engage with the transmitting pins c1002b and c1002c on the rotational force driving head c1002.

Preferably, the crossed coupling provided in the driving assembly c4 is to provide a cushioning process for the detaching of the driving component c40 from the rotational force driving head c1002 during taking the process cartridge c1 out of the electrophotographic image forming device, which is later than the process cartridge frame disengaging from abutting the guide rail, which facilitates the disengagement of the driving component c40. Furthermore, the sliding surface between the groove c43e and the protrusion c42a inclines with respect to the axis of the driving component for a certain extent, thus during axial shift of the driving component c40, it is possible to achieve a larger distance of travel, which facilitates the disengagement of the driving component c40 from the rotational force driving head c1002 in the electrophotographic image forming device.

Embodiment Eighteen

Figure 127:
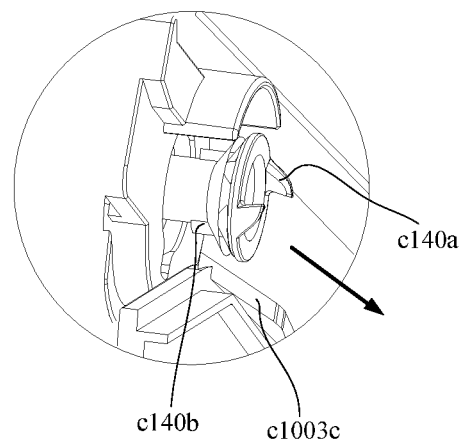
FIG. 127 is a schematic local diagram showing that a process cartridge is in a first state in an electrophotographic image forming device in Embodiment Eighteen.
Figure 128:
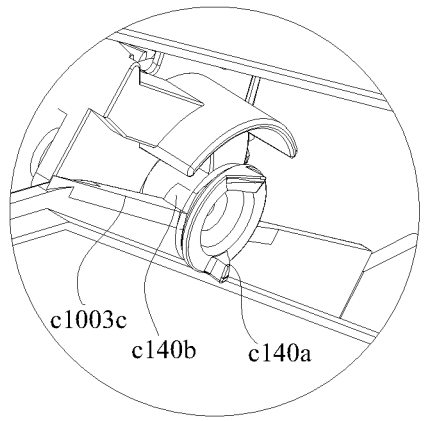
FIG. 128 is a schematic local diagram showing that the process cartridge is in a second state in the electrophotographic image forming device in Embodiment Eighteen.

As shown in FIG. 127 and FIG. 128, which are local schematic diagrams of another electrophotographic image forming device, Embodiment Eighteen includes the same electrophotographic image forming device c100 and same process cartridge frame with Embodiment Seventeen; the difference lies in that the driving assembly in the process cartridge provided by the present embodiment is the driving assembly in Embodiment Sixteen; specifically, the self-adaptive adjusting portion is a protruded tooth c140b provided on the lateral wall of the driving component c140, the protruded tooth c140b can also adjust the state of the engaging claw with the stepped surface c1003c on the guide rail c1003; and the driving assembly is also provided with a ratchet mechanism for adjusting the driving component to unidirectionally rotate. After the process cartridge is completely installed to the electrophotographic image forming device, the engaging claw c104a at the end portion of the driving assembly c4 can well engage with the transmitting pin on the rotational force driving head c1002.

What is claimed is:

1. A rotational force driving assembly used for receiving rotational driving force from a rotational force driving head inside an electrophotographic image forming device, said rotational force driving assembly comprising:
a hub,
a rotational force receiving component for driving the hub to rotate,
a plate piece provided at one end of the hub,
wherein the plate piece enables the rotational force receiving component to move between a first position in which the rotational force receiving component extends out and the axis of the rotational force receiving component is coaxial with the axis of the hub,
and a second position in which the rotational force receiving component retracts and the axis of said rotational force receiving component is parallel to and offset from the axis of the hub.

2. A rotational force driving assembly according to claim 1, wherein when the rotational force receiving component is in the first position, the outer end of the rotational force receiving component to the hub is farther, as measured in the direction of axis of the hub, than the rotational force receiving component is in the second position.

3. A rotational force driving assembly according to claim 2, wherein when the rotational force receiving component is in the first position, the rotational force receiving component is engaged with said rotational force driving head to receive the rotational driving force; when the rotational force receiving component is in the second position, the rotational force receiving component is disengaged from the rotational force driving head.

4. A rotational force driving assembly according to claim 2, wherein the rotational force driving assembly further comprises an intermediate force transmission component, said intermediate force transmission component is arranged between the rotational force receiving component and the hub; when the rotational force receiving component moves from the first position to the second position, the intermediate force transmission component can incline to the hub.

5. A rotational force driving assembly according to claim 4, wherein the rotational force driving assembly further comprises an elastic member provided between the intermediate force transmission component and the hub, one end of the elastic member abuts against the intermediate force transmission component and other end abuts against the hub.

6. A rotational force driving assembly according to claim 1, wherein the plate piece comprises an inclined surface, the inclined surface enables the rotational force receiving component to move between the first position and the second position.

7. A rotational force driving assembly according to claim 1, wherein when the rotational force receiving component disengages from the rotational force driving head, the plate enables the rotational force receiving component to move to the second position from the first position.

8. A process cartridge comprising:
a cartridge;
a rotational force driving assembly used for receiving rotational driving force from a rotational force driving head inside an electrophotographic image forming device, said rotational force driving assembly comprising:
a hub,
a rotational force receiving component for driving the hub to rotate,
a plate piece provided at one end of the hub,
wherein the plate piece enables the rotational force receiving component to move between a first position in which the rotational force receiving component extends out and the axis of the rotational force receiving component is coaxial with the axis of the hub,
and a second position in which the rotational force receiving component retracts and the axis of said rotational force receiving component is parallel to and offset from the axis of the hub.

9. A rotational force driving assembly used for receiving rotational driving force from a driving head inside an electrophotographic image forming device, said rotational force driving assembly comprising:
a transmitting component,
a coupling component for driving the transmitting component to rotate,
a pressing component for controlling the coupling component to extend or retract along the axial direction of the transmitting component,
a plate provided at one end of the transmitting component,
wherein the pressing component retracts by being pressed and controls the coupling component to retract, the retracting direction of the pressing component and the retracting direction of the coupling component is the same direction and is parallel to each other,
wherein when the coupling component disengages from the driving head, the plate enables the coupling component to retract along the axial direction of the transmitting component, the axis of the coupling component is not coaxial with the axis of transmitting component or the axis of the coupling component is parallel to and offset from the axis of transmitting component.

10. A rotational force driving assembly according to claim 9, wherein the coupling component is engaged with the driving head to receive rotational driving force; the electrophotographic image forming device further comprises a guide rail adjacent to the driving head, the pressing component is pressed by the guide rail to control the coupling component to retract.

11. A rotational force driving assembly according to claim 9, wherein the pressing component comprises a pressed portion; the pressed portion protrudes from the outer surface of the plate.

12. A rotational force driving assembly according to claim 11, wherein the rotational force driving assembly further comprises a pressing plate, the pressing plate is rotatably connected with the plate, the coupling component can retract when one end of the pressing plate is pressed.

13. A rotational force driving assembly according to claim 11, wherein the protruding direction of the pressed portion and the extending direction of the coupling component is the same direction.

14. A rotational force driving assembly according to claim 13, wherein the pressed portion comprises a bevel or curved surface.

15. A rotational force driving assembly according to claim 14, wherein when the rotational force receiving component extends or retracts, the axis of the rotational force receiving component is parallel to or coaxial with the axis of the transmitting component.

16. A rotational force driving assembly according to claim 14, wherein the rotational force driving assembly further comprises an elastic member, the elastic member applies an elastic force to enable the coupling component to extend.

17. A rotational force driving assembly according to claim 16, wherein the coupling component can rotate with respect to the transmitting component without transmitting a driving force when the rotational force of the coupling component is less than the elastic force of the elastic member.

18. A rotational force driving assembly according to claim 9, wherein when the rotational force driving assembly is installed into the electrophotographic image forming device to engage with the driving head, the axis of the coupling component is parallel to the axis of the driving head; when the rotational force driving assembly is removed from the electrophotographic image forming device to disengage with the driving head, the axis of the coupling component is inclined with respect to the axis of the driving head.

19. A rotational force driving assembly according to claim 9, wherein the rotational force driving assembly further comprises a sliding piece having an inclined sliding surface, the plate comprises a bevel; the sliding piece connects with the coupling component; when the coupling component disengages from the driving head, the bevel of the plate abuts against the inclined sliding surface of the sliding piece to enable the coupling component to retract.

20. A rotational force driving assembly according to claim 19, wherein the sliding piece is connected with the pressing component, the sliding piece can move with respect to the pressing component in the transmitting component.

21. A process cartridge comprising:
a cartridge;
a rotational force driving assembly used for receiving rotational driving force from a driving head inside an electrophotographic image forming device, said rotational force driving assembly comprising:
a transmitting component,
a coupling component for driving the transmitting component to rotate,
a pressing component for controlling the coupling component to extend or retract along the axial direction of the transmitting component,
a plate provided at one end of the transmitting component,
wherein the pressing component retracts by being pressed and controls the coupling component to retract, the retracting direction of the pressing component and the retracting direction of the coupling component is the same direction and is parallel to each other,
wherein when the coupling component disengages from the driving head, the plate enables the coupling component to retract along the axial direction of the transmitting component, the axis of the coupling component is not coaxial with the axis of transmitting component or the axis of the coupling component is parallel to and offset from the axis of transmitting component.

* * * * *